HIGH-SPEED ELECTRONIC TELEPHONE SWITCHING SYSTEM

Filed Sept. 16, 1949

INVENTORS W. A. MALTHANER
H. E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 2

INVENTORS W.A. MALTHANER
H.E. VAUGHAN

BY William F. Simpson.

ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 3

INVENTORS W.A. MALTHANER
H.E. VAUGHAN
BY
William F. Simpson.
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949

39 Sheets-Sheet 4

INVENTORS W. A. MALTHANER
H. E. VAUGHAN
BY William F. Simpson
ATTORNEY

W. A. MALTHANER
H. E. VAUGHAN
INVENTORS
BY William F. Simpson
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson.
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 8

INVENTORS W.A. MALTHANER
H.E. VAUGHAN
BY William F. Simpson
ATTORNEY

INVENTORS W. A. MALTHANER
H. E. VAUGHAN
BY William F. Simpson.
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949

39 Sheets-Sheet 14

INVENTORS W.A. MALTHANER
H.E. VAUGHAN

BY William F. Simpson

ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949

39 Sheets-Sheet 19

INVENTORS W. A. MALTHANER
H. E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949

39 Sheets-Sheet 20

INVENTORS W.A. MALTHANER
H.E. VAUGHAN

BY William F. Simpson

ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson,
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 25

INVENTORS W.A. MALTHANER
H.E. VAUGHAN
BY William F. Simpson.
ATTORNEY

INVENTORS W.A. MALTHANER
H.E. VAUGHAN
BY William F. Lincifson.
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson.
ATTORNEY

HIGH-SPEED ELECTRONIC TELEPHONE SWITCHING SYSTEM

Filed Sept. 16, 1949

W.A. MALTHANER
H.E. VAUGHAN
INVENTORS
BY William F. Simpson.
ATTORNEY

INVENTORS W. A. MALTHANER
H. E. VAUGHAN
BY William F. Simpson.
ATTORNEY

INVENTORS W.A. MALTHANER
H.E. VAUGHAN
BY William F. Simpson.
ATTORNEY

INVENTORS W.A. MALTHANER
H.E. VAUGHAN
BY William F. Simpson
ATTORNEY

INVENTORS W.A. MALTHANER
H.E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 35

INVENTORS W.A. MALTHANER
H.E. VAUGHAN
BY William F. Simpson
ATTORNEY

INVENTORS W.A. MALTHANER
H.E. VAUGHAN
BY William F. Simpson.
ATTORNEY

INVENTORS W. A. MALTHANER
H. E. VAUGHAN
BY William F. Simpson.
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949 39 Sheets-Sheet 38

INVENTORS W. A. MALTHANER
H. E. VAUGHAN
BY William F. Simpson
ATTORNEY

Oct. 13, 1953 W. A. MALTHANER ET AL 2,655,559

HIGH-SPEED ELECTRONIC TELEPHONE SWITCHING SYSTEM

Filed Sept. 16, 1949

39 Sheets-Sheet 39

INVENTORS W.A. MALTHANER
H.E. VAUGHAN
BY William F. Simpson.
ATTORNEY

Patented Oct. 13, 1953

2,655,559

UNITED STATES PATENT OFFICE 2,655,559

HIGH-SPEED ELECTRONIC TELEPHONE SWITCHING SYSTEM

William A. Malthaner, Summit, and Henry E. Vaughan, Chatham, N. J., assignors to Bell Telephone Laboratories, Incorporated, New York, N. Y., a corporation of New York Application September 16, 1949, Serial No. 115,961

23 Claims. (Cl. 179—18)

Figure 1:
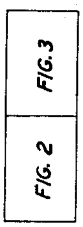

This invention relates to an improved telephone switching system for automatically establishing telephone transmission paths between telephone subscriber's stations under control of equipment located at each of the subscriber's stations.

It is an object of the present invention to provide improved switching control circuits, methods, and apparatus for more rapidly and more accurately establishing communication paths between subscribers's stations more efficiently and with apparatus and equipment than heretofore.

In telephone systems in the prior art it has been the practice to provide each subscriber's station with a telephone transmitting and receiving device as well as a calling device which is usually called a dial or dialing device. While a dialing device is almost universally used in telephone switching systems at the present time, nevertheless it has certain drawbacks and disadvantages.

In the first place, it requires an appreciable time for the subscriber to actuate the dial for each digit and requires an appreciable interval of time for the dial to return to normal for each digit during which timing the pulses representing the magnitude or identity of the digits are transmitted to the central office. Thus, the time required by the subscriber is extended by the time required for the dial to return to normal during which the necessary pulses are transmitted to the central office. Likewise, the time required to receive and record the called subscriber's number at the central office is increased by the time required by the subscriber or attendant to actuate the dial between each of the digits.

Furthermore, in the usual switching systems of the prior art, the signaling currents transmitted to the central office representing the called subscriber's designation or number are transmitted to the central stations only once. Consequently, it is not possible to check the operation of equipment in response to these pulses. In addition, the subscriber has no way of checking the accuracy of the number transmitted or for determining the portion of the numbers that are transmitted to the central office with the result that in case of an error by either the subscriber or central office equipment the wrong number will result.

Furthermore, the usual dial pulses are formed by interrupting the direct current supplied over the subscriber's line. These pulses have a direct current component and low frequency components, which components are suitable for transmission without change over voice frequency bands of toll lines, cable circuits, channels, and the like.

An object of this invention is to provide improved methods, apparatus, and circuits which operate more rapidly for establishing paths through the switching equipment at the central office so that the holding time of expensive control equipment is materially reduced, thus increasing the efficiency of use of the equipment with the result of lower cost in establishing each connection therethrough.

Another object of this invention is to provide improved methods, circuits and apparatus operating at a sufficiently high speed so that the paths through the switching equipment may be established one at a time, thus eliminating the necessity of expensive and complicated busy test and connecting equipment and circuits.

Another object of this invention is to provide improved methods, circuits and apparatus for more accurately establishing connections through the equipment first by arranging the subscriber's calling apparatus so that the subscriber may set up the number of the called party on his calling apparatus and then check the setting of this apparatus before placing the call.

Another object of this invention is to provide improved methods, circuits and apparatus for more accurately establishing connections through switching equipment by repeatedly transmitting the number of the called station to the central office where the received number may be checked to insure that it has been properly received. If the number is improperly received, the received or recorded number will be disregarded and the next time it is transmitted from the subscriber's station it will again be recorded if properly received and employed to control the establishment of the connection.

Another object of this invention is to provide simplified control circuits at the central office which do not need to store or retransmit the called subscriber's number. Instead the called subscriber's number is repeatedly transmitting so that one or more of the repetitions of the number may be employed to establish a connection through a given switching point and thereafter the complete number transmitted from the subscriber's station through the switching equipment to the next switching station and so on, each switching station employing some portion or portions of one or more of the repetitions of the called number for establishing a path through the respective switching stations.

A feature of the invention relates to improved methods, circuits and apparatus for supplying low frequency alternating-current power over the subscriber's line for operating the calling device at the subscriber's station.

Another feature of the invention relates to maintaining supervision during the calling period by means of apparatus responsive to alternating-current power supplied over the subscriber's line.

Another feature of the invention relates to a source of alternating-current power at the switching center for supplying power to actuate calling devices at the subscriber's stations and to connecting apparatus for connecting subscriber's lines to said source before a connection is established through the switching equipment at the central office.

Another feature of this invention relates to other connecting apparatus for connecting a source of alternating power to a subscriber's line to actuate a calling device located at the subscriber's station which source of power and connecting apparatus supply the power over the transmission path through the switching apparatus after this path has been established. Another feature of this invention relates to switch circuits and apparatus for associating a source of low frequency alternating power with an outgoing trunk circuit when said trunk circuit is seized for supplying power to the subscriber's line connected thereto.

Another feature of the invention relates to improved methods, circuits and apparatus for interrupting the supply of power to the subscriber's station after all the selections have been made and transmission paths and established to the called subscriber's line.

Another feature of the invention relates to improved methods, circuits and apparatus for causing the disconnect of the calling apparatus with the subscriber's station and connecting the telephone transmitting and receiving equipment to the subscriber's line after all of the selections have been made and a transmission path established to the called subscriber's station.

Another feature of the invention relates to improved methods, circuits and apparatus for selecting a portion or portions of one or more of the repeatedly transmitted called station designations and controlling the establishment of a transmission path thereby and thereafter employing a selected portion or portions of other repeatedly transmitted designations for establishing other transmission paths through other switching equipment.

Another feature of the invention relates to control circuits, methods and apparatus for coordinating the operation of all of the various circuits and interconnecting them to cooperate with another in the rapid and efficient use of the subscriber's time and also in the rapid and efficient use of the time of the control equipments of the central office, thus materially reducing the time required to establish a connection as well as the cost of establishing each connection through the switching equipment.

Briefly in accordance with an exemplary embodiment of this invention, the circuits and equipment are arranged so that a subscriber in initiating a call first sets his calling device in accordance with the number of symbols designating the called subscriber's station. The subscriber then may check the accuracy of the setting of his equipment and if found to be properly conditioned the subscriber will thereafter place his call by picking up the receiver or handset in the usual manner at which time the subscriber's calling equipment is connected and maintained connected to the line extending to the central station.

The subscriber in thus initiating a call will set into operation the equipment at the central station for applying a low frequency alternating current to the line and extending the transmission path from his line to a call receiving and recording equipment. When these connections are established, pulses are transmitted from the subscriber's calling device which will be received, recorded and checked by equipment at the central station. During this time, the above-described connections are maintained under control of the alternating current supplied to the subscriber's station.

At this time, the subscriber's switching equipment is arranged to repeatedly transmit the entire series of pulses representing the called subscriber's designation. Each series of pulses represents a complete subscriber's designation and is separated in a characteristic manner such as by blank intervals from each of the other series of the signals. Each of the symbols or digits of the called subscriber's designation or number is represented, in the exemplary embodiment set forth herein, by two pulses variably spaced in time. These pulses each comprise substantially a complete cycle of alternating current, as for example, a complete cycle of a 1,000-cycle alternating current. Two pulses representing each designation may be transmitted with any one of ten different time intervals between them thus designating one of ten different numerals or symbols.

Equipment at the central station recognizes the blank intervals between the series of pulses representing a complete subscriber's designation and selects from one or more of the series of pulse groups or pulses required for establishing a path through the switching center or central office.

Thereafter, a path is established through the office and the connection to the subscriber's line for transmitting the low frequency alternating current to the line transferred to the other side of the switching equipment associated with the trunk selected in accordance with the selected portion or portions of the called subscriber's designation. Thereafter, the pulses are transmitted from the calling devices to the subscriber's station through the switching equipment and over a trunk or transmission path to additional switching centers or to additional stations of switching equipment where the pulses or portions thereof or of other complete series of pulses transmitted from the subscriber's calling apparatus are employed to establish paths through the additional switching equipment.

When the connection has been established to the called line, the power supply equipment is disconnected from the trunk and thus from the subscriber's calling apparatus and his calling apparatus is disconnected from the line and his transmission apparatus connected thereto so that his station equipment will be in condition for transmission of the voice frequency currents when the called party answers, or alternatively for receiving a busy tone in case the called line is busy. At the completion of the call the circuits and apparatus are all returned to their normal or idle condition.

Novel features of the subscriber's station and calling equipment disclosed but not claimed herein are claimed in one of the following applications for United States Letters Patent: Parkinson, Serial No. 35,930, filed June 29, 1948; Lovell-Parkinson, Serial No. 35,926, June 29, 1948; Parkinson, Serial No. 39,015, July 16, 1948 which issued as United States Patent 2,499,606 on March 7, 1950; application of Hill-Parkinson, Serial No. 115,016, filed on September 10, 1949; and an application of Dunlap and Malthaner, Serial No. 116,068, filed on September 16, 1949, the same date herewith.

Novel features of the improved receiving and recording equipment disclosed but not claimed herein are claimed in one of the following applications: Vaughan, Serial No. 53,911, filed June 29, 1948; Malthaner-Newby-Vaughan, Serial No. 35,924, June 29, 1948; Malthaner-Newby-Vaughan, Serial No. 68,234, December 30, 1948.

Novel features of the switching network including idle path marking, selecting, trunk selecting, establishing the selected path, etc., disclosed but not claimed herein are claimed in one of the following applications: Bruce-Hall, Serial No. 782,704, filed October 29, 1947; Malthaner, Serial No. 35,925, filed June 29, 1948; Brewer-Bruce, Serial No. 115,962, filed on September 16, 1950, the same date herewith. The disclosures of all of the above-identified applications are hereby made a part of the present application as if fully included and set forth in full herein.

Figure 4:
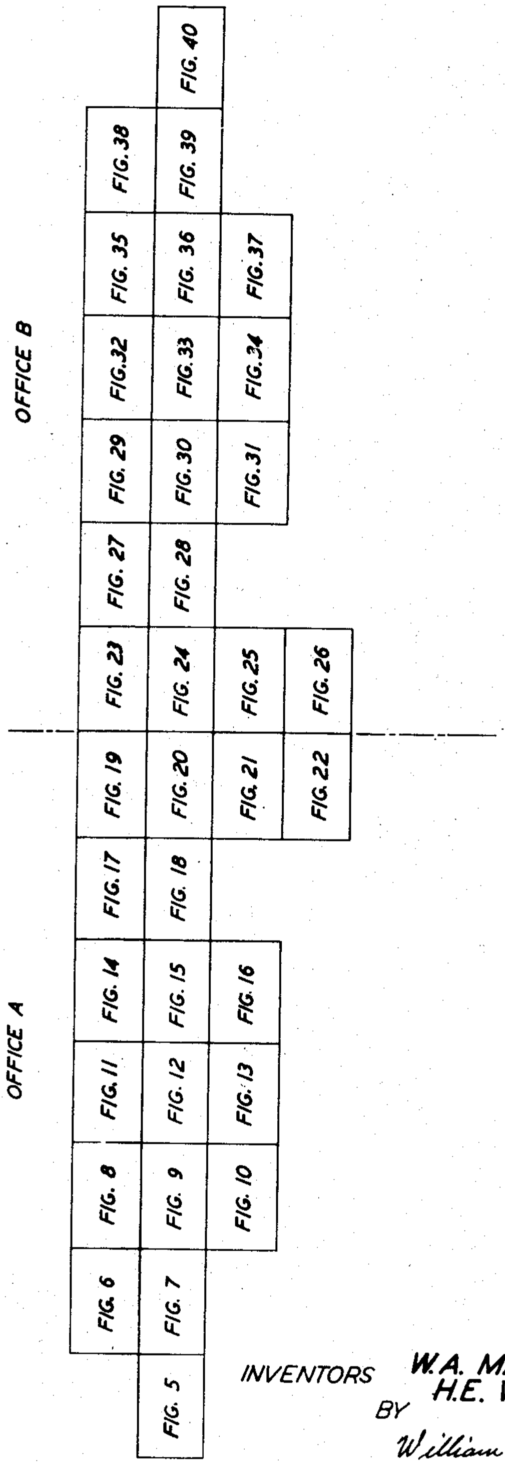
Figure 2:
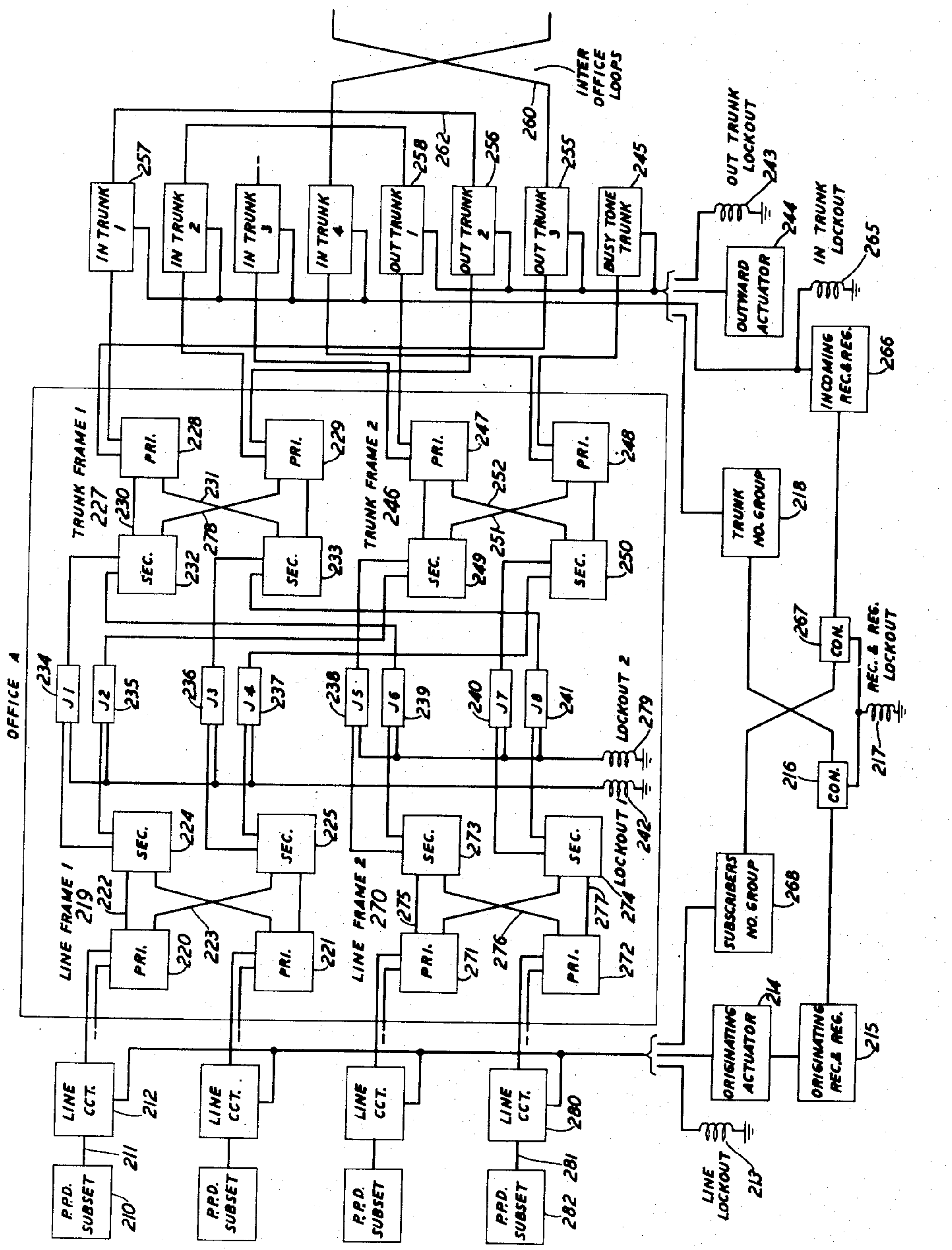
Figure 3:
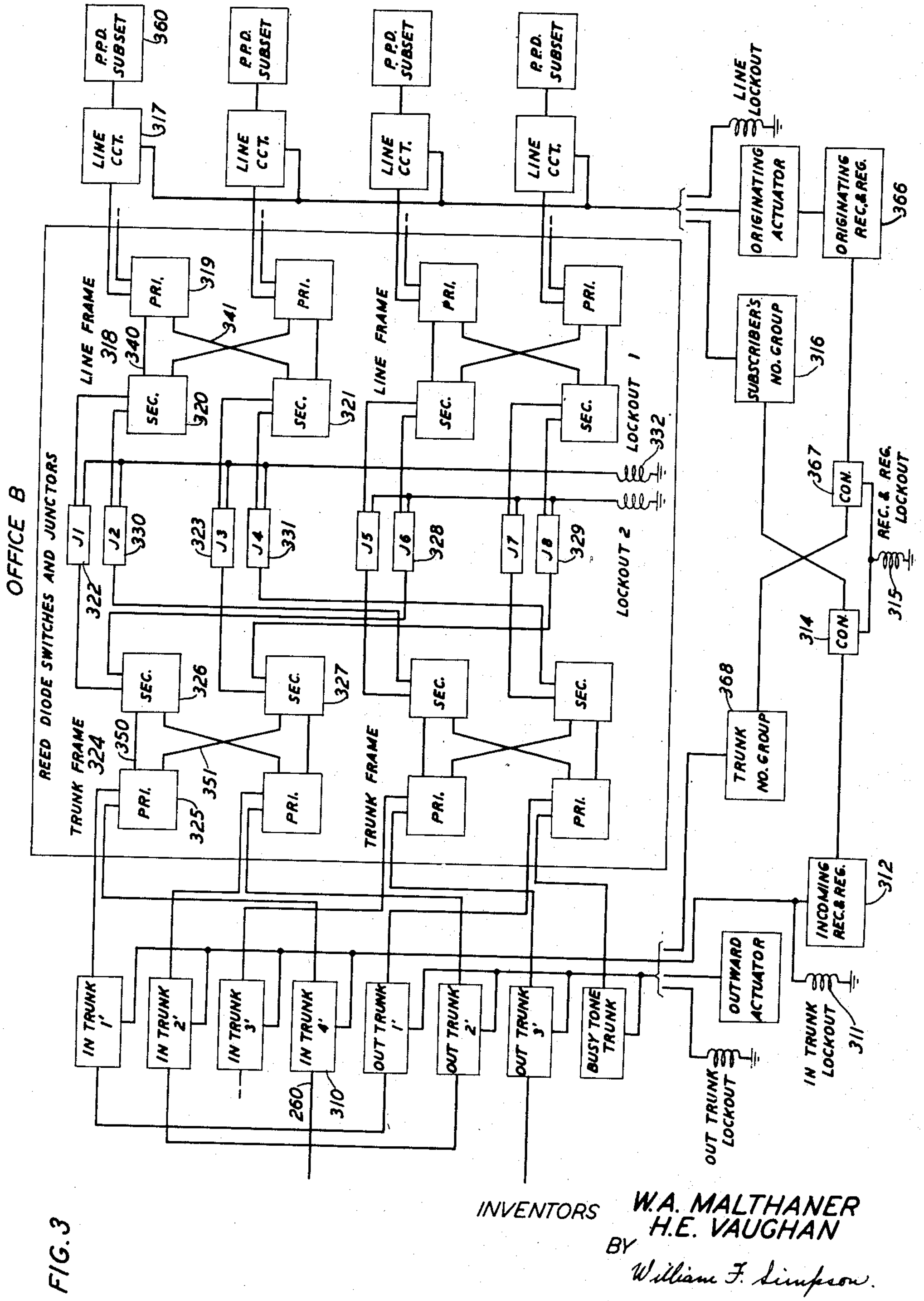

The foregoing and other objects and features of this invention may be more readily understood from the following description when read with reference to the attached drawings in which:

Fig. 1 shows the manner in which Figs. 2 and 3 are arranged adjacent each other;

Figs. 2 and 3 show in outline form the representative circuits at two switching centers and the manner in which these circuits cooperate to provide transmission paths from any calling subscriber to any called subscriber; and Fig. 4 shows the manner in which Figs. 5 through 40 are arranged adjacent to one another and show details of exemplary circuits and their mode of cooperation in the improved telephone switching system embodying this invention.

The operation of the present embodiment of the invention may best be understood by the following brief description with reference to the simplified block schematic of two central offices shown on Figs. 2 and 3, when placed adjacent to each other as indicated in Fig. 1. Fig. 2 and Fig. 3 each show in outline form various circuits and the manner in which they cooperate in a central office of the type embodied in the invention.

As shown in the drawing each office is provided with a switching network usually located on a plurality of supporting frames. Two line frames and two trunk frames are shown in the drawing and are arranged to handle calls within each office and between offices to and from subscriber's lines in each office via trunk circuits, of which four incoming and three outgoing trunks and a busy-tone trunk are shown in the drawing in each office. Four subscribers' lines are shown connected to each office. While only a few subscriber stations, lines, trunks, frames, and other circuits and apparatus are shown in the drawing, it is to be understood that any suitable number of the different circuits and apparatus may be provided. Only a limited number are shown in the drawing and described herein because the additional circuits will be substantially the same as those shown and operate and cooperate with each other and the other circuits and equipment in a manner similar to the operation and cooperation of the circuits shown and described herein.

Each subscriber station comprises apparatus for producing an audible ringing signal at the station in response to power transmitted from the central office, switchhook apparatus for indicating to the central office that the telephone set is on or off of its cradle, apparatus for generating dialing signals in response to power transmitted from the central office, talking apparatus and apparatus for switching under control of the central office from said signaling apparatus to said talking apparatus. A suitable form of subscribers' station equipment which will cooperate satisfactorily with the exemplary embodiment set forth herein is shown in the drawings and is more fully disclosed in the copending application of Hill and Parkinson filed on September 10, 1949, Serial No. 115,016. Novel features of this subscriber station equipment shown or described but not claimed herein is claimed in the above-identified applications or in applications referred to therein.

Common control apparatus is provided at each central office for establishing talking paths through the switching network on a one-at-a-time basis, either in response to dialing signals received from a subscriber station associated with the same central office, or in response to dialing signals transmitted from a subscriber's station associated with another central office, through the other central office and over a trunk circuit from said other central office.

Although the drawing actually shows only sufficient switching circuits and apparatus at each central office for only eight subscriber stations and eight trunk circuits, this is not intended to indicate the necessary or desirable size of such a central office since the individual switches, the number of switches per switching frame and the number of such switching frames provided can be expanded in an obvious manner together with suitably provided common control circuits of the type disclosed to furnish satisfactory service to the number of subscribers indicated by the calling habits of the subscribers and the operating times of the apparatus. The particular types of apparatus intended for the physical embodiment of the invention have sufficiently fast operating characteristics that satisfactory service can be provided on this one-at-a-time basis to a group of subscribers of the size now commonly associated together in one existing central office.

Considering in a little more detail the central office of Fig. 2, it comprises subscribers' stations, such as 210, equipped with preset repetitive dialing means; line conductors, such as 211 extending between the subscriber's station and individual central office line circuits, such as 212; outgoing trunk circuits, such as 255; and incoming trunk circuits, such as 257; together with a switching network comprising line frames, such as 219; and trunk frames, such as 227; by means of which desired connections may be established between any of said subscriber stations and any of said out-trunks, or between any of said in-trunks and any of said subscriber stations.

Associated with the office are common control circuits, shown in Fig. 2 below the switching network, comprising an originating actuator 214 for transmission of power to a subscriber's station for causing thereat the generation of dialing signals designating a called destination; an originating receiver and register circuit 215 for receiving such dialing signals from a calling subscriber's station and registering the information as to the desired destination; a connector circuit 216; a trunk number group circuit 218 for identifying the location of desired out-trunks on the switching network, performing an idle-busy-vacant test on such designated trunks and for establishing, in part, a connection through the switching network from the calling subscriber to one of said designated out-trunks. The common control equipment also includes an outward actuator 244 for supplying signal generating power to a calling subscriber station from an out-trunk circuit and back through the switching network after a connection between the subscriber station and a designated out-trunk has been established, so that dialing or calling signals representing the desired called destination may again be generated at the subscribers' station and transmitted through the switching network and the out-trunk for use in establishing subsequent connections towards the called destination.

For the establishment of a terminating connection between an in-trunk and a called subscriber station, the common control equipment also includes an incoming receiver and register 266 for receiving the dialing signals designating said called subscriber's station after transmission from a calling subscriber's subset through one or more switching systems through an out-trunk circuit and over interconnecting trunk to an in-trunk circuit of this terminating office, a connector circuit 267, and a subscriber's number group 268 for identifying the location of the said called subscriber station on the switching network and for making an idle-busy-vacant test of said called station and for controlling the establishment, in part, at least, of a connection between said incoming trunk circuit and said called subscriber station through the switching network.

Outgoing connections from an out-trunk of this office may terminate either in an in-trunk of the same office for establishing a connection to a called subscriber in the same office, for example the connection, 262, shown between out-trunk 256 and in-trunk 257 both in the office of Fig. 2, or such connection from an out-trunk may terminate in an in-trunk in another office for the establishment of a connection to a designated called station in said other office, for example the connection 260 shown between out-trunk 255 of the office in Fig. 2 and in-trunk 310 of the office in Fig. 3.

Fig. 3 shows another office of the same type as the one shown in Fig. 2, comprising similar equipment and connected to Fig. 2 to disclose the operation of the system on calls between different offices.

A more detailed description with reference to these figures will now be made of the establishment of a connection between a subscriber in office A of Fig. 2 and a designated called subscriber in office B of Fig. 3. Assume, for example, that the subscriber provided with subset 210 desires to make such a call. He first presets the call signal generating apparatus in said subset in accordance with the numbers or symbols representing the designation of the called subscriber's station to which he desires to establish connection by means of finger wheels or other manually settable digit selectors provided on the subset, one such finger wheel for each symbol or number that may be required to designate a called station, as set forth in the above-identified application of Hill and Parkinson. With the complete desired number preset, the subscriber then removes the telephone set from its cradle or switchhook thereby completing a direct-current circuit over conductors 211 for the operation of a relay in line circuit 212, associated with his station. The operation of said line relay causes the operation of another relay in line circuit 212 for connecting an originating actuator 214 and receiver 215 to the line 211 and for removing said original direct-current line relay from the conductors 211 connecting said calling subset to the central office. The operation of said relay for connecting said calling line to originating actuator 214 and receiver 215 is made in conjunction with a cold-cathode gas tube associated with the line circuit which gas tube is connected in lock-out with other similar gas tubes in other line circuits as indicated by lock-out element 213 so that, in the event two or more subscribers simultaneously remove their telephone sets from the cradle or switchhook, only one of such subscribers will be immediately connected to said originating actuator, and all other said calling stations will be temporarily held with only their direct-current line relays operated awaiting access to an originating actuator and receiver until the first selected subscriber has been served. The types of gas tube lock-out circuits employed in the present embodiment of the invention and the operation of these lock-outs are set forth more fully in the United States Patent 2,350,888, granted to N. I. Hall on June 6, 1944, and the disclosures of said patent are hereby made a part of the present disclosures as if set forth herein in full.

The cold cathode gas tubes referred to herein comprise two or more electrodes enclosed in a gas tight envelope containing gas or vapor at a reduced pressure. The gas will usually comprise argone or neon or mixtures of these gasses but may also include other inert gasses or other gasses or vapors such as mercury, etc., or mixtures of gasses and vapors.

Cold cathode tubes have been employed in the exemplary embodiment described herein. It is to be understood however that hot tubes may be employed equally well when desired.

Assume that subscriber's subset 210 has been connected via line circuit 212 to the originating actuator 214, for the establishment of a call. Forty-five cycle alternating-current power is transmitted from said actuator to said calling subscriber's subset causing signal generating apparatus in said subset to generate calling or dialing signals representing the called subscriber station designation as preset on the finger wheels of said calling subscriber subset. These dialing signals are generated at the rate of 90 digits per second, that is one symbol or number for each half cycle of the 45-cycle power transmitted from actuator 214. A complete called designation might consist, for example, of three symbols or numbers designating the called subscriber's central office, four digits designating the called subscriber's line number in said office and an additional symbol designating the party letter of the called subscriber associated with said called line. Under the control of the actuator these eight symbols or numbers designating the complete called number are rapidly generated repetitively, each complete number cycle being separated from adjacent repetitions by a time interval equal to two digits; thus, a complete transmission of the called station designation is made every one-ninth of a second after the originating actuator has been connected to said calling subscriber station. During the intervals in which an actuator is supplying alternating-current power to a calling subscriber's subset, the connection between the calling line circuit and the central office switching and control equipment is held under control of a monitoring detector in the alternating-current power path so that, if the calling subscriber returns his telephone set to its cradle or switchhook during such an interval, the interruption of this flow of power current through the subset will result in the release of the connections thus far established for the call and the return to normal of all the associated circuits.

Associated with originating actuator 214 is the originating receiver and register circuit 215. Said originating receiver examines the dialing signals generated in the calling subscriber's subset and transmitted to the receiver through the line circuit and originating actuator. Said receiver detects the occurrence of the silent or blank interval between repetitions of the called station designation as an indication of the beginning of such a designation. Having detected this interval, it then proceeds to decode and register the numbers or symbols represented by the subsequent dialing signals. Suitable receiver and register circuits employed at this point in the present embodiment of the invention may be of the type disclosed in the copending applications of Malthaner et al. Serial No. 68,234, filed on or about December 30, 1948, or of the type disclosed in Malthaner et al. Serial No. 35,924, filed on or about June 29, 1948, the disclosures of said applications are hereby made a part of the present disclosures as if set forth fully herein.

In the present embodiment of the invention, said originating receiver is arranged to decode and register only those symobls or numbers which designate the called central office; and as in the example mentioned above, such central office designation is commonly made by three symbols or numbers which ordinarily will be arranged to occur at the beginning of each complete number transmission from subset. When said receiver 214 has registered the symbols or numbers designating the called central office, it connects itself through connector circuit 216 connected in lock-out with other similar connectors as indicated by lock-out element to the trunk number group 218 for locating an idle trunk to said designated office. Lock-out is required between connector 216 and other similar connectors, such as 267, by the one-at-a-time operation of the switching network. The method of testing for idle paths through the switching network and the selection of such an idle path for use in a connection, as set forth hereinafter for the present embodiment of the invention, requires that such testing and selection of paths through the switching network be performed on a one-at-a-time basis. Further, the testing and selection of paths through the switching network may be performed either by receiver 215 with number group 218 or by receiver 266 with number group 268, or in a large office a plurality of receivers similar to 215 may be provided, each with access to number group 218 and a plurality of receivers similar to 266 may be provided each with access to number group 268 with each receiver serving either a group of line circuits or a group of incoming trunk circuits; thus, the lock-out arrangement between number group connectors is required to insure that only one connection between any number group circuit and a receiver exists at any one time to insure tests and selections on the switching network on a one-at-a-time basis. Further, a large office might be arranged with a plurality of originating actuators and receivers with each such actuator-receiver combination accessible to an individual group of lines. The speed of operation of the present embodiment of the invention, however, is such that this one-at-a-time operation does not constitute a practical restriction on the general use of the system.

By means of cold-cathode gas tubes included in the trunk number group, an idle-busy-vacant test is made of the trunks in the designated trunk group and if there is one or more trunks idle in said designated trunk group, a relay in said receiver applies a voltage to a control lead associated with said trunk group which lead passes through the trunk circuits in said group and connects to the control lead appearances associated with idle trunks in said group at the trunk side of the switching network of the central office. If any of the out-trunks in the designated trunk group is in use in the path of a previously established connection, the voltage is not connected to such out-trunk leads but is connected only to the switching network appearances of the idle trunks in the group. Assume, for example, that the called office designated by the numbers preset on calling subscriber's subset 210, and registered in receiver 215 designates a subscriber in office B. By way of example, one circuit is shown at Figs. 2 and 3 for the establishment of a connection for a call originating in office A, and terminating in office B. This is shown by the circuit comprising out-trunk 255, interoffice conductors 260 and in-trunk circuit 310. Thus in this case, with out-trunk 255 idle a voltage is connected from receiver 215 through the trunk number group 218 through this trunk to the appearance of its control lead at the left vertical of primary trunk switch 228 on trunk frame 227 of the switching network of office A. At the same time, voltage is connected from originating receiver and register 215 through actuator 214 to the calling line circuit 212 and then to the appearance of the control lead of this calling line on the right vertical of primary line frame 219 of the switching network.

The switching network comprises line frames and trunk frames. Both types of frames have primary and secondary switches or switching arrays of contacts. Each primary line and trunk switch or switching array has a number of vertical input columns across the switch to which are connected line or trunk circuits respectively and a number of horizontal output rows across the switch. Each of these rows and columns consists of three conductors, two for the usual talking path and the third for a control lead. At the intersection of each row and column, hereinafter called a cross-point, is a relay consisting of an operating coil and three sets of make contacts. Two of these contact sets when closed connect the talking conductors associated with the particular input column to the talking conductors associated with the particular output row. A cold-cathode gas diode is also associated with each cross-point relay, and this diode in series with the winding of the relay is connected between the control lead of the vertical input column and the control lead of the horizontal output row. The third contact set of the cross-point relay, when operated, short-circuits is associated gas diode. The use of these cross-point gas diodes in the control leads facilitates the identification and selection of idle paths through the switching network, as described hereinafter, and the short-circuiting of said diodes at operated cross-points facilitates the holding of an established connection through the network and the maintenance of a busy indication along said established connection during the path selection processes of subsequent calls. Each secondary switch or switching array is connected to form a similar rectangular array of cross-points except that the horizontal rows are used as input terminals and the vertical columns as switch outlets. The term "switch" as used herein refers to such arrays of relays and contacts.

In addition, each line frame and trunk frame comprises a number of such primary and secondary switches arranged so as to provide one talking path from each primary switch to each secondary switch. Specifically for example, in Fig. 2 the line frame 219 associated with calling subscriber's station 210 may comprise any suitable number of primary switches, two of which, 220 and 221 are shown in Fig. 2 by way of example, each switch having a plurality of input columns two of which are represented in Fig. 2; each column is connected to a particular subscriber station and each switch has a plurality, usually ten, horizontal output rows, two of which, i. e., the first and last, are represented in Fig. 2. Line frame 219 also comprises a plurality of secondary switches, two of which, 224 and 225, are represented in the drawing each having horizontal inlets and a plurality of vertical outlets. The interconnecting conductors between primary and secondary switches, hereinafter called links, are connected as disclosed specifically, for example, in line frame 219 in which the upper primary switch 220 has its outlets connected to the upper inlets of the secondary switches, the top outlet of switch 220 connecting via path 222 to the top inlet of switch 224 and the lower outlet of 220 connecting via path 223 to the top inlet of switch 225, and in which the lower primary switch 221 has its outlets similarly connected to lower inlets of the secondary switches, the top outlet of switch 221 connecting to the lower inlet of switch 224 and the lower outlet of switch 221 connecting to the lower inlet of switch 225. Intermediate switches will usually have their intermediate and first and last levels connected in a similar manner. Two such line frames are shown in each office for disclosing the operations of the system which relate to cooperation and differentiation between frames.

The line frames can be readily expanded in an obvious manner so as to provide switches and frames of any desirable size and any desirable number of such frames having any desirable number of input line circuits consistent with the operating times of the system and the calling habits of the subscribers and having a similarly consistent number of primary-secondary link paths and secondary outlets. For example, line frames might be provided with 70 inlets and 10 outlets per primary switch and 10 primary switches per line frame and with 10 secondary switches per line frame, each having 10 inlets and 10 outlets. Thus such a frame would have 700 incoming lines and 100 secondary output paths.

Proceeding from the trunk output side of the switching network backwards through the office, a similar frame arrangement is disclosed. Trunk frame 227, for example, consists of a plurality of primary switches, such as 228 and 229, each having vertical multiples to each of which a trunk circuit is attached, such as trunks 255 and 257 connected to switch 228, and horizontal multiples each of which is connected to the horizontal input multiple of a secondary switch to provide one path or link from each primary switch to each secondary switch, as shown by the indicated paths 230 and 231 between primary switch 228 and secondary switches 232 and 233.

The trunk frames can be readily expanded in an obvious manner so as to provide switches and frames of any desirable size and any desirable number of such frames having a number of trunk connections consistent with the operating times of the system and the amount of traffic to be handled and having a similarly consistent number of primary-secondary link paths and secondary outlets. For example, trunk frames might be provided comprising 10 primary and 10 secondary switches, each switch having 10 inlets and 10 outlets. In this case the frame would provide connections between 100 trunk terminals and 100 secondary switch terminals.

Connections are made between the secondary line frame switches and the secondary trunk frame switches to provide talking paths between each line frame and each trunk frame. These connections comprise a direct metallic connection for the two talking conductors of each path but the control lead from each secondary line switch outlet is connected to an individual control circuit, hereafter called a junctor, and the control lead from each secondary trunk switch outlet associated with the same talking path is connected to the same control circuit or junctor. Thus for example, junctor 234 is associated with the path between the left vertical of line secondary switch 224 and the right vertical of trunk frame secondary switch 232.

In the particular exemplary call being described, it has been determined that out-trunk 255 is available for service and that it is desired to connect the calling subscriber station 210 or line to this trunk. Voltage is applied on the switch control lead associated with this calling line at the right vertical inlet of primary switch 220 on line frame 219. This voltage fires gas diodes between this primary switch vertical line input and the control lead of each idle horizontal outlet of said primary switch. Assuming, in this case, that line frame 219 is completely idle, gas diode between the aforementioned primary switch control lead inlet and the control lead outlet to each secondary switch fires thereby altering the voltage condition on the control leads associated with primary-secondary link paths 222 and 223. This altered link control lead voltage, in turn, fires the gas diodes in the secondary switches between said link control leads to which primary gas tubes have been fired and each idle secondary line switch output path. Thus in the case of a completely idle frame, gas tubes are fired in the primary and secondary switch control lead along the idle path from the input terminal associated with line circuit 212, line link path 222, to junctor 234, along similar individual idle paths from the said line circuit to junctors 235, 236 and 237 and also along other idle paths to other junctors not shown in detail. In a similar manner, the voltage applied to the control lead of the right primary vertical of trunk switch 228 associated with desired out-trunk 255 fires gas diodes of the trunk frame primary and secondary switches and, in the case of a completely idle trunk frame, thereby establishes a connection through such fired diodes between said primary vertical lead, trunk link path 230 to junctor 234, other similar connections from the same said trunk vertical control leads along similar individual paths to junctors 236, 239 and 241 and also other similar individual paths not shown in detail. If any of the link or junctor sections of any of the above-described paths through the switching network is in use as part of a previously established connection, the voltage, established by virtue of the holding condition on the control lead of such busy sections, as hereinafter described, is such that the gas diodes will not fire between said busy sections and the adjacent sections to which voltage marks have been extended. Of the various idle line frame and trunk frame paths now marked by ionized gas diodes and shown in detail on the drawing, only the paths with which junctors 234 and 236 are associated form possible complete paths between the calling line circuit 212 and the desired trunk 255. The other junctor circuits which have been marked from the line side, for example, 235, terminate at trunk frames other than trunk frame 227 on which the desired trunk appears, and other junctors which have been marked from the trunk side, for example 239, go to line frames other than line frame 219 on which the calling line appears. Junctor circuits 234 and 236, by means of the combination of altered voltages on the two control leads connected to each said junctor, each recognize that they are associated with a possible complete desired path through the switching network and start to function to complete this path. A cold cathode gas tube in each of these junctors is connected in a lock-out circuit associated with the line frame, as indicated by lock-out element 242, so that only one of said junctors will succeed in fully operating. Assume for example, that in this case junctor 234 is taken into service and that junctor 236 is locked out. At this time a relay in junctor 234 completes a circuit through the gas diodes and cross-point relay coils associated with the control lead path from the calling line to this junctor causing sufficient current to flow in said path to operate said cross-point relays. A similar current flow circuit is completed in the control lead path from junctor 234 through the primary and secondary cross-point relays and diodes of trunk frame 227 to out-trunk 255 for operating the cross-point relays associated with this path. The operation of these four cross-point relays completes a talking connection between said calling subscriber station 210 and out-trunk 255. A relay in line circuit 212, associated with the control lead and operating in series with the switching frame cross-point relays, disconnects the originating actuator 214, and originating receiver 215 from the talking conductors and control lead of said line. Originating receiver 215 in now restoring to normal releases connector 216 and trunk number group 218 which in turn removes the voltage applied to the control lead of out-trunk 255. Completion of the talking path from said calling subscriber's station to out-trunk 255 by the operation of said cross-point relays operates a relay in the out-trunk circuit under control of direct current flowing through the calling subset which places a holding condition on the control lead through the switching networks associated with this path. In addition, said out-trunk connects outward actuator 244, which is common to a plurality of out-trunks, to the talking conductors of said path by means of a relay and gas tube in said out-trunk, which gas tube, as indicated by common element 243, is in a lock-out arrangement with similar gas tubes in other out-trunks in the same actuator group so that, in the event of simultaneous attempt to connect to said actuator, one trunk will connect to the actuator and the other out-trunks will be locked out. Other outward actuators, not shown in detail, may simultaneously be connected to other out-trunks which are in different actuator groups. The actuator 244 supplies 45-cycle power through said out-trunk and over said talking connection through the line and trunk switches to the calling subscriber's subset 210, so that this subset continues to generate repetitively the complete cycle of dialing signals representing the called destination. During the intervals in which an actuator is supplying alternating-current power to a calling subscriber's subset, the connection between the calling line circuit and the central office switching and control equipment is held under control of a monitoring detector in the alternating-current power path so that, if the calling subscriber returns his telephone set to its cradle or switchhook during such an interval, the interruption of this flow of power current through the subset will result in the release of the connections thus far established for the call and the return to normal of all the associated circuits.

Out-trunk circuit 255 also completes a direct-current circuit over interoffice loop 260 for the operation of relay in in-trunk circuit 310 at the designated terminating office. The relay in said in-trunk causes the connection of incoming receiver and register circuit 312 to said trunk, such connection being established, as indicated by common element 311, in lock-out with other in-trunk circuits, which may simultaneously be attempting to connect to receiver 312, by the use of a cold-cathode gas tube in each in-trunk circuit. Incoming receiver 312, when connected to in-trunk 310, now receives over the established connection to the calling subscriber's subset 210 generating equipment the dialing signals representing the complete called station designation. Said receiver detects the blank interval occurring between repetitions of the complete called number as an indication of the start of a complete transmission of such number, and then recognizes the occurrence of the symbols or numbers representing the desired office without decoding or registering this office code. It then registers the succeeding digit signals designating the called subscriber's line number and party letter. The receiver and register circuit employed at this point in the present embodiment of the invention may be of the type disclosed in either of the copending applications of Malthaner et al. Serial No. 68,234, filed on or about December 30, 1948, and Malthaner et al., Serial No. 35,924, filed on or about June 29, 1948, the disclosures of said application are hereby made a part of the present disclosures as if set forth fully herein.

When the complete number designating the desired called subscriber has been received by receiver 312, the receiver operates a relay in in-trunk circuit 310 reversing the direction of direct-current flow over interoffice loop 260 and thereby causing the operation of a polarized relay in out-trunk 255. The operation of said relay in out-trunk 255 causes the release of outward actuator 244 from the trunk circuit, and in addition, the operation of said relay in out-trunk 255, indicating that signaling has been completed, alters the circuit condition on the loop extending between said out-trunk and the calling subscriber's subset thereby tripping a latch mechanism in the calling subset which removes the signal generating apparatus in said subset from the talking conductors and connects the talking apparatus of said subset to the circuit. With the application of the subset latch tripping condition to the subscriber's line by the trunk circuit and the release of the actuator, a holding condition on the established connection through the switching network is maintained thereafter under the control of a relay in the trunk circuit operated by direct current flowing in the talking conductors and through the subset.

When the complete called line designation has been received by incoming receiver 312, it connects itself to subscriber's number group 316 through connector circuit 314 in lock-out thus acquiring for its use the test and control leads from the various subscriber's lines of office B. Lock-out is required between connector 314 and other similar connectors, such as 367, by the one-at-a-time operation of the switching network. The method of testing for idle paths through the switching network and the selection of such an idle path for use in a connection, as set forth hereinafter for the present embodiment of the invention, requires that such testing and selection of paths through the switching network be performed on a one-at-a-time basis. Further, the testing and selection of paths through the switching network may be performed either by receiver 312 with number group 316 or by receiver 363 with number group 368; thus, the lock-out arrangement between the connectors is provided to insure that only one receiver and number group makes tests and selections on the switching network at one time. The speed of operation of the present embodiment of the invention, however, is such that this one-at-a-time operation does not constitute a practical restriction on the general use of the system.

Over a combination of the test leads associated with the designated called line number, the incoming receiver 312 applies voltages to fire a gas tube in that particular called line circuit and by the operation and non-operation of relays, in the line test leads in the receiver associated with the various discharge paths of the line gas tube, makes an idle-busy-vacant test of said line. If said line is idle, one of these relays operates and the receiver supplies voltage for the further operation of the line circuit gas tube which, in turn, places a voltage mark on the control lead to the primary line switch appearance of said line, and at the same time the operation of a relay in the register circuit 312 also connects a voltage to the incoming trunk which is to be connected to the designated line. These voltages applied to the designated in-trunk and called line appearances at the switching network start the sequence of operations whereby idle paths between said trunk and said line are located, and one of said idle paths is used in establishing the desired connection. In addition to applying these switching network control voltages when the called line is found to be idle, the receiver also operates a relay in the in-trunk circuit which connects ringing power to the talking conductors at the called subscriber's end of the trunk and ringing tone to the talking conductors extending to the calling subscriber's subset.

The voltage from the register to the in-trunk is connected, in turn, to the control lead at the primary trunk switch on which said in-trunk appears. The voltage applied to said primary trunk switch control lead fires gas diodes in the primary and secondary switches of the trunk frame to various junctor circuits thereby providing through said diodes and their associated cross-point relay windings individual circuits indicating all the idle paths between this trunk appearance and the junctor circuits, in a manner similar to that described for the trunk frame of office A on the originating half of the call. Similarly, the voltage applied to the control lead of the primary line switch appearance of the desired called line fires gas diodes in the primary and secondary switches of this line frame indicating all the idle paths between said line circuit and various junctor circuits. Assume for example, that the desired called subscriber station is 360; in which case, voltage is applied to the control lead of line circuit 317 and in turn to the left vertical of primary switch 319 on line frame 318, and gas diodes in primary switches 319 and secondary switches 320 and 321 become ionized to indicate that idle paths via links 340, 341, etc., exist between said line and junctors 322, 323, 330 and 331 provided said links or junctors are not in use as part of a previously established connection. Since the in-trunk for use on this call was assumed to be 310, a voltage mark is applied to the left vertical of primary switch 325 of trunk frame 324 in turn firing gas diodes in primary switch 325 and secondary switches 326 and 327 indicating idle paths via links 350, 351, etc., between said in-trunk and junctors 322, 328, 323 and 329 provided said links or junctors are not in use as part of a previously established connection. Other similar marking paths not shown in detail through the network to other junctors are also thus established. If any of the link or junctor sections of any of the above-described paths are in use as part of a previously established connection, the voltage, established by virtue of the holding condition on the control lead of such busy sections, is such that the gas diodes will not fire between said busy sections and the adjacent sections to which voltage marks have been extended.

Of this group of junctors to which voltage marks extend, only junctors 322 and 323 are marked from both the line and trunk sides of the switching network and are thus the only ones actually shown in the drawing which are associated with possible complete paths between said in-trunk and said designated called line. In recognition of this condition, a cold-cathode gas tube in each of said junctors 322, 323, starts to operate in order to complete the connection; however, since these said junctor gas tubes are connected in a lock-out circuit associated with the line frame, as indicated by lock-out element 332, only one of said gas tubes will operate completely. Assume for example, that the gas tube in junctor 322 operates thereby selecting this junctor for use and thereby locking out junctor 323. At this time a relay in junctor 322 completes a current path through the gas diodes and the cross-point relays in switches 325 and 326 of the trunk frame and switches 319 and 320 of the line frame, and the operation of these cross-point relays completes a talking path from in-trunk 310 via links 350 and 340 to the desired subscribers station 360. Operation of a relay in line circuit 317 in series with the control lead removes from the line talking conductors the line circuit apparatus which would be used in originating a call from said called line, and the operation of a relay in incoming trunk circuit 310 in series with the control lead results in the disconnection of incoming receiver 312 from said trunk and the placing of a holding condition on the control lead associated with this path. Incoming receiver 312 is now restoring to normal releases connector 314 and number group 316.

With a complete path established from the calling subscriber's subset 210 to the called subscriber's subset 360, the calling subscriber is informed of the establishment of said path by the ringing tone connected to said calling subset by the in-trunk circuit and the called subscriber is summoned to his subset by the operation of the ringing apparatus in said called subset by the ringing power connected to said subset by the in-trunk.

When the called subscriber answers the call by removing his subset from its switchhook or cradle, a direct-current path is completed through said subset for operating a relay in the in-trunk, which relay removes the ringing power and ringing tone from the talking conductors and completes the circuit between the talking conductors to the calling subscriber and the talking conductors to the called subscriber. The in-trunk also at this time establishes a current flow condition in the talking conductor loop from said trunk to the called subscriber's subset whereby a latch mechanism in said called subset is tripped removing the signal generating apparatus in said called subset from the talking conductors and connecting the talking apparatus to said talking conductors and establishes an additional holding condition on the switch network connections under control of the direct current flowing through the called subset. The two subscribers may now engage in conversation.

When the calling and called subscribers replace their telephone sets on the switchhook or cradle at the end of the conversation, a relay in the out-trunk in the originating office and a relay in the in-trunk in the terminating office release removing the holding condition from the control lead to path established through their respective switching networks causing the release of said paths and the return to normal of the central office circuits associated with this conversational connection.

The foregoing description of a call from a subscriber in one office to a subscriber in a second office assumed that the designated called subscriber's line was idle and, therefore, described the successful establishment of a talking connection between the calling subscriber in office A and the designated idle called subscriber in office B. However, if the called subscriber's line is busy or vacant, a connection to said designated called subscriber's line is not made, and in such a case the operation of the exemplary system set forth herein is as described hereafter.

The operations of the system from the origination of a call by the calling subscriber in the first office to the test of the called line for busy-idle or vacant condition by the receiver in the second or called office, including all the operations of the control circuits in the first office in receiving the information designating the called office and in setting up a connection through the switching network of said first office to a trunk to the second or called office, and the operations of the control circuits in said called office in receiving from the calling subscriber's subset the information designating the called line number and in starting the idle-busy vacant test of said called line are, of course, the same whether the called line is idle-busy or vacant.

When the complete called line designation has been registered in incoming receiver 312, the receiver operates a relay in in-trunk circuit 310 reversing the direction of direct-current flow over interoffice loop 260 and thereby causing the operation of a polarized relay in out-trunk 255. The operation of said relay in out-trunk 255 causes the release of outward actuator 244 from the trunk circuit, and in addition, the operation of said relay in out-trunk 255, indicating that signaling has been completed, alters the circuit condition on the loop extending between said out-trunk and the calling subscriber's subset thereby tripping a latch mechanism in the calling subset which removes the signal generating apparatus in said subset from the talking conductors and connects the talking apparatus of said subset to the circuit. With the application of the subset latch tripping condition to the subscriber's line by the trunk circuit and the release of the actuator, a holding condition on the established connection through the switching network is maintained thereafter under the control of a relay in the trunk circuit operated by direct current flowing in the talking conductors and through the subset.

When the complete called line designation has been registered in incoming receiver 312, it connects itself to the subscribers' number group 316 through connector circuit 314 in lock-out, as previously described for the call to an idle line, thus acquiring for its use test and control leads from the various subscriber lines of office B. As before, over a combination of these leads associated with the designated called line number, the incoming receiver applies voltages to fire a gas tube in that particular called line circuit and, by the operation and non-operation of relays in said line test leads in the receiver associated with various discharge paths of the line gas tube, makes an idle-busy-vacant test of said line. If said line is busy, a group of these test relays operate in combination and if said called line is vacant, i. e. there is no subscriber associated with the registered called line designation, none of these relays operate. In either case, busy or vacant, register 316 operates a relay in the incoming trunk in use of the call which connects a distinctive tone to the talking conductors extending from said trunk to the interoffice conductors. In the specific embodiment of the invention as herein set forth, the same tone is used for both the busy and vacant condition; however, it is to be understood that, by providing separate busy and vacant relays in the incoming trunk and separate control leads between these relays and the receiver, a tone distinctive of each condition could have been provided.

The establishment of said busy or vacant tone condition in the incoming trunk also results in the disconnection of the incoming receiver and register 312 from said trunk and the incoming receiver and register now restores to normal and releases connector 314 and number group 316. Thus in this condition of a busy or vacant condition at the called subscriber's line, no path through the switching network between the incoming trunk and the called subscriber's line is set up.

The distinctive tone, which in the case of a busy or vacant called line has been connected from the incoming trunk circuit to the inter-office conductors, is transmitted through the path established in the originating office to the calling subscriber's subset. In the specific exemplary call previously used, establishment of this busy or vacant tone condition in in-trunk 310 causes the transmission of this tone over interoffice conductors 260 and through out-trunk 255, trunk switches 228 and 232, junctor 234, line switches 224 and 220 of office A, and subscriber's line circuit 212 to the calling subscriber's subset 210. This tone informs said calling subscriber that he can not be connected to the designated called line at the present time.

Said calling subscriber then replaces his telephone set on its switchhook or cradle thereby opening the direct current path between his subset and out-trunk and releasing a relay operated in said trunk over this path, which, in turn, removes the holding condition from the control lead through the switching network path of office A established for this call. Removal of the holding voltage from said control lead releases the path established through the switching network between said calling subscriber and the out-trunk in turn causing said line circuit and said trunk circuit to return to their normal condition. The out-trunk circuit in returning to normal opens the direct-current path extending over the interoffice conductors 260 between said out-trunk 255 and its associated in-trunk circuit 310 in the called office thereby causing the release of a relay in said in-trunk circuit and in turn the return of normal of said in-trunk circuits. The calling subscriber may then originate a new call to another subscriber by altering the setting of the finger wheels on his subset or may make a new attempt to reach the original called subscriber at a later time when he believes said called subscriber may be available.

In the foregoing description of the operation of present embodiment of the invention on a call from a subscriber in one office to a designated subscriber in a designated second office, the operation of the system has been described for the case in which an entire path to and including the called subscriber's line is idle and available, and for the case in which the called subscriber's line is busy or vacant. A third condition of operation is that in which the trunk or trunks from the calling subscriber's office to the called subscriber's office are busy or vacant. The operation of the invention in this condition of all designated trunks busy or vacant is as described hereafter.

The operations of the system from the origination of a call by the calling subscriber in the first office to the test of the trunks to the designated called office, including all the operations of the control circuits in the first office in receiving from the calling subscriber's subset the information designating the called office and in starting the idle-busy-vacant test of the trunks to said called office, are, of course, the same whether said trunks are idle-busy or vacant.

When the originating receiver and register 215 of the calling subscriber's own office has registered the symbols or numbers designating a second or called central office, it connects itself through connector circuit 216 in lockout to the trunk number group 218 as previously described for a call to an idle trunk, thus acquiring for its use test and control leads from cold cathode gas tubes located in the trunk number group and associated with the various trunk groups and control leads to the trunk outlets of these various trunks on the switching network. As before, over a combination of these control leads which is associated with the trunk group to the designated called office and its code as registered in the receiver, the receiver applies voltages to fire the gas tube associated with said designated trunk group. The operation or non-operation of relays in the receiver in series with the leads over which the trunk group gas tube was fired indicates the condition of various discharge paths in said gas tube and thus indicates that there are idle trunks in the group, that all the trunks in the group are busy or that the designated trunk group is vacant. If all the trunks of the group being tested are busy, a group of the test relays in the receiver operate in combination and if the trunk group is vacant, i. e. there is no trunk group corresponding to the registered trunk code, none of the test relays operate. In this case of either a busy or vacant indication, register 215 fires another gas tube in the trunk number group associated with busy tone trunk 245, or with a group of such trunks. The operation of the busy tone trunk-group gas tube places voltage on the control lead to the busy tone trunks which passes through said trunk circuits and connects to the control lead appearances of the idle trunks in said group at the primary switches of the trunk frames. At the same time, voltage is connected by the originating receiver and register 215 to the calling line circuit and then to the appearance of the control lead of this calling line at the primary line switch of the switch network. As described hereinbefore for the case of a connection from the calling line to an idle trunk to the called office, the voltage applied to the primary trunk switch control lead fires gas diodes in the primary and secondary switches of the trunk frame to various junctor circuits thereby providing through said diodes and their associated cross-point relay windings individual circuits indicating all the idle paths between the trunk appearance or appearances and the junctor circuits. Similarly, the voltage applied to the control lead of the primary line switch appearance of the calling line fires gas diodes in the primary and secondary switches of the line frame indicating all the idle paths between said line circuit and various junctor circuits. Assume as before that the calling subscriber's station is 210; in which case, voltage is applied to the control lead of line circuit 212 and in turn to the right vertical of primary switch 220 on line frame 219, and gas diodes in switches 220, 224 and 225 become ionized to indicate that idle paths exist between said calling line and junctors 234, 235, 239, and 237 together with other similar idle paths not shown in detail. Since the trunk to be used for this busy or vacant condition of the designated trunks is busy tone trunk 245, a voltage is applied to the left vertical of primary switch 248 of trunk frame 246 in turn firing gas diodes in primary switch 248 and secondary switches 249 and 250 indicating idle paths between said trunk and junctors 238, 235, 240 and 237 together with other similar idle paths not shown in detail. Of this group of junctors to which voltage markers extend, only junctors 235 and 237 are marked from both the line and trunk sides of the switching network and are thus the only ones associated with possible complete paths between the calling subscriber 210 and the busy tone trunk 245. In recognition of this condition, a cold cathode gas tube in each of said junctors 235 and 237 starts to operate in order to complete a connection; however, since these said junctor gas tubes are connected in a lock-out circuit associated with the line frame 219, as indicated by lockout element 242, only one of said gas tubes will operate completely. Assume, for example, that the gas tube in junctor 235 operates thereby selecting this junctor for use and thereby locking out junctor 237. At this time a relay in junctor 235 completes a current path through the gas diodes and the windings of the cross-point relays in switches 220 and 224 of the line frame and switches 248 and 249 of the trunk frame, and the operation of these cross-point relays completes the talking conductor path from the calling line 210 to the busy tone trunk 245. A relay in line circuit 212, associated with the control lead and operating in series with the cross-point relays of the line frame, disconnects the originating actuator 214 and originating receiver 215 from the talking conductors and control lead of said line circuit. Originating receiver 215 in now restoring to normal releases connector 216 and trunk number group 218 which in turn removes the voltage applied to the control lead of busy tone trunk 245. Completion of the talking conductor path from the calling subscriber's station to trunk 245 by the operation of the cross-point relays operates a relay in said trunk which places a holding condition on the control lead through the switching network associated with this path under control of the direct-current path through subscriber's subset. Completion of the talking path to said trunk also established a current flow condition in the talking conductor loop from said trunks through the switching network to the calling subscriber's subset 210 whereby a latch mechanism in said calling subset is tripped which removes the signal generating apparatus in said subset from the talking conductors and connects the talking apparatus of said subset to said talking conductors. In addition, busy tone trunk 245 connects a distinctive tone to the talking conductors extending to the calling subscriber subset which informs said calling subscriber that he can not be connected to the designated called office at the present time.

Said calling subscriber recognizing the tone then replaces his telephone set on its switch-hook or cradle thereby opening the direct current path between his subset and the busy tone trunk and releasing his subset and the busy tone trunk and releasing a relay operated in said trunk over this path which, in turn, removes the holding condition from the control lead through the switching network. Removal of the holding voltage for said control lead releases the path established through the switching network between said calling subscriber and the busy tone trunk, in turn, causing said calling line circuit and said trunk circuit to return to their normal condition. The calling subscriber may then originate a new call to another subscriber by altering the setting of the finger wheels on his subset or may make a new attempt to reach the original called subscriber's office at a later time when he belives a path may be available.

The foregoing description has covered the general operation of the circuits and equipment in an exemplary embodiment of the invention for the case of a call from a subscriber in one office, such as office A in Fig. 2, to a called subscriber in a second office, such as office B in Fig. 3, including not only the successful establishment of the connection resignated by the calling subscriber but also the alternate operations of the exemplary system in case said designated connection cannot be established because the called subscriber's line is busy or because all the trunks to the designated called office are busy. The operation of the exemplary embodiment of the invention will next be described for the case of a call from one subscriber in one office, such as office A of Fig. 2, to a second called subscriber in the same office as said calling subscriber.

Briefly, the operation is similar to that described for a call between two offices except that the designated out-trunk to which a path is established is one which is connected to an in-trunk in its own office and thus the subsequent operations for terminating the call to the designated called subscriber occur in the circuits of the originating office rather than in a second office as in the previously described case. Considering such an interaoffice call in more detail a description will now be made of the establishment of a connection between one subscriber in office A of Fig. 2 and a second designated called subscriber in the same office for the conditions in which the apparatus and circuit paths required for the connection are idle and available.

Assume, for example, that the subscriber provided for subset 210 desires to make a call to the subscriber with subset 282. The subscriber at subset 210 first presets the signal generating apparatus in said subset in accordance with the numbers of symbols representing the designation of the called subscribers station, to which he desires to establish connection, by means of finger wheels or other manually settable digit selectors provided on the subset, one such finger wheel for each symbol that may be required to designate a station. A suitable form of subscribers' station equipment with which the exemplary embodiment set forth herein is designed to cooperate is more fully disclosed in the co-pending application of Hill and Parkinson, filed on September 10, 1949, Serial No. 115,016. The disclosures in the above copending application are hereby made a part of the present disclosures as if set forth herein in full. With the complete desired number preset, the subscriber removes the telephone set from its cradle or switch-hook thereby completing a direct-current circuit over conductors 211 for the operation of a relay in line circuit 212 associated with this station. The operation of said line relay causes the operation of another relay in line circuit 212 for connecting originating actuator 214 and receiver 215 to and for removing said original direct-current line relay from the conductors 211 connecting said calling subset to the office. The operation of said relay for connecting said calling line to the originating actuator 214 and receiver 215 is made in conjunction with a cold cathode gas tube associated with the line circuit and connected in lock-out with other similar gas tubes in other line circuits as indicated by lock-out element 213 so that in the event two or more subscribers simultaneously remove their telephone sets from the cradle or switchhook only one of such subscribers will be immediately connected to said originating actuator and all other of said calling stations will be temporarily held with only their direct-current line relays operated awaiting access to said originating actuator and receiver until the first selected subscriber has been served. The types of gas tube lock-out circuits employed in the present embodiment of the invention and the operation of these lock-outs are set forth more fully in the United States Patent 2,350,888 granted to N. I. Hall on June 6, 1944.

Assume the subscriber subset 210 has been connected by a line circuit 212 to originating actuator 214 for the establishment of the call, 45-cycle alternating current is supplied from said actuator to said calling subscriber subset causing signaling generating apparatus in said subset to generate dialing signals representing the called subscriber station designation as preset on the finger wheels of said calling subscribers subset. These dialing signals are generated at the rate of 90 digits per second, that is, one symbol or number for each ½ cycle of the 45-cycle power transmitted from actuator 214. A complete designation might consist, for example, of 3 symbols or numbers designating the called subscribers central office, 4 digits designating the called subscriber's line number in said office and an additional symbol designating the party letter of the called subscriber associated with said called line number. Under control of the actuator these eight symbols or numbers designating the called subscriber are rapidly generated repetitively, each complete cycle being separated from adjacent repetitions by a time interval equal to 2 digits. Thus, a complete transmission of the called station designation is made every ⅑ of a second after the originating actuator has been connected to said calling subscriber's station. Associated with the originating actuator 214 is the originating receiver and register circuit 215. During the intervals in which an actuator is supplying alternating current power to a calling subscriber's subset, the connection between the calling line circuit and the central office switching and control equipment is held under control of a monitoring detector in the alternating current power path so that, if the calling subscriber returns his telephone set to its cradle or switchhook during such an interval, the interrpution of this flow of power current through the subset will result in the release of the connections thus far established for the call and the return to normal of all the associated circuits.

Said originating receiver examines the dialing signals generated in the calling subscriber's subset and transmitted to the receiver via conductors 211 through the line circuit 212 and the originating actuator 214. Said receiver detects the occurrence of the blank interval between repetitions of the called station designation as an indication of the beginning of such a station designation. Having detected this interval, it then proceeds to decode and register the numbers or symbols represented by the subsequent dialing signals. The receiver and register circuit employed at this point in the present embodiment of the invention may be of the type disclosed in the copending application of Malthaner et al. Serial No. 68,234 filed on or about December 30, 1948, of the type disclosed in Malthaner et al. Serial No. 35,924, filed June 29, 1948.

In the present embodiment of the invention said originating receiver is arranged to decode and register only those symbols or numbers which designate the called central office and, as in the example mentioned above, such central office designation is commonly made by three symbols or numbers which ordinarily will be arranged to occur at the beginning of each complete number transmission from a subset. When receiver 215 has registered the symbols or numbers designating the called central office, it connects itself through connector circuit 216, which is connected in lock-out with other connectors as indicated by lock-out element 217, to the trunk number group 218 for locating an idle-trunk to the designated office by means of cold cathode gas tubes included in the trunk number group. Lock-out is required between connector 216 and other similar connectors, such as 267, by the one-at-a-time operation of the switching network. The method of testing for idle paths through the switching network and the selection of such an idle path for use in a connection, as set forth hereinafter for the present embodiment of the invention, requires that such testing and selection of paths through the switching network be performed on a one-at-a-time basis. Further, the testing and selection of paths through the switching network may be performed either by receiver 215 with number group 218 or by receiver 266 with number group 268; thus, the lock-out arrangement between the connectors is provided to insure that only one receiver and number group makes tests and selections on the switching network at one time. The speed of operation of the present embodiment of the invention, however, is such that this one-at-a-time operation does not constitute a practical restriction on the general use of the system. An idle-busy-vacant test is made of the trunks in the designated trunk group and if there is one or more trunks idle in the said designated trunk group, a relay in receiver 215 applies voltage to a control lead associated with said trunk group which passes through the trunk circuits in said group and connects to the control lead appearances associated with idle trunks in said group at the trunk side of the switching network of the central office. Assume, for example, that the called office designated by the number preset on the calling subscriber's subset and registered in receiver 215 designates that the desired called subscriber is also in office A. By way of example two circuits are shown in Fig. 2 for the establishment of calls originating in office A for other subscribers in the same office. One such circuit, for example, comprises out-trunk 256, conductors 262 and in-trunk circuit 257. Thus in this case, with out-trunks 256 and 258 both idle, voltage is connected from the receiver through these trunks to the appearance of their control leads at the left vertical of primary trunk switch 229 of trunk frame 227 and the left vertical of primary trunk switch 247 of trunk frame 246 respectively. If one of the out-trunks in this designated trunk group is in use in the path of a previously established connection, voltage is connected only to the switching network appearance of the idle trunk. At about the same time, voltage is connected from the originating receiver and register 215 through actuator 214 to the calling line circuit 212 and then to the appearance of this calling line at the right vertical of primary line switch 220 of line frame 219 of the switching network.

In the particular exemplary call being described it is assumed that out-trunks 256 and 258 are found available for service and that calling subscriber station 210 desires connection to one of these trunks. Voltage is applied on the switch control lead associated with this calling line at the right vertical inlet of primary switch 220 on line frame 219. This voltage fires gas diodes between this vertical line switch input and the control lead to each idle horizontal outlet of the primary switch. Assuming in this case that line frame 219 is completely idle, gas diodes between the aforementioned primary line switch control lead input and the control lead outlet to each secondary switch fires, thereby altering the voltage condition on the control leads associated with the primary-secondary link paths 222 and 223. This altered link voltage, in turn, fires gas diodes in the secondary switches between the said link control leads, to which primary gas tubes have been fired, and each associated secondary line switch output path. Thus in the case of a completely idle line frame, gas tubes are fired in the primary and secondary switches completing a control lead path from the input terminal associated with line circuit 212 to line link path 222 to junctor 234, along similar individual idle paths from the same said line circuit to junctors 235, 236 and 237, and along other similar paths not shown in detail. In a similar manner, the voltage applied to the control lead of the right primary vertical of trunk switch 229 associated with one of the desired out-trunks, 256, fires gas diodes of the primary and secondary trunk frame switches and in the case of completely idle trunk frames, thereby establishes a connection through said fired diodes between said primary vertical control lead, via link path 258 to junctor 234, other similar connections from the same said trunk vertical along similar individual paths to junctors 239, 236 and 241 and along other similar paths not shown in detail. Similarly, the voltage applied to the other out-trunk, 258, fires gas diodes in the primary and secondary switches of its trunk frame and in the case of a completely idle trunk frame, establishes a connection through said fired diodes between the trunk appearance on the right primary vertical of trunk switch 247 along link 252 to secondary switch 250 and to junctor 240, along other similar paths from the same said trunk vertical to junctors 238, 235 and 237, and along other similar paths not shown in detail. If any of the link or junctor sections of any of the above described paths through the switching network is in use as part of a previous established connection, the voltage, established by virtue of the holding condition on the control lead of such busy sections, as hereinafter described, is such that the gas diodes will not fire between said busy sections and the adjacent sections to which voltage marks have been extended. Of the various idle line frame and trunk frame paths now marked by ionized gas diodes and shown in detail on the drawing, only the paths with which junctors 235, 237 are associated form possible complete paths between calling line circuit 212 and one of the desired trunks, namely, 258, whereas junctors 234 and 236 are associated with possible complete paths between the said calling line circuit and the other available desired out-trunk 256. The other junctor circuits which had been marked from the trunk side of the switch network, for example 241, terminate at line frames other than line frame 219 on which the calling line appears. Junctor circuits 234, 235, 236 and 237, by means of the combination of altered voltages on the two control leads connected to to each said junctor, reach recognize that they are associated with a possible complete desired path through the switching network and start to function to complete this path. A cold cathode gas tube in each of these junctors is connected in a lock-out circuit associated with the line frame as indicated by lock-out element 242 so that the only one of said junctors will succeed in fully operating. Assume for example, that in this case junctor 234, is taken into service and that the other junctors associated with this line frame are locked out. This lock-out arrangement of selecting an idle path through the switching network in this case selects not only such a path but also selects one trunk from the group of idle trunks available for use in the call. This feature of automtic selection of trunks within a trunk group is made possible by the switching network plan employed in this system if the trunks in a common group are distributed over the trunk frames of the office in such a way that only one trunk of a group appears on each trunk frame.

With junctor 234 selected for service in the call, a relay in said junctor completes a circuit through the gas diodes and cross-point relay coils associated with the control lead path from the calling line to this junctor causing sufficient current to flow in said path to operate said cross-point relays. A similar current flow circuit is completed in the control lead path from junctor 234 through the primary and secondary cross-point relays and diodes of trunk frame 227 to out-trunk 256 for operating the cross-point relays associated with this path. The operation of these four cross-point relays completes a talking connection between said calling subscriber station 210 and out-trunk 256. A relay in line circuit 212, associated with the control lead and operating in series with the line frame cross-point relays, disconnects the originating actuator 214 and the originating receiver 215 from the talking conductors and control lead of said calling line. Originating receiver 215 in now restoring to normal releases connector 216 and trunk number group 218 which in turn removes the voltage applied to the control lead of out-trunks 256 and 258. Completion of the talking path from said calling subscriber's station by the operation of said cross-point relays operates a relay in the out-trunk circuit which places a holding condition on the control lead through the switching network associated with this path. In addition, said out-trunk 256 connects outward actuator 244, which is common to a plurality of out-trunks, to the taking conductors of said path by means of a relay and gas tube in said out-trunk, which gas tube, as indicated by common element 243, is in a lock-out arrangement with similar gas tubes in other out-trunks in the same actuator group so that, in the event of a simultaneous attempt to connect said actuator to more than one trunk, one trunk will be connected and the other trunks locked out. Other outward actuators, not shown in detail, may simultaneously be connected to other out-trunks which are in different actuator groups. The actuator supplies 45-cycle power through said out-trunk and over said talking connection through the line and trunk switches to the calling subscriber's subset 210, so that this subset continues to generate repetitively the complete cycle of dialing signals representing the called destination. Out-trunk circuit 256 also completes a direct current circuit over the local loop 262 for the operation of a relay in in-trunk 257. The operation of this relay in in-trunk 257 causes the connection of the incoming receiver and register circuit 266 to said trunk, such connection being established by the use of the cold cathode gas tube in each in-trunk circuit connected in lock-out with similar gas tubes in other in-trunk circuits which may simultaneously be attempting to connect to receiver 266 as indicated by common element 265. Incoming receiver 266, when connected to in-trunk 257, receives over the established connection to the calling subscribers subset generating equipment the dialing signals representing the complete called station designation. Said receiver detects the blank interval occurring between repetitions of the called number as an indication of a start of a transmission of such number, then recognizes the occurrence of the symbols or numbers representing the desired office without decoding or registering this office code information, and then registers the succeeding signals designating the called subscriber's line number and party letter. The receiver and register circuit employed at this point in the present embodiment of the invention may be of the type disclosed in the copending applications Malthaner et al. Serial No. 68,234 filed on December 30, 1948, and Malthaner et al. Serial No. 35,924 filed June 29, 1948.

When the complete number designating the called subscriber has been received by receiver 266, the receiver operates a relay in in-trunk 257 reversing the direction of direct current flow over the local leads 262 and thereby causing the operation of a polarized relay in out-trunk 256. The operation of said relay in out-trunk 256 causes the release of outward actuator 244 from the trunk circuit and in addition the operation of said relay in out-trunk 256, indicating that signaling has been completed, alters the circuit conditions on the loop extending between said out-trunk and the calling subscriber's subset thereby tripping a latch mechanism in the calling subset which removes the signal generating apparatus in said subset from the talking conductors and connects the talking apparatus of said subset to the circuit. With the application of the subset latch tripping condition to the subscriber's line by the trunk circuit and the release of the actuator, a holding condition on the established connection through the switching network is maintained thereafter under the control of a relay in the trunk circuit operated by direct current flowing in the talking conductors and through the subset. When the particular called line designation has been received by the incoming receiver 266 it connects itself to the subscribers' number group 268 through connector circuit 267 in lock-out thus acquiring for its use the test and control leads from the various subscribers' lines of office A. Over a combination of these leads associated with the designated called line number, the incoming receiver 266 applies voltages to fire a gas tube in that particular called line circuit and by the operation and non-operation of relays, in the line test leads in the receiver associated with the various discharge paths of the line gas tube, makes an idle-busy-vacant test of said line. If said line is idle, one of these relays operates and the receiver supplies voltage for the further operation of the line circuit gas tube which, in turn, places a voltage mark on the control lead to the primary switch appearance of said line and at the same time the operation of the relay in the register 266 also connects a voltage to the incoming trunk which is to be connected to the designated line. These voltages applied to the designated in-trunk and called line appearances at the switching network start the sequence of operations whereby idle paths between said trunk and said line are located, and one of said idle paths is used in establishing the desired connection. In addition to applying these switching network control voltages when called line is found to be idle, the receiver also operates a relay in the in-trunk circuit which connects ringing power to the talking conductors at the called subscriber's end of the trunk and ringing tone of the talking conductors extending to the calling subscriber's subset.

The voltage from the register to the in-trunk is connected, in turn, to the control lead of the primary trunk switch on which said trunk appears. The voltage thus applied to said primary trunk switch control lead fires gas diodes in the primary and secondary switches of the trunk frame to various junctor circuits thereby providing through said diodes and their associated cross-point relay windings individual circuits indicating all the idle paths between this trunk appearance and various junctor circuits in a manner similar to that described for office A on the originating part of the call. Similarly, the voltage applied to the control lead of the primary line switch appearance of the desired called line fires gas diodes in the primary and secondary switches of this line frame indicating all the idle paths between said line circuit and various junctor circuits.

It was assumed for example, that the desired subscriber station is 282 in which case voltage is applied to the control lead of line circuit 280 and in turn to the right vertical of primary switch 272 on line frame 270 and gas diodes in primary switch 272 and secondary switches 273 and 274 become ionized to indicate that possible idle paths exist via links 276 and 277 between said called line and junctors 238 and 239, 240 and 241 provided said links or junctors are not in use as part of a previously established connection. Other similar marking paths not shown in detail are similarly established. Since the in-trunk for this call was assumed to be 257, the voltage mark is applied to the right vertical of primary switch 228 of trunk frame 227 in turn firing gas diodes in primary switch 228 and secondary switches 232 and 233 indicating idle paths via links 231 and 230 to junctors 234, 236, 239 and 241 provided said links or junctors are not in use as part of a previously established connection, and along other similar paths not shown in detail. If any of the link or junctor sections of any of the above described paths through the switching network is in use as part of a previous established connection, the voltage, established by virtue of the holding condition on the control lead of such busy sections as hereinafter described, is such that the gas diodes will not fire between said busy sections and the adjacent sections to which voltage marks have been extended.

Of this group of junctors to which voltage marks extend, only junctors 239 and 241 are marked from both the line and trunk sides of the switching network and are thus the only ones associated with complete paths between said in-trunk 257 and said designated called line 282. In recognition of this voltage marking condition, a cold cathode gas tube in each of said junctors 239 and 241 starts to operate in order to complete the connection. However, since these said junctor gas tubes are connected in a lock-out circuit associated with the line frame as indicated by lock-out element 279, only one of said gas tubes will fully operate. Assume for example, that the gas tube in junctor 241 operates thereby selecting this junctor for use and thereby locking out junctor 239. At this time, a relay in junctor 241 completes a current path through the gas diodes and cross-point relays in switches 233 and 226 of the trunk frame and switches 274 and 272 of the line frame and the operation of these four cross-point relays completes a talking path from in-trunk 257 via links 231 and 277 to the desired subscriber's station 282. The operation of a relay in line circuit 280 in series with the control lead removes from the line talking conductors the line circuit apparatus which would be used in originating a call from said called line and the operation of a relay in incoming trunk 257 in series with the control lead results in the disconnection of the incoming receiver 266 from said trunk and the placing of a holding condition under control of the direct current flow in the interoffice conductors on the control lead associated with this talking path. At this time, the direction of direct current flow over the talking conductors between the in-trunk and the out-trunk is returned to its original direction thereby releasing the polar relay in the out-trunk. Incoming receiver 266 is now restoring to normal releases connector 267 and number group 268.

With a complete path established from calling subscriber's subset 210 to the calling subscriber, the calling subscriber is informed of the establishment of such a path by the ringing tone transmitted to said calling subset by the in-trunk circuit and the called subscriber is summoned to his subset by the operation of the ringing apparatus in said called subset by the ringing power connected to said subset by the in-trunk. When the called subscriber answers the call by removing the subset from its switchhook or cradle, a direct current path is completed through said subset for operating a relay in the in-trunk which relay removes the ringing power and ringing tone from the talking conductors, completes the circuit between the talking conductors to the calling subscriber and the talking conductors to the called subscriber and establishes an additional holding condition on the switch network connections under control of the direct current flowing through the called subset. The in-trunk at this time again reverses the direction of direct-current flow over the talking conductors to the out-trunk thereby reoperating the polar relay in the out-trunk as an indication that the calling subscriber may be charged for the call. The in-trunk also at this time establishes current flow condition in the talking conductor loop from said in-trunk to the called subscriber's subset whereby a latch mechanism in said called subset is tripped removing the signaling generating apparatus in said called subset from the talking conductors and connecting the talking apparatus in said subset to said talking conductors. The subscribers may now engage in conversation.

When the calling and called subscribers replace their telephone sets on the switchhook or cradle at the end of the conversation, a relay in out-trunk 256 and a relay in in-trunk 257 release removing respectively the holding conditions from the control lead to the path established through their respective sections of the switching network causing the release of said paths and the return to normal of the central office circuits associated with this conversational connection.

It is to be understood that the method of self-selection of an out-trunk within a group of out-trunks to the same destination by the operation of a path-selecting gas tube in the junctor circuits of the switching network can be applied to any such group of trunks whether such group terminates in in-trunk circuits of its own office as described in the just preceding section or whether such out-trunks terminate in a second office as described previously for a call between office A and office B. In the specific embodiment of the invention here disclosed only one trunk circuit is shown connecting from office A to office B, although additional interoffice trunk circuits could obviously be provided in which case the above-described method of self-selection within the trunk group would also be employed for this group of trunks.

The foregoing description of a call from a subscriber in office A to another called subscriber in the same office assumed that the designated called subscriber's line was idle and, therefore, described the successful establishment of a talking connection between the calling subscriber in office A and the designated idle called subscriber also in office A. However, if the called subscriber's line is busy or vacant, a connection to said designated called subscriber's line should not be made and in such a case the operation of the exemplary system is as described hereafter.

The operations of the system from the origination of a call by the calling subscriber in the office to the test of the called line for busy-idle or vacant condition by the incoming receiver 266 in the office, including all the operations of the control circuits in the office in receiving in receiver 215 the information designating the called office and in setting up a connection through the switching network of said office to an out-trunk to the called office and the operations of the control circuits in said called office in receiving from the calling subscriber's subset the information designating the called line number and in starting the idle-busy vacant test of said called line, are, of course, the same whether the called line is idle-busy or vacant.

When the complete called line designation has been received by the incoming receiver 266, it operates a relay in in-trunk circuit 257 reversing the direction of direct-current flow in the local leads 262 and thereby causing the operation of a polarized relay in out-trunk 256. The operation of said relay in out-trunk 256 causes the release of outward actuator 244 from the trunk circuit and in addition the operation of said polar relay in out-trunk 256, indicating that signaling has been completed, alters the circuit conditions on the loop extending between the out-trunk and the calling subscriber's subset thereby tripping a latch mechanism in the calling subset which removes the signal generating apparatus in the subset from the talking conductors, connects the talking apparatus of the subset to the circuit, and places the holding of the established connection under the control of the direct current flowing through the calling subset. In addition when the complete called line designation has been received by the incoming receiver 266, it connects itself to the subscriber's number group 268 through connector circuit 267 in lock-out, as previously described for the call to an idle line, thus acquiring for its use test and control leads from the various subscriber's lines of office A. As before, over a combination of these leads associated with the designated called line number, the incoming receiver applies voltages to fire a gas tube in that particular called line circuit and by the operation and non-operation of relays in said line test leads in the receiver associated with various discharge paths of the line gas tube makes an idle-busy-vacant test of said line. If said line is busy, a group of these test relays operate in combination and if said called line is vacant, i. e. there is no subscriber associated with the registered called line designation, none of these relays operate. In either case, busy or vacant, register 266 operates a relay in the incoming trunk in use on the call, which connects a distinctive tone to the talking conductors extending from said trunk to the local intertrunk conductors. In the specific embodiment of the invention as herein set forth, the same tone is used for both the busy and vacant condition; however, it is to be understood that, by providing separate busy and vacant relays in the incoming trunk and separate control leads between these relays and the receiver, a tone distinctive of each condition could have been provided.

The establishment of said busy or vacant tone condition in the incoming trunk also results in the disconnection of the incoming receiver and register 266 from said trunk and the incoming receiver and register now restores to normal and releases connector 267 and number group 268. Thus in this condition of a busy or vacant condition at the called subscriber's line, no path through the switching network between the incoming trunk and the called subscriber's line is set up.

The distinctive tone, which in the case of a busy or vacant called line has been connected from the incoming trunk circuit to the intertrunk conductors, is transmitted through the path established in the originating office to the calling subscriber's subset. In the specific exemplary call previously used, establishment of this busy or vacant tone condition in in-trunk 257 causes the transmission of this tone over conductors 262 and through out-trunk 256, trunk switches 229 and 232, line switches 224 and 220 of office A, and subscriber's line circuit 212 to the calling subscriber's subset 210. This tone informs said calling subscriber that he cannot be connected to the designated called line at the present time.

Said calling subscriber then replaces his telephone set on its switchhook or cradle thereby opening the direct-current path between his subset and out-trunk and releasing a relay operated in said trunk over this path which, in turn, removes the holding condition from the control lead through the switching network path of office A established for this call. Removal of the holding voltage from said control lead releases the path established through the switching network between said calling subscriber and the out-trunk in turn causing said line circuit and said trunk circuit to return to their normal condition. The out-trunk circuit in returning to normal opens the direct-current path extending over the conductors 262 between said out-trunk 256 and its associated in-trunk circuit 257 in the office thereby causing the release of a relay in said in-trunk circuit and, in turn, the return to normal of said in-trunk circuits. The calling subscriber may then originate a new call to another subscriber by altering the setting of the finger wheels on his subset or may make a new attempt to reach the original called subscriber at a later time when he believes said called subscriber may be available.

In the foregoing description of the operation of the present embodiment of the invention on a call from one subscriber in office A to a second designated subscriber in the same office, the operation of the system has been described for the case in which an entire path to and including the called subscriber's line is idle and available, and for the case in which the called subscriber's line is busy or vacant. A third condition of operation is that in which the out-trunk or trunks from the office to the in-trunk or trunks of the same office are busy or vacant. The operation of the invention in this condition of all designated trunks busy or vacant is as described hereafter.

The operations of the system from the origination of a call by the calling subscriber in the office to the test of the trunks to the designated called office, including all the operations of the control circuits in the office in receiving from the calling subscriber's subset the information designating the called office and in starting the idle-busy-vacant test of the trunks to said called office, are of course, the same whether said trunks are idle-busy or vacant.

When the originating receiver and register 215 of the calling subscriber's own office has registered the symbols or numbers designating the second or called central office, it connects itself through connector circuit 216 in lock-out to the trunk number group 218 as previously described for a call to an idle trunk, thus acquiring for its use test and control leads from cold-cathode gas tubes located in the trunk number group and associated with the various trunk groups and control leads to the trunk outlets of these various trunks on the switching network. As before, over a combination of these control leads which is associated with the trunk group to the designated called office and its code as registered in the receiver, the receiver applies voltages to fire the gas tube associated with said designated trunk group. The operation or non-operation of relays in receiver in series with the leads over which the trunk group gas tube was fired indicates the condition of various discharge paths in said gas tube and thus indicates that there are idle trunks in the group, that all the trunks in the group are busy, or that the designated trunk group is vacant. If all the trunks of the group being tested are busy, a group of the test relays in the receiver operate in combination and if the trunk group is vacant, i. e. there is no trunk group corresponding to the registered trunk code, none of the test relays operate. In this case of either a busy or vacant indication, register 215 fires another gas tube in the trunk number group 218, associated with a busy-tone trunk 245, or with a group of such trunks. The operation of the busy-tone trunk group gas tube places voltage on the control lead to the busy-tone trunks which passes through said trunk circuits and connects to the control lead appearances of the idle trunks in said group at the primary switches of the trunk frames. At the same time, voltage is connected by the originating receiver and register 215 to the calling line circuit and then to the appearance of the control lead of this calling line at the primary line switch of the switch network. As described hereinbefore for the case of a connection from the calling line to an idle trunk to the called office, the voltage applied to the primary trunk switch control lead fires gas diodes in the primary and secondary switches of the trunk frame to various junctor circuits thereby providing through said diodes and their associated cross-point relay windings individual circuits indicating all the idle paths between this trunk appearance and the junctor circuits. Similarly, the voltage applied to the control lead of the primary line switch appearance of the calling line fires gas diodes in the primary and secondary switches of the line frame indicating all the idle paths between said line circuit and various junctor circuits. Assume as before that the calling subscriber's station is 210, in which case voltage is applied to the control lead of line circuit 212 and in turn to the right vertical of primary switch 220 on line frame 219, and gas diodes in switches 220, 224 and 225 become ionized to indicate that idle paths exist between said calling line and junctors 234, 235, 236 and 237 as well as other similar paths not shown in detail. Since the trunk to be used for this busy or vacant condition of the designated trunks is busy-tone trunk 245, a voltage is applied to the right vertical of primary switch 248 of trunk frame 246 in turn firing gas diodes in primary switch 248 and secondary switches 249 and 250 indicating idle paths between said trunk and junctors 238, 235, 240 and 237 as well as other similar paths not shown in detail. Of this group of junctors shown to which voltage markers extend, only junctors 235 and 237 are marked from both the line and trunk sides of the switching network and are thus the only ones shown which are associated with possible complete paths between the calling subscriber 210 and the busy-tone trunk 245. In recognition of this condition, a cold-cathode gas tube in each of said junctors 235 and 237 starts to operate in order to complete a connection; however, since these said junctor gas tubes are connected in a lock-out circuit associated with the line frame 219, as indicated by lock-out element 242, only one of said gas tubes will operate completely. Assume, for example, that the gas tube in junctor 235 operates thereby selecting this junctor for use and thereby locking out junctor 237. At this time a relay in junctor 235 completes a current path through the gas diodes and the windings of the cross-point relays in switches 220 and 224 of the line frame and switches 248 and 249 of the trunk frame, and the operation of these cross-point relays completes the talking conductors path from the calling line 210 to the busy-tone trunk 245. A relay in line circuit 212, associated with the control lead and operating in series with the cross-point relays of the line frame, disconnects the originating actuator 214 and originating receiver 215 from the talking conductors and control lead of said line circuit. Originating receiver 215 is now restoring to normal releases connector 216 and trunk number group 218 which in turn removes the voltage applied to the control lead of busy-tone trunk 245. Completion of the talking conductor path from the calling subscriber's station to trunk 245 by the operation of the cross-point relays operates a relay in said trunk which places a holding condition under control of the direct current flowing through the calling subset on the control lead through the switching network associated with this path. Completion of the talking path to said trunk also establishes a current flow condition in the talking conductor loop from said trunks through the switching network to the calling subscriber's subset 210 whereby a latch mechanism in said calling subset is tripped which removes the signal generating apparatus in said subset from the talking conductors and connects the talking apparatus of said subset to said talking conductors. In addition, busy-tone trunk 245 connects a distinctive tone to the talking conductors extending to the calling subscriber subset which informs said calling subscriber that he cannot be connected to the designated called office at the present time.

Said calling subscriber recognizing the tone then replaces his telephone set on its switchhook or cradle thereby opening the direct-current path between his subset and the busy-tone trunk and releasing his subset and the busy-tone trunk and releasing a relay operated in said trunk over this path which, in turn, removes the holding condition from the control lead through the switching network. Removal of the holding voltage for said control lead releases the path established through the switching network between said calling subscriber and the busy-tone trunk, in turn, causing said calling line circuit and said trunk circuit to return to their normal condition. The calling subscriber may then originate a new call to another subscriber by altering the setting of the finger wheels on his subset or may make a new attempt to reach the original called subscriber's office at a later time when he believes a path may be available.

Having described the general arrangement and functioning of the invention, the operation of the present embodiment will now be described in more detail for various types of calls with reference to Figs. 5 to 40. Fig. 4 shows how the above figures should be placed in relation to one another to completely disclose the invention. Figs. 5 to 22 show the apparatus and circuits of one central office, and Figs. 23 to 40 show a similar arrangement of apparatus and circuits for a second associated central office.

Figure 6:
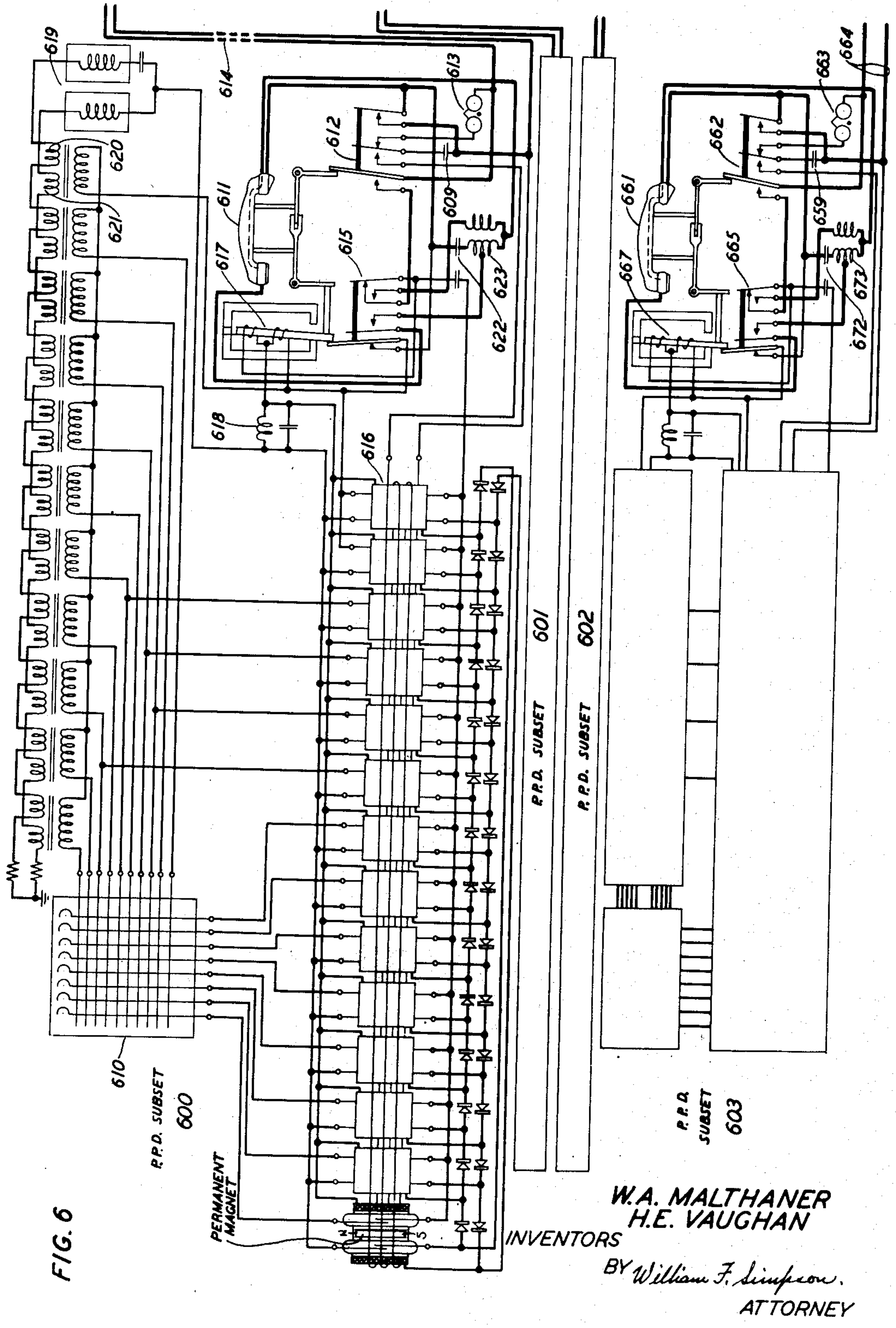

Fig. 6 shows four subscriber subsets including one subset 600 in detail which may be in accordance with the disclosures in patent application of Hill-Parkinson filed September 10, 1949, Serial No. 115,016 filed on same date herewith. When the subscriber with subset 600 places a call, he first sets up the desired number on the finger wheels or other manually settable selectors associated with digit selector switch 610, thereby making a connection between each vertical digit wire and the corresponding desired horizontal digital value busses.

At and before this time a charge is maintained on the ringer capacitor 609 by the negative battery in the central office. After the number is preset the subscriber lifts the handset 611 from the cradle so that switchhook contacts 612 are operated which close the tip and ring of the subscriber's line 614 through the switchhook contacts 615, which are maintained in the position shown in the drawing, to the signal generating apparatus of the subset. At the same time the ringer capacitor 609 is transferred to a discharge path through the bias coils 616 surrounding the relays of the stepping chain. This discharge kick is necessary to insure that the stepper starts operating in its proper mode. The discharge current from the ringing capacitor positions one relay in an operated position and all the other relays of the stepping chain in an unoperated position.

A direct-current path to the central office is established over the line 614 through the operated contacts 612, the mechanically held contacts 615, and the winding of the latch magnet 617.

Figure 8:
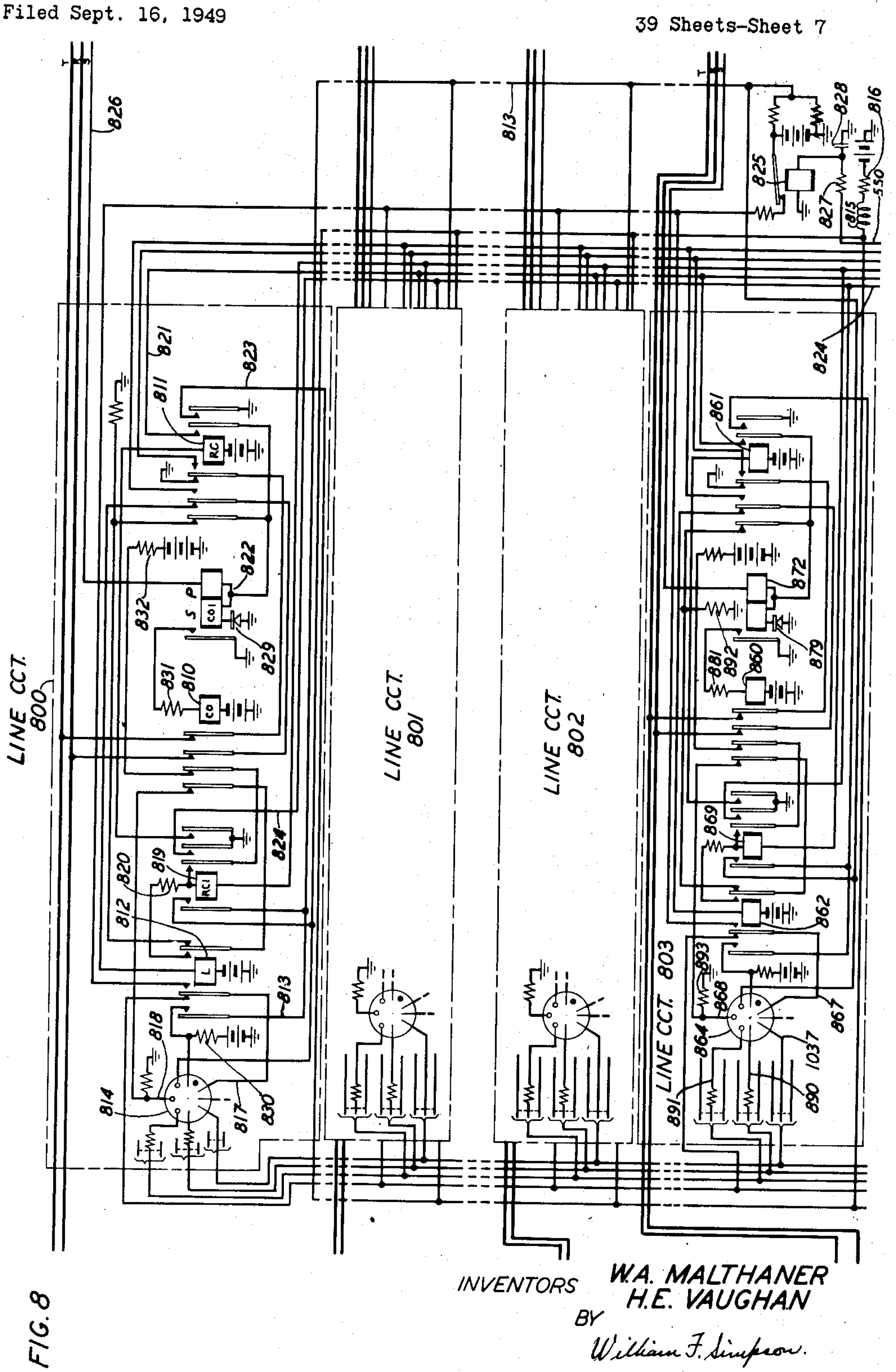
Figure 9:
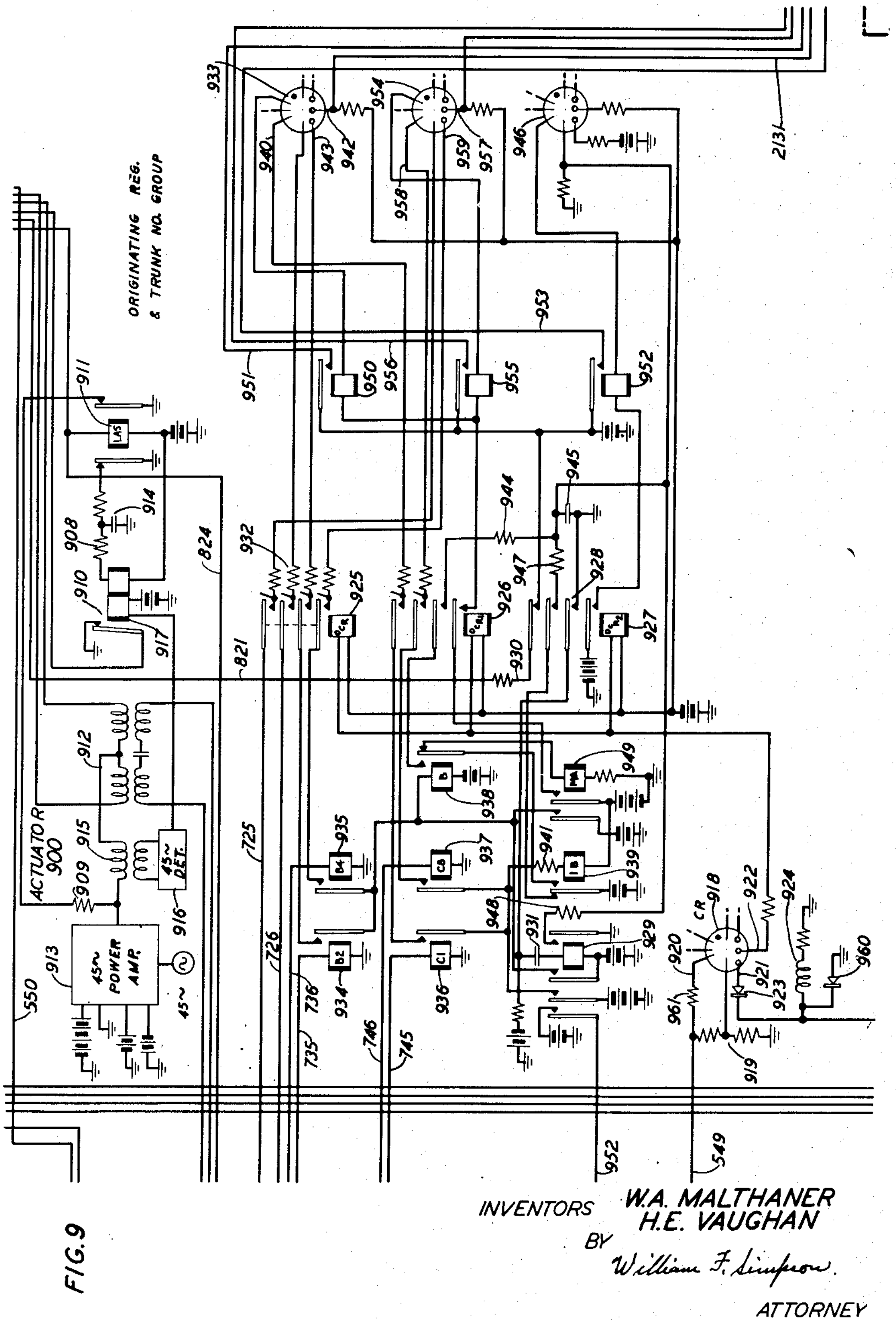
Figure 10:
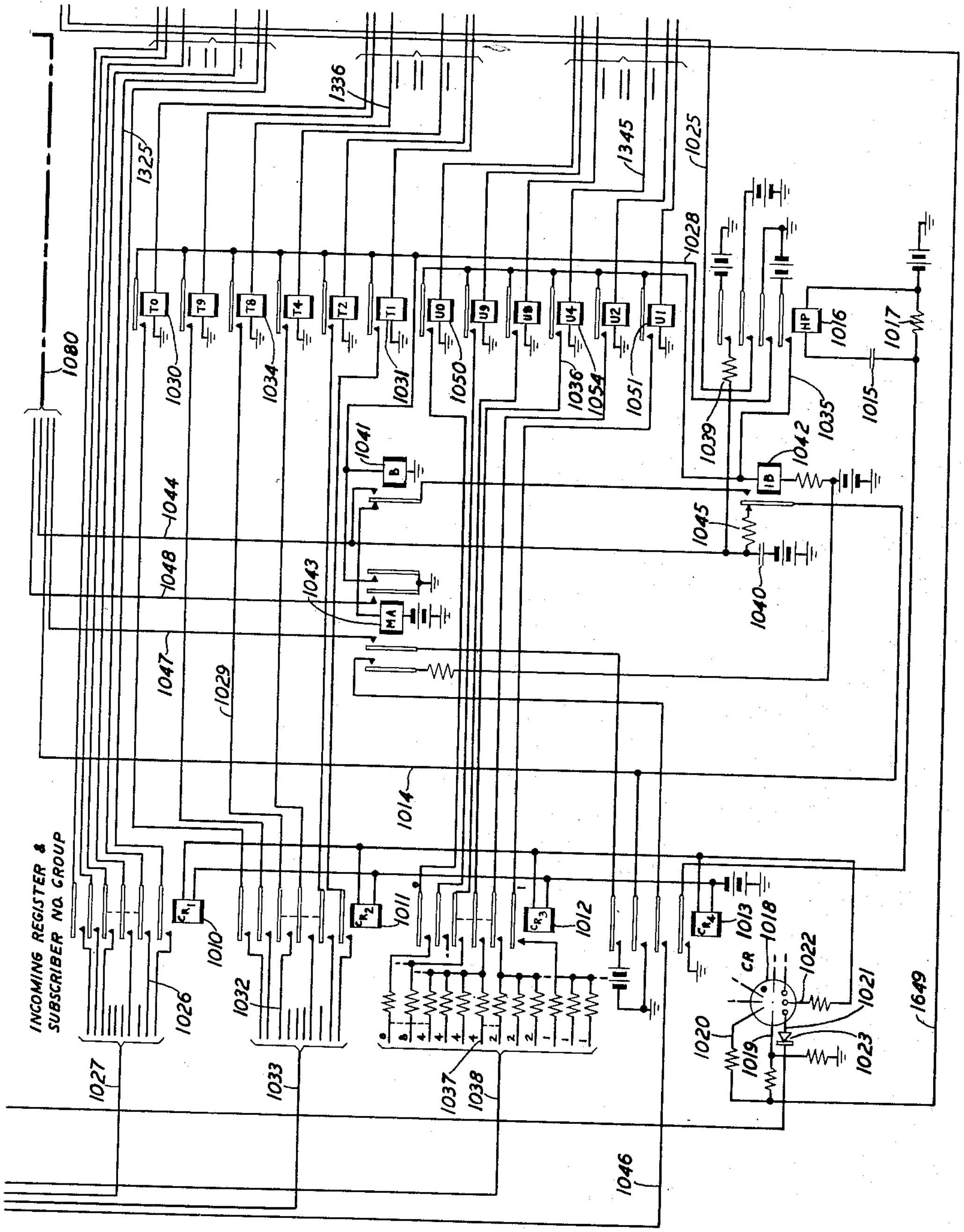

At the central office the subscriber's line is connected to a line circuit, four of which are shown in Fig. 8. Line 614 is connected to line circuit 800 which is shown in detail. Ground is supplied to the tip of line 614 through a back contact of relay 811 and a series back contact of relay 810. This ground extends through the direct-current path of line 614 and subset 600, set up as hereinbefore described, back over the ring lead, through back contacts on relays 810 and 811 and the winding of relay 812 to negative battery. Thus, current flows in the winding of relay 812 causing its operation. When the relay operates the high positive potential on lead 813 which is common to all line circuits, is applied to the anode of the right control gap of cold-cathode gas tube 814. The cathode of this control gap is connected in common with all other line circuits through inductor 815 in series with resistor 816 to positive battery. If no other line tubes are fired, there is no potential drop across the common inductor 815 and resistor 816 and the voltage difference between anode and cathode of the control gap of tube 814 causes a breakdown of the gap. The discharge will then transfer to the gap from the main anode 817, which is energized by the operation of relay 812, to the control cathode of the tube and then to the gap from the main anode 817 to the main cathode 818 of tube 814, which is connected through a back contact of relay 810 and a series make contact of relay 812 through resistor 820 to the winding of relay 819 and from the other side of the winding in common with leads from similar relays of all other line circuits to ground through the front contact of relay 910 in the actuator shown in Fig. 9 provided the actuator is idle. Relay 910 is operated if the actuator is idle.

If the line relay of some other line circuit or of several line circuits, similar to relay 812 in line circuit 800, operated at the same time as relay 812, the lock-out elements 815—816 common to the start cathodes of the gas tubes of all line circuits would insure that only one of the tubes could remain fired on its secondary anode-start cathode gap. Which tube reaches this condition is a matter of chance since it is a function of start gap breakdown voltage, transfer voltage and transfer current, all of which vary from tube to tube and are somewhat dependent on the past history of the tube.

When several of the tubes start to fire on their start gaps, current flows in the lock-out impedance 815—816 which produces a voltage drop across said impedance so that the voltage across the start gap of all tubes is reduced and only a few tubes, in most cases only one tube, will be fired. If more than one tube is fired, only one will transfer to the secondary anode-start cathode gap due to differences in the tubes and it will produce an increased current in the common impedance 815—816 which causes a voltage drop capable of preventing any other tube from firing. This means of producing lock-out between line tubes has been disclosed in United States Patent 2,350,888 granted to N. I. Hall on June 6, 1944.

When conduction in tube 814 obtains from main anode to main cathode, current flows in the winding of relay 819 causing it to operate. Operation of relay 819 applies ground to the winding of relay 811 to cause its operation, applies voltage to the common inductor 815 and resistor 816 to maintain the lock-out, applies ground to operate relay 911 in the actuator which is common to all line circuits, and applies a positive battery to its own winding which causes relay 819 to lock under control of a back contact on relay 810. This positive relay-locking voltage causes the drop across the main gap of tube 814 to fall below the sustaining value and the discharge in the tube goes out, but lock-out to prevent the firing of other line tubes is maintained by the voltage drop in elements 815 and 816 as hereinbefore described, said voltage being applied through a contact of relay 819. Operation of relay 811 causes the tip and ring of the line to be transferred from ground and the winding of relay 812 to the upper winding of repeat coil or transformer 912 in actuator 900. Interruption of the circuit of winding of relay 812 permits this relay to release. Operation of relay 811 also connects the lead common to both windings of relay 822 to the trunk number group, Fig. 9, where a positive voltage mark will be applied later; opens the path from the cathode of tube 814 to relay 822; and connects ground to lead 823 which is common to all lines and connects to the receiver of Fig. 5. Opening of the cathode lead of tube 814 makes the tube appear busy if an attempt is later made to place a call to that line. Thus at this time, we have relay 812 released, tube 814 extinguished, but lock-out maintained, relays 811, 819 and 911 operated and the tip and ring of the line connected to repeat coil 912.

Operation of relay 911 causes a load resistor 909 to be removed from the output of the 45-cycle power amplifier 913 and starts the release of relay 910 which cannot release until the current maintained in its right winding by the discharge of capacitor 914 decays below the hold current of the relay. When load resistor 909 is removed from the amplifier output, 45-cycle current flows through monitoring transformer 915 to the center tap of the upper winding of repeat coil 912 and over the two conductors of the line 614 on a simplex basis to ground in subset 600. Current flowing through secondary winding of transformer 915 is amplified and rectified in the 45-cycle detector 916, the output current of which flows through the left winding 917 of relay 910 which has not released due to the slow-release feature described above. Thus 45-cycle current over the simplex path holds relay 910 operated.

If the subscriber hangs up after relay 812 has been released, the reduction in current through transformer 915 permits relay 910 to release which in turn removes ground from the winding of relay 819 and the connection between line circuit 800 and actuator 900 is released.

If the subscriber does not hang up, the 45-cycle current over the simplex continues to pass to the subset 600. At the subset the current passes through switchhook contacts 612 operated and 615 normal to the winding of the latch magnet 617 which serves as a receiving simplex coil. The 45-cycle current produces no magnetic flux in the latch. From the center tap of the latch winding 617 the current passes through the stepping chain 616 and a phase shifting network 618 in parallel with it to the phase splitting network 619, one branch of which is in series with the right windings 620 of each of the signal pulse generating transformers, and the other branch of which is in series with the left windings 621 of each of the pulse transformers. Due to the phase splitting network 619 and the above-described connections the current in one group of windings is 90 degrees out of phase with current in the other group. After passing through the transformer windings, the current passes to ground which completes the circuit since one output terminal of the 45-cycle power amplifier 913 is grounded. The power amplifier has a high impedance output which tends to provide constant current to the subset regardless of the length of the subscriber's line and to reduce effects of noise pick-up. This amplifier may be any conventional amplifier with sufficient power output and having substantial current feedback from output to input.

Operation of the subset under control of an actuator is disclosed in the aforementioned application of Hill and Parkinson. The subset generates pulse position signals, one digit for each half cycle of the 45 cycles. The eight preset digits are transmitted, followed by a silent interval of two digits duration and the signaling process is repeated each one-ninth second as long as power is supplied by an actuator. Each digit comprises a start pulse followed after a controlled time interval by a stop pulse, the interval between the start and stop pulses determining the value of the digit. These signal pulses pass over line 614 on a loop basis, through the relays of line circuit 800 and the upper of primary winding of repeat coil 912. From the secondary of repeat coil 912 the signal pulses are applied to the signal receiver of Fig. 5. This receiver may be of the type disclosed in the patent application of Malthaner-Newby-Vaughan, Serial No. 35,924 or the type disclosed in Malthaner-Newby-Vaughan, Serial No. 68,234 both of which are designed to cooperate with the hereinbefore-mentioned subset. In the specific embodiment shown the receivers used in the originating office are similar to the one described in the first of said aforementioned applications with a few additions which will be described in detail.

At the same time that ground was applied on lead 824 to operate relay 911 it was also applied to relays 510, 511 and 512 in the receiver. Operation of relay 512 applies battery to lead reset "A" which in turn prepares the receiver for operation. Closure of the lower contact on relay 510 causes operation of a counting device 514 which records the number of times the receiver is used. The upper contact of relay 510 in closing completes a path from the left winding of repeat coil 513 to band-pass filter 517 through which the signals pass. Release of relay 511, which has its contacts normally biased closed, removes a termination from left winding of repeat coil 513, releases relay 515 and relay 516 which relays in turn prepare the rest of the receiving circuit for operation.

Figure 5:
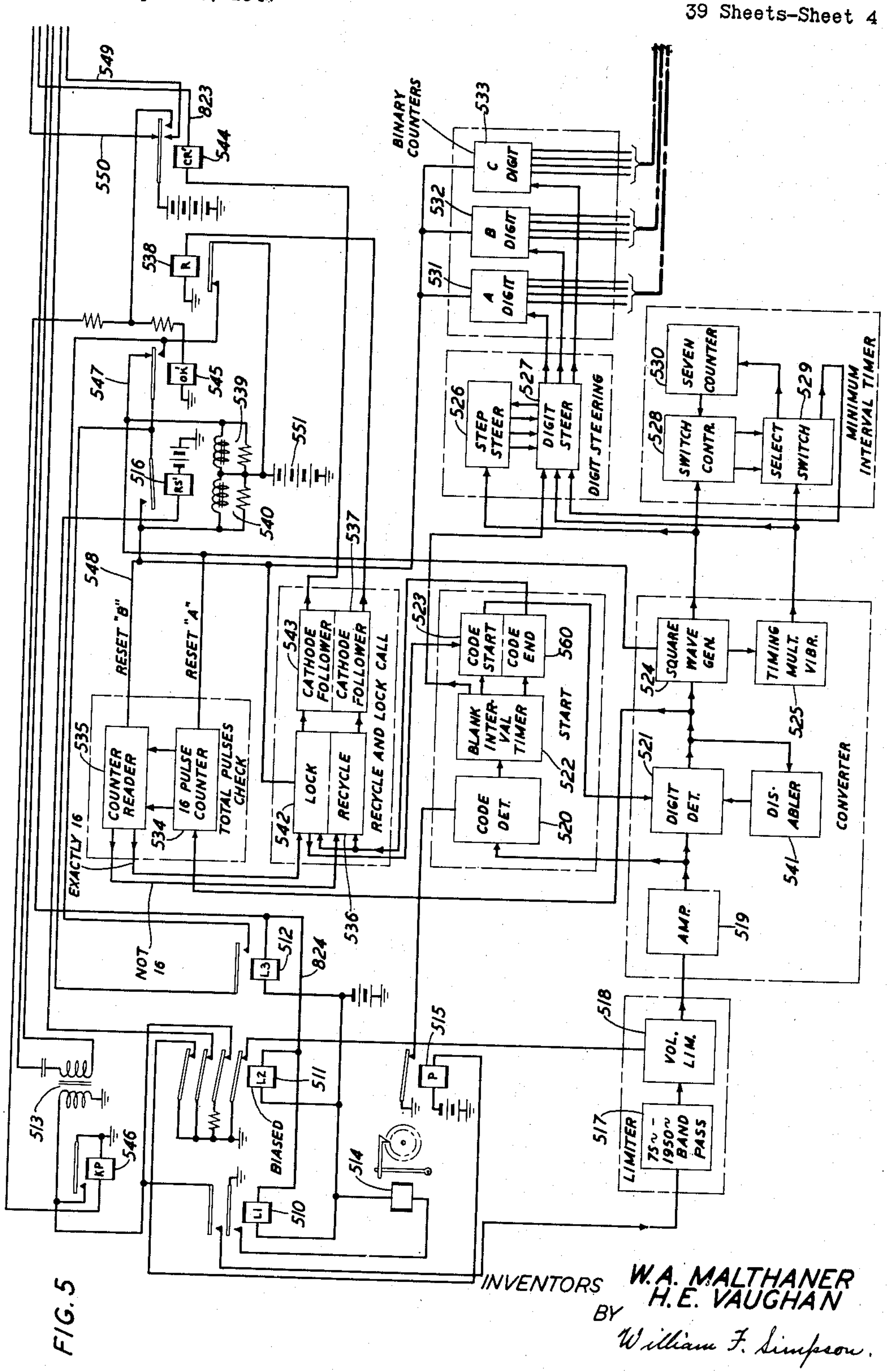

The signaling pulses, as received by the receiving circuit through the path hereinbefore described and shown in Fig. 5, first pass through filter 517 to the volume limiter 518 causing the gain of said limiter to be set at the proper level as described in the above-identified application of Malthaner - Newby - Vaughan. In addition, these pulses after being repeated by the limiter circuit are transmitted to the code detector 520 through amplifier 519, which detector is provided with a timing circuit which recognizes the blank interval between the series of pulses representing a complete called number designation. The other circuits of the receiver are rendered ineffective and are blocked until such a blank interval is received. At this time, the code detector 520 as well as the other portions of the start circuit respond to the blank interval and cause the various other circuits of the receiver to be conditioned to thereafter receive the pulses. These circuits then respond to the succeeding pulses received from the subscriber station and cause the magnitudes represented by the various pulses to be stored on binary counters 531, 532 and 533. It is to be understood of course that any suitable number of such counters may be provided, one counter for each digit of the called subscriber's designation which is to be employed to control the switching equipment at the switching center. In this case since three digits are required to designate a desired central office, three such counters are provided to register the first three digits occurring in a train of pulses from a calling subscriber's subset.

The manner in which these pulses are received and recorded is described in detail in the above-identified signal receiver application. As set forth in the above-identified application of Hill and Parkinson and the above-identified application of Malthaner-Newby-Vaughan, when pulses of short duration of the type described above are transmitted over voice frequency communication paths and through the various types of associated equipment such as repeat coils, amplifiers, condensers, filters and the like, transient currents are set up which effectively prolong the pulses as received. In addition, since the signal generating equipment at the subscriber station 600 is operated by power received over the subscriber's line, it is desirable to separate the power currents from the signaling currents generated by the calling equipment. Due to the above factors and also to reduce the effects of noise and extraneous currents, the band-pass filter 517 is provided. This filter likewise tends to have transients set up in it due to the application of signaling pulses to it. As a result a signaling pulse which is about one-thousandth of a second in duration as transmitted is extended or lengthened to above 3½ thousandths of a second by the above-described effects. Consequently, pulses must be spaced farther apart than this time interval. This minimum time interval together with the length of the pulses and the information to be conveyed by the pulses as set forth in the above-identified application of Malthaner-Newby-Vaughan and Hill-Parkinson requires about 12½ milliseconds for the transmission of each digit in an exemplary system such as set forth herein and in said copending applications.

In order to more clearly describe the operation of the system it has been assumed that each time interval assigned to a digital position has been divided into twenty-five increments each increment being slightly less than ½ millisecond. Thus, each receiver pulse persists for approximately seven increments not including the one in which the pulse starts or is transmitted. In order to recognize the pulses more accurately and to distinguish them from noise and also to render the system less subject to noise interference, provision has been made to block the receiving equipment for approximately seven increments of time following the reception of each pulse.

As set forth above, the pulses are received and amplified by the volume limiter circuit 518. The gain of this volume limiting amplifier is automatically regulated so that the amplitude of the pulses from this amplifier are substantially independent of the amplitude of the pulses as received. Pulses are then further amplified by amplifier 519 and then supplied to code detector 520 and digit detector 521. As described above, the code detector together with the blank interval timer 522 recognize the blank interval between each complete series of pulses representing an entire subscriber station designation. The digit detector 521 is normally rendered inoperative. However, in response to the operation of the blank interval timer which in turn operates the code start circuit 523, the digit detector 521 is rendered operative so that it will respond to the succeeding pulses received from the calling device of subscriber station 600. The first start pulse thereafter is received by the digit detector 521 and is employed to control the square wave generator or switching device 524 and in turn to start the operation of a timing circuit such as multivibrator 525. The switching circuit 524 also causes the steering and stepping circuit 526 to condition the digit steering circuit 527 so that when pulses are applied to it, as will be described hereinafter, they will be directed to the first digit counting and storing circuit 531.

In response to the first start pulse applied to digit detector 521, disabling circuit 541 is actuated which in turn renders the digit detector unresponsive to any further received currents for the interval of time required for the signal transients to decay substantially to zero. At the end of this time digit detector 521 is again rendered operative so that it will properly respond to the stop pulse. Meantime however, the multivibrator or timing circuit 525 has been arranged to transmit or generate seven pulses which pulses are applied to the selective switching circuit 529. The selective switching circuit 529 was set by the output of square wave generator 524 and switch controlling circuit 528 in response to the first start pulse as described above so that selective switching circuit 529 causes the first pulses received thereby to be transmitted to counter circuit 530. The counting circuit 530 counts seven of these pulses, that is, the pulses received during the time the transient of the initial or start pulses is dying out, and at the end of the seventh pulse actuates switching control circuit 528 so that switch 529 is actuated to a position or condition where it causes the remaining pulses received from multivibrator 525 to be transmitted through digit steering circuit 527 instead of to counter 530. Each succeeding pulse from the source 525 is then transmitted through digit steering circuit 527 to binary counter circuit 531 which circuit counts each of the succeeding pulses from said timing circuit.

If the first digit has a magnitude of one, the timing multivibrator 525 will have time to transmit only one pulse to the counting circuit 531 before the stop pulse will be received. If the magnitude of the first digit is five, then five pulses will have been transmitted to circuit 531 before the stop pulse is received. Thus, the time of reception of a stop pulse relative to a start pulse is employed to designate the magnitudes of the digits or characters of the designation of the called station code. The reception of the stop pulse operates digit detector 521 and square wave generator 524 to stop the operation of multivibrator 525. The stop pulse also causes the digit detector 521 to be disabled by disabler 541 for seven increments of time during which the transients associated with the stop pulse can decay. The next or second start pulse will then cause the circuits to operate in a manner similar to that described above in reference to the first start pulse except that stepping circuit 526 will advance the digit steering circuit 527 and cause the succeeding pulses over and above the first seven from multivibrator 525 to be transmitted to and recorded by counter circuit 532. In a similar manner the magnitude of the third digit is recorded on digit counter 533.

Checking provisions have also been provided for checking the operation of the circuits to insure that the proper number of signal pulses have been received. As pointed out above, two pulses are required to represent each digit. Since the complete subscriber's designation comprises eight digits then sixteen pulses should be included in each series of pulses between the blank intervals. The output of digit detector 521 is applied to a 16-pulse counting circuit 534. If more or less than sixteen pulses are received by counting circuit 534 between two blank intervals, the circuits are arranged to cancel all registrations and start over in response to the next series of pulses.

In order to accomplish this, the 16-pulse counter 534 controls the counter reader 535. If counter 534 has counted other than sixteen pulses, the counter reader 535 conditions the recycle circuit 536 so that it will repeat a pulse from the code end circuit 560, in response to the next blank interval, and cause the operation of relay 538 through cathode follower circuit 537. Relay 538, in operating, removes a short circuit from inductive networks 539 and 540 in battery supply 551 to the various counter and switching circuits. Removal of this short circuit has the effect of momentarily interrupting the battery supply or applying a negative pulse of short duration to the battery supply lead so that these circuits are all restored or set to their initial condition, after which time they may again respond to the succeeding series of pulses transmitted from the calling subset 600.

If a total of sixteen pulses, as required in the exemplary embodiment of the invention set forth herein, is received between the two blank intervals then the counter reader 535 will condition the locking circuit 542 instead of the recycle circuit 536 to repeat a pulse from the code end circuit 560 in response to the succeeding blank interval. The locking circuit 542 then functions through cathode follower 543 to operate relay 544 thus indicating that the proper number of pulses have been received.

Figure 7:
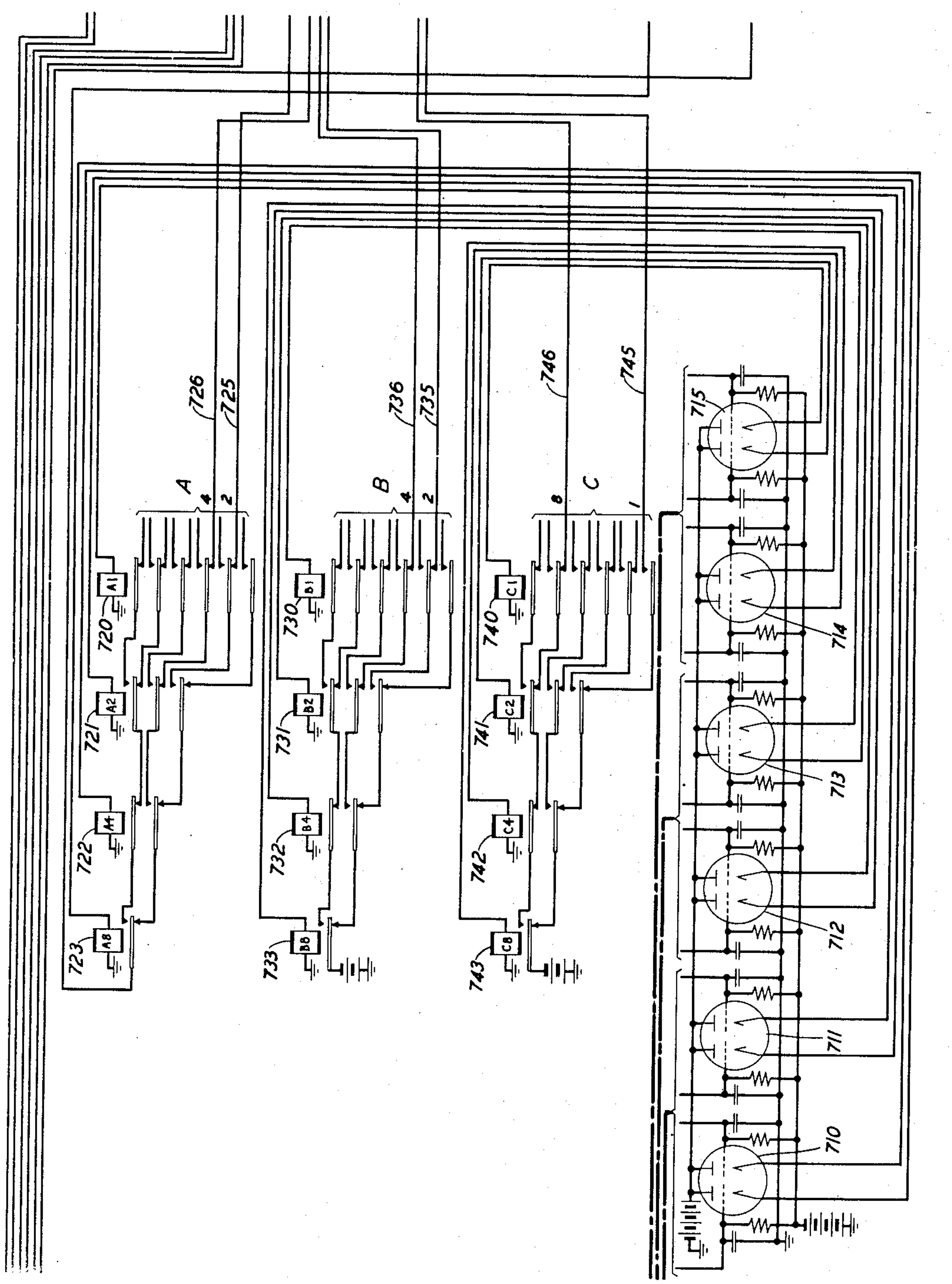

The setting of the counter tubes in each of the digit counters 531, 532 and 533 determines the bias on cathode follower tubes 710 to 175 inclusive, which are associated with the individual stages of the counters, so that the settings of these counters are transferred to an operated combination of relays in the corresponding three sets of register relays shown in Fig. 7. The first digit is then represented in binary code form by the operated combination of relays 720 to 723, the second digit by the operated combination of relays 730 to 733, and the third or last digit of the office code by the operated combination of relays 740 to 743. The contact springs on each of these digit groups of relays form a translator network for converting the binary digit registration into a decimal digit registration. This translation is accomplished, for example, by the contact network shown associated with relays 720 to 723 in that if voltage is applied to the armature of relay 723 it will pass through various contacts of relays 720 to 723 and appear on one of the ten output leads shown associated with relay 720 and bearing a decimal designation corresponding to the original decimal designation preset by the calling subscriber. In the case of the second and third digits, this decimal translation results in the operation of decimal register relays, two of which for each digit are shown by way of example in detail in Fig. 9. If it is assumed, for example, that the office code designated by the calling subscriber is 421, voltage applied to the output lead 735 of the translator network for the second digit operates relay 934, and voltage applied to the translator output lead 745 for the third digit operates relay 936. This registration of the office code, designated by the calling subscriber, on the decimal relays of Fig. 9 occurs during the interval in which the remaining five digits are being transmitted to the receiver of Fig. 5 and thus this registration occurs before the operation of relay 544.

Relay 544, in operating as an indication that sixteen total pulses have been received, operates relays 545 and 546. Relay 545 resets pulse counter 534 and square wave generator 524 to their initial conditions, removing a short circuit from around the impedance network 539 and this applies a resetting pulse or condition to the "reset B" lead. Relay 546 places a short circuit across the left side of receiver input repeating coil 513 to prevent the reception of any further signaling pulses by this receiver, and to prevent any alteration of the established registration by transient signals generated by subsequent switching operations in neighboring apparatus. Relay 544, in operating, also removes battery from lead 550 which releases relay 825 thereby removing the voltage applied to the main anodes of the cold-cathode gas tubes in the various line circuits so that any other line circuits which have originating calls awaiting on them are prevented from connecting to the receiver of Fig. 5 until this receiver has completely restored to normal as described hereinafter. In addition, relay 544 in operating connects battery to lead 549 in order to connect this receiver to the trunk number group of Fig. 9 if the switching network is not at the moment being operated upon by the incoming register and subscriber's number group circuits of Figs. 10 and 13 as described hereinafter.

Voltage is applied through a make contact relay 544 to the control anode of cold-cathode gas tube 918 through voltage dividing circuit 919 and to the main anode of tube 918 through resistor 961. If no other receivers are connected to either number group, tube 918 will break down across its control gap, transfer its discharge to main anode 920-control cathode 921 gap, and then to the main anode 920-main cathode 922 gap. The control cathode is connected through a varistor 923 to a series inductive and resistive circuit 924 to ground. Varistor 923 is used to insure that the start cathode of tube 918 does not act as an anode when such a tube fires just as another such tube is being extinguished. A varistor 960 connected across lock-out element 924 is used to damp transients caused by extinguishing of such tubes. This impedance 924 is common to all connector gas tubes and provides lock-out to prevent more than one tube from being operated at a time. The operation of lock-out circuits of this type are described in greater detail in the heretofore-mentioned Patent 2,350,888 to N. I. Hall. This lock-out feature is required because the switches are operated on a one-at-a-time basis. If the trunk number group or some other number group connected in the same lock-out circuit was in use the voltage drop across impedance 924 would prevent tube 918 from firing. When tube 918 is fired across the main gap 920—922 current flows in relays 925, 926 and 927 which causes them to operate and to connect leads representing all possible, A, B and C digits from the register relays to trunk number group network and trunk group gas tubes. Contact 928 on relay 927 applies ground through capacitor 931 to relay 929 which controls the initiation of the test to determine whether trunks in the trunk group called are busy, idle, or vacant. The top contact of relay 927 applies a positive voltage to lead 930 which is used to mark the appearance of the calling line on the switches. The second contact from the top on relay 927 enables a path to the al-trunks-busy tube if needed later and the bottom contact of relay 927 applies main anode battery through the winding of relay 952 to the all-trunks-busy gas tube 946 main anode.

Ground applied through contact 928 and capacitor 931 to the winding of relay 929 causes that relay to be operated for a short time. Operation of relay 929 applies positive battery over lead 952, to the armature of relay 723 which passes through the contact network of the A digit translator relays to lead 726 and then through the second from the top contact of relay 925 and through resistor 932 to the control anode of cold-cathode gas tube 933. At the same time relay 929 applies negative battery to the armature of the B group relays 934, 935 and others not shown in detail and shorts the winding of relay 938, and positive battery to the C group relays 936, 937 and others not shown in detail and shunts the winding of relay 939 with resistor 941. The operation and circuits for the busy-idle-vacant test and number group are the same as disclosed in an application of Cornell et al. Serial No. 114,392 filed September 7, 1949. With batteries applied by relay 929, as stated above, all trunk group gas tubes having the designated AB digit combination breakdown across their control gaps, tube 933 is the only tube shown in the drawing which will do so, and then the one tube having the designated ABC digit combination will transfer to the secondary anode-start cathode which as shown in the drawing will be the 940—943 gap of tube 933. Thus only one tube of a possible thousand is fired across the secondary anode-start cathode gap.

A short time later relay 929 releases and battery is removed from the A-group translator relays 720 to 723 causing all tubes fired on the start gap only to be extinguished. Release of relay 929 also removes batteries from the armatures of relays 934, 935, 936, 937 and the other similar register relays not shown in detail. However, the path from tube 933, start cathode 943 through the contacts of operated relay 934 is still connected through the winding of relay 938 to negative battery and the path from the secondary anode 940 through the contacts of operated relay 936, the resistor 941, and the winding of relay 939 is still completed to positive battery.

If all trunks in the trunk group are busy, the main cathode 942 of tube 933 is grounded through contacts of relays in the out-trunk circuits of the trunk group. Under this condition, the discharge path in tube 933 remains from start cathode 943 to secondary anode 940. The current flowing in this gap also flows through the winding of relay 938 and through the closed contacts of relays 926, 934 and 936 and the winding of relay 939. This current causes the operation of relays 938 and 939 which indicates that all trunks in the desired trunk group are busy. Relays 938 and 939 when operated apply a positive voltage through a closed contact on relay 926, resistor 944 to capacitor 945 and the start anode of the busy group tube 946. The combination of resistor 944 and capacitor 945 causes a delay in the rise of the voltage applied to the start anode of tube 946.

If there is no trunk or trunk group corresponding to the ABC digit code called, no such gas tube exists and neither relay 938 nor relay 939 operates. With relays 938 and 939 normal, indicating a vacant office code, a circuit is completed from positive battery through an RC delay network 947, 945 to the start anode of tube 946. The time delay is provided to allow time for possible operation of relays 938 and 939 after the release of relay 929. The start anode of tube 946 is kept disabled and capacitor 945 is held discharged during the operated interval of relay 929 by connecting ground through resistor 948 to said capacitor. Application of voltage after the above delay to the start anode of tube 946 causes breakdown of its control gap. Separate tubes for busy and vacant condition could have been provided if desired.

If there are idle trunks in the trunk group, after the trunk group tube is fired on a secondary gap, the discharge in the tube will transfer from the secondary anode 940-start cathode 943 gap to the secondary anode 940-main cathode 942 gap since the main cathode 942 of tube 933 is at negative potential. Current in this path flows only through relay 939 and not through relay 938 causing the operation of relay 939 only. In this not-busy, not-vacant condition a circuit is completed from positive battery through a closed contact of relay 939, a back contact of relay 938, and the winding of relay 949 to ground causing operation of relay 949 which in turn applies positive battery through its contact, and the lower contact of relay 926 to the windings of the relays in the main anode circuits of all trunk group tubes. This voltage causes the fired trunk group tube 933 to transfer to its main anode-main cathode gap causing the operation of relay 950 which in turn applies a positive voltage to lead 951 to all trunks in the trunk group. At this time there is a positive voltage applied as a mark on lead 821 to line circuit 800 of the calling subscriber and there is a similar mark on lead 951 to all trunks of the trunk group to which a connection is desired. There is only one trunk shown in the drawing in the trunk group so lead 821 extends to this trunk only. Lead 821 also extends to such other trunk circuits of this trunk group as may be provided.

The voltage mark on lead 951 is applied to out-trunk circuit 2109 through a back contact of relay 2110, and through a series back contact of relay 2111 to the common point of the two windings of relay 2112. The other terminal of the left winding of relay 2112 is connected via lead 2113 to the control lead of the left vertical of primary switch 1712 of trunk frame 1710 shown in Fig. 17. The voltage mark on lead 821 is applied through a closed contact of relay 811 to the common point of the windings of relay 822 and extended from the other end of the right winding of relay 822 via lead 826 to the control lead of the left vertical of the primary switch 1112 of line frame 1110 in Fig. 11.

Figure 11:
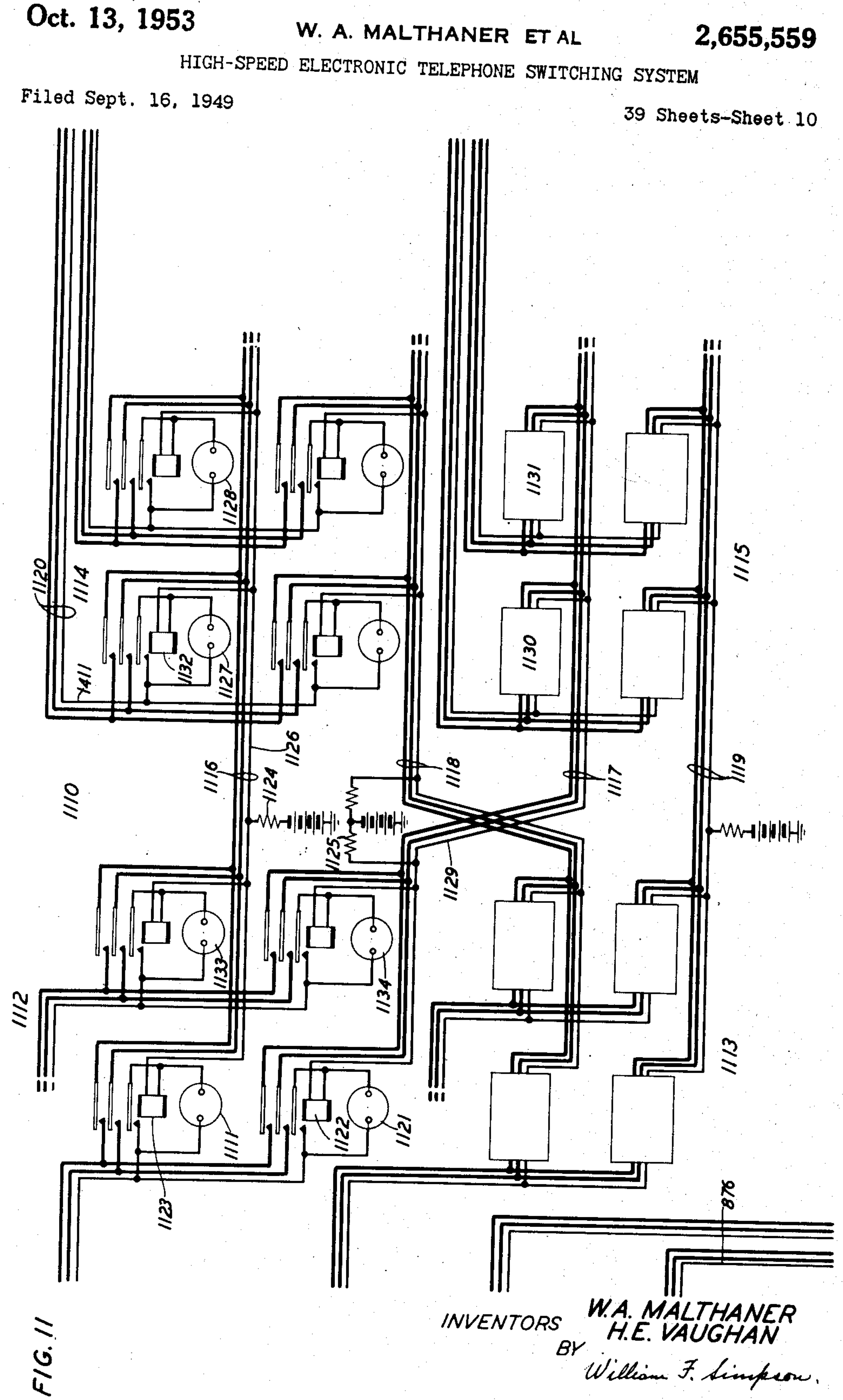
Figure 12:
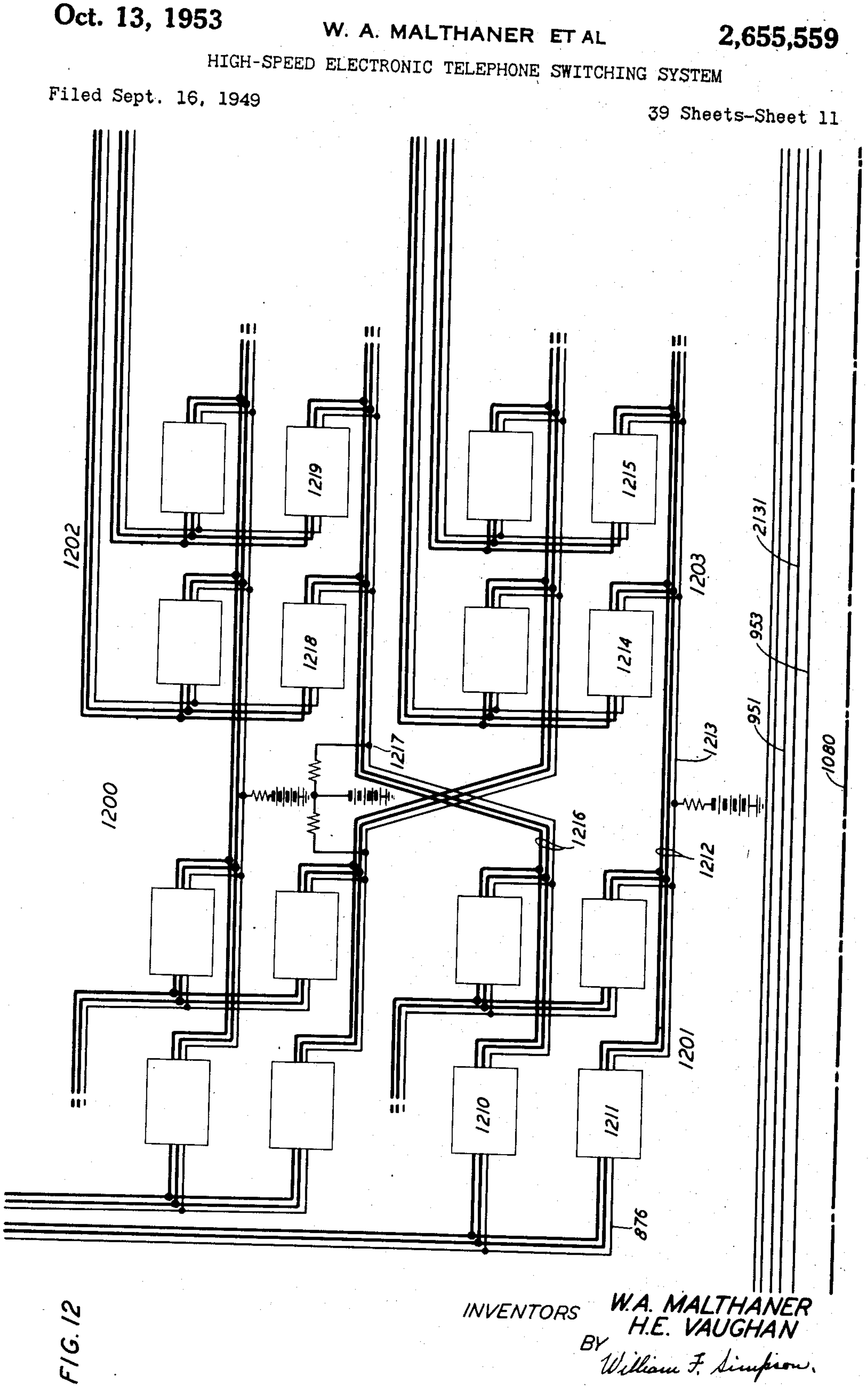
Figure 17:
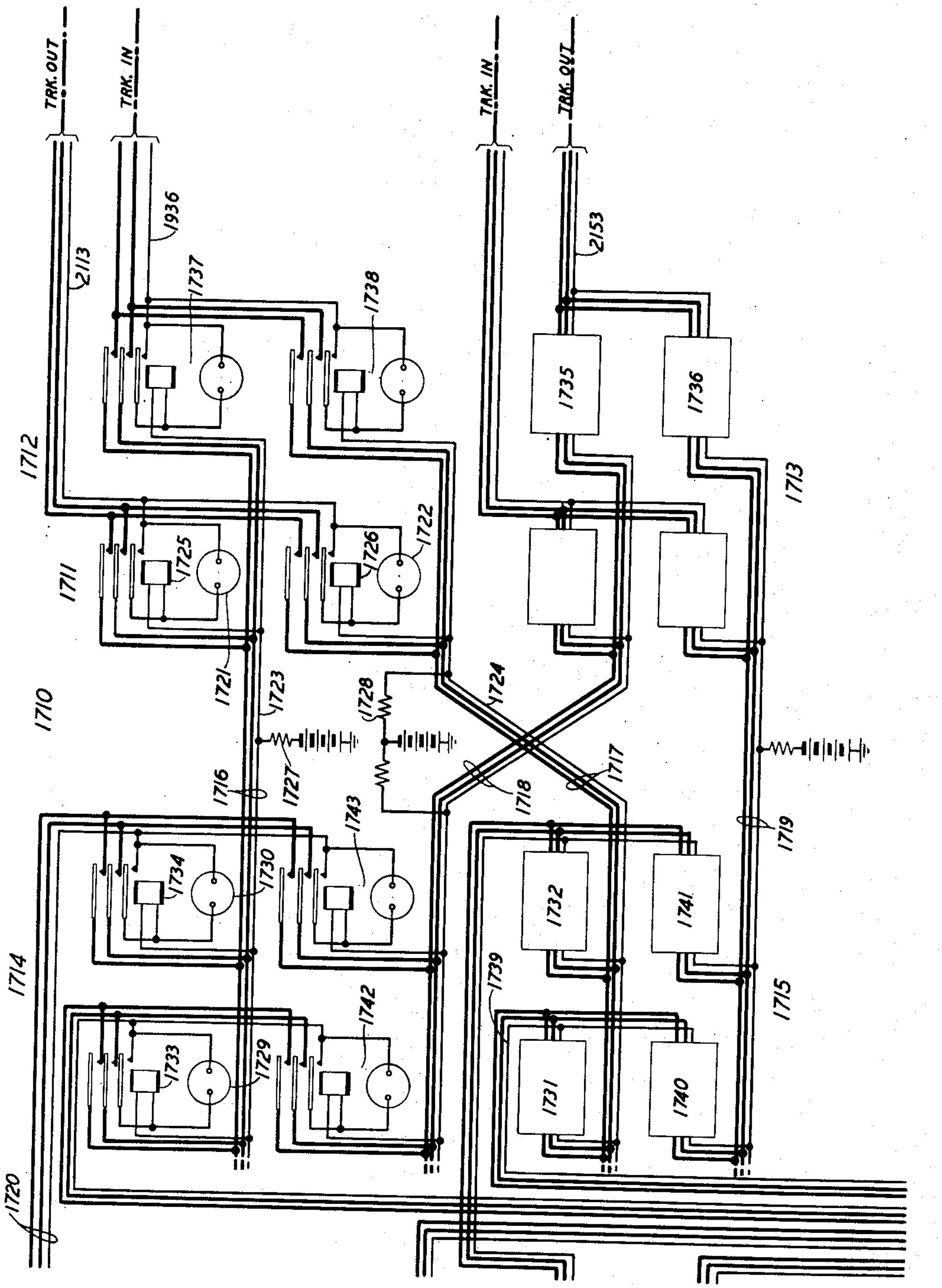
Figure 18:
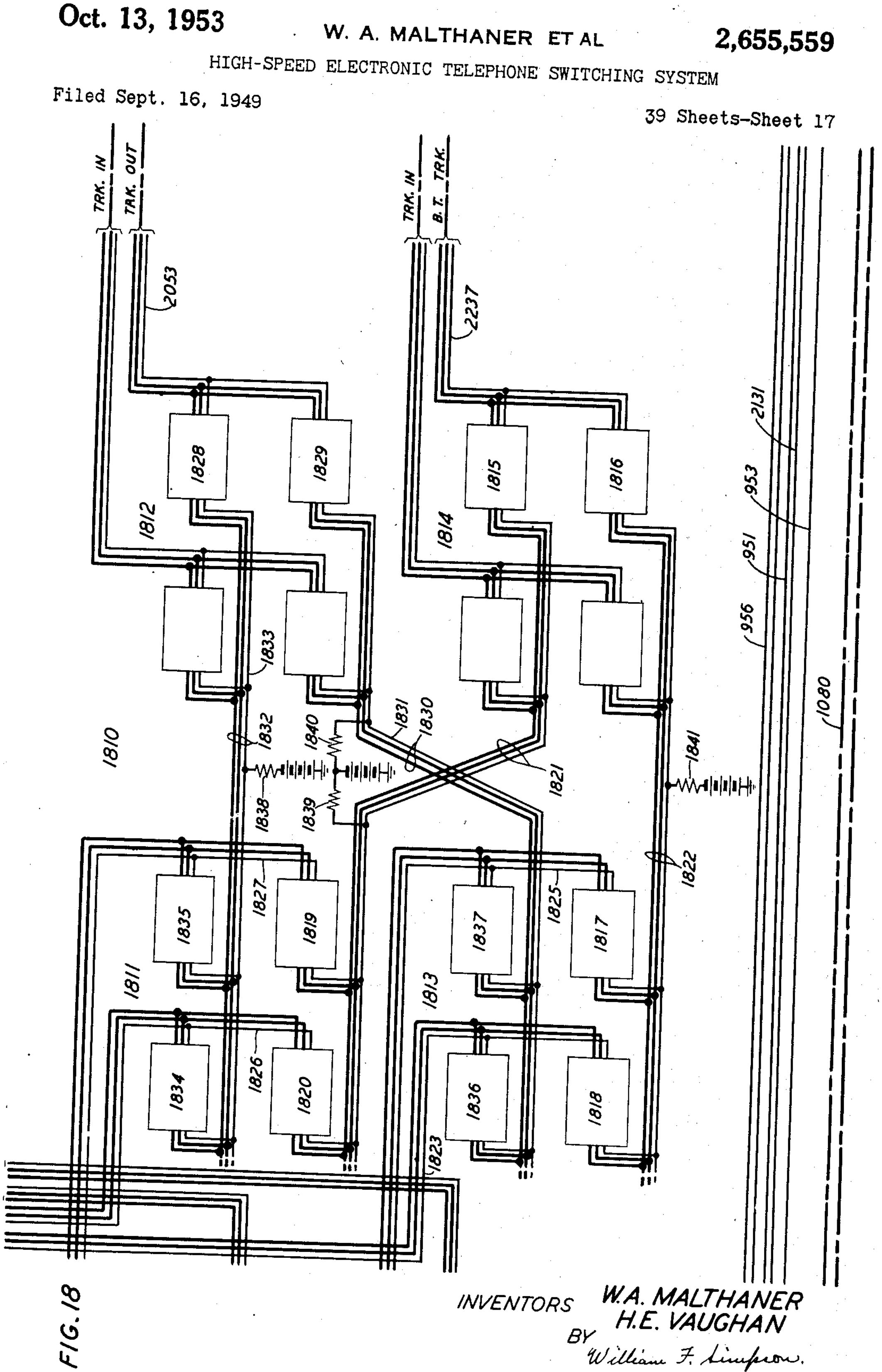
Figure 19:
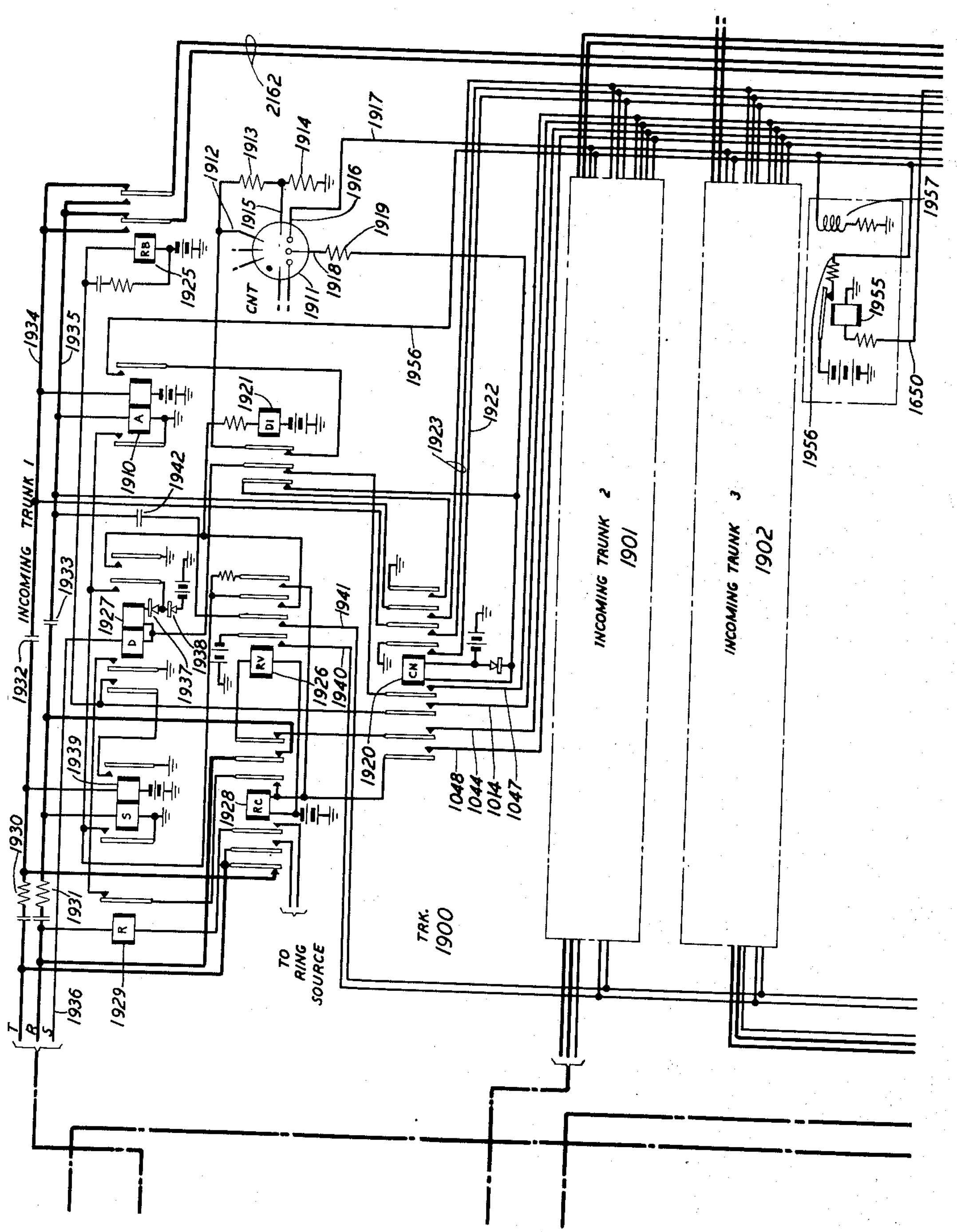

The switching network comprises line frames, two of which are shown by way of example in Figs. 11 and 12, and trunk frames, two of which are shown by way of example in Figs. 17 and 18. Each line frame and trunk frame comprises primary and secondary switches. Each primary line and trunk switch has a plurality of vertical input columns across the switch, which are connected to line and trunk circuits respectively, and a plurality of horizontal output rows across the switch. Each of these rows and columns comprises three conductors, two for the usual talking path and the third for a control lead. At the intersection of each row and column, hereinafter called a cross-point, is a relay comprising an operating coil and three sets of make contacts. Two of these contact sets, when closed, connect the talking conductors associated with the particular output row. A cold-cathode gas diode is also associated with each cross-point relay and this diode in series with the winding of the relay is connected between the control lead of the vertical input column and the control lead of the horizontal output row. The third contact set of the cross-point relay, when operated, short-circuits this associated gas diode. The use of these cross-point gas diodes in the control leads facilitates the identification and selection of idle paths through the switching network as described hereinafter, and the short-circuiting of said diodes at operated cross-points facilitates the holding of an established connection through the network and the maintenance of a busy indication along said path during the path selection processes of subsequent calls.

Each secondary switch is connected to form a similar rectangular array of cross-points except that the horizontal rows are used in input terminals and the vertical columns as switch outlets. In addition, each line and trunk frame comprises a number of such primary and secondary switches arranged so as to provide one talking path from each primary switch to each secondary switch. In Fig. 11 of the exemplary system line frame 1110 shows by way of example two primary switches 1112 and 1113 which are cross-connected to two secondary switches 1114 and 1115. The primary switches 1112 and 1113 each show by way of example two input columns each of which is or may be connected to a subscriber line circuit, such as 800, and two horizontal output rows which are connected to the horizontal inlets of secondary switches 1114 and 1115. Each secondary switch has two vertical outlets shown by way of example. The interconnecting conductors between primary and secondary switches, hereinafter called links, each link consisting of three conductors, are connected so that each primary switch on the frame is connected to each secondary switch on the frame. In the specific embodiment shown by way of example the upper horizontal output of switch 1112 is connected by link 1116 to the upper horizontal inlet of secondary switch 1114, the lower horizontal outlet of switch 1112 is connected by link 1117 to the upper horizontal inlet of switch 1115. Similarly, the upper outlet of switch 1113 is connected by link 1118 to the lower inlet of switch 1114 and the lower outlet of switch 1113 is connected by link 1119 to the lower inlet of switch 1115. A second line frame is shown on Fig. 12 which can be connected to lines in the same manner as the line frame 1110. Although only two primary and two secondary switches each having two inlets and two outlets are shown on each frame it is to be understood that both the number of switches and the number of inlets and outlets per switch can be readily expanded in an obvious manner so as to provide switches and frames of any desirable size and any desirable number of such frames, having a number of input line circuits consistent with the operating times of the system and the calling habits of the subscribers and having a similarly consistent number of primary-secondary link paths and secondary outlets. For example, line frames might be provided with seventy inlets and ten outlets per primary switch and ten primary switches per line frame and with ten secondary switches per line frame, each secondary switch having ten inlets and ten outlets.

Proceeding from the trunk output side of the switching network backward through the office a similar frame arrangement is disclosed. Fig. 17 shows by way of example trunk frame 1710 comprising two primary switches 1712 and 1713, and two secondary switches 1714 and 1715. The primary and secondary switches are interconnected in the manner described above for the line frame so that primary switch 1712 is connected by link 1716 to secondary switch 1714, and by link 1717 to secondary switch 1715 and primary switch 1713 is connected by link 1718 to secondary switch 1714 and by link 1719 to secondary switch 1715. A similar trunk frame is shown in Fig. 18. Although only two primary and two secondary switches each having two inlets and two outlets are shown on each frame it is to be understood that both the number of switches and the number of outlets and inlets per switch may be readily expanded in an obvious manner so as to provide switches and frames of any desirable size and any desirable number of switching frames, having a number of trunk connections consistent with the operating times of the system and the amount of traffic to be handled and having a similarly consistent number of primary-secondary link paths and secondary outlets. For example, trunk frames might be provided comprising ten primary and ten secondary switches, each primary and secondary switch having ten inlets and ten outlets.

Connections are made between the secondary line frame switches and the secondary trunk frame switches to provide talking paths between each line frame and each trunk frame. These connections comprise a direct connection for the two talking conductors of each such path, and the third or control lead from each secondary line switch outlet is connected to an individual control circuit, hereinafter called a junctor, and the control lead from each secondary trunk switch outlet associated with the same talking path is connected to the same control circuit or junctor. A group of four junctors, one of which, 1410, is shown in detail, are shown by way of example in Fig. 14. Thus junctor 1410 is associated with the path 1120 from the left vertical of line switch 1114 by means of control lead 1411 and with the path 1720 from the right vertical of trunk switch 1714 by means of control lead 1412, and when the control leads are properly marked as will be hereinafter described junctor 1410 will cooperate with the switches, line circuit 800, out-trunk circuit 2109 and the control circuits to establish a line-to-trunk connection.

As hereinbefore described under the assumed conditions, a positive voltage mark is applied to lead 826 which is connected to the left vertical of line switch 1112 and another mark is applied to lead 2113 which is connected to the left vertical of trunk switch 1712. Assuming further that the paths through the line frame 1110 and trunk frame 1710 are all idle, the positive voltage on lead 826 causes gas diodes 1111 and 1121 to break down since the other sides of the diodes are connected through large resistors 1124 and 1125 to negative battery. These resistors are of sufficient value that the discharge in the diodes is maintined but the current through the associated series relay windings 1122 and 1123 and the winding of relay 822 is considerably below that necessary to operate the relays. When tube 1111 is fired a voltage drop is produced across resistor 1124 so that the potential of lead 1126 changes from the original negative battery potential to a positive potential. The rise in voltage on lead 1126 causes diode 1127 in secondary switch 1114 to fire since the other side of diode 1127 is connected by lead 1411 through a large series resistor 1413 to negative battery in junctor 1410. When the diode 1127 is fired the potential on lead 1411 rises from the negative battery voltage to a less negative potential. In a similar manner the rise in potential of lead 1126 also causes breakdown of diode 1128 also in secondary switch 1114 the other side of which is connected via lead 1417 through a high resistance to negative battery in junctor 1414. At the same time breakdown of tube 1121 causes a rise in potential on lead 1129 which causes breakdown of the diode associated with cross-point 1130 in secondary switch 1115 and of the diode associated with cross-point 1131 in the same secondary switch. The breakdown of these diodes in secondary switch 1115 marks leads 1418 and 1419 to junctors 1415 and 1416 respectively in the manner described above for switch 1114. Thus, as a result of the mark placed on the switches through lead 826 the line circuit of the calling line, diodes 1111, 1121, 1127, 1128, 1130 and 1131 are fired and the potential on leads 1411, 1417, 1418 and 1419 has been raised from negative battery potential to a less negative value which in effect puts a voltage mark on the gas tube associated with each of the above-mentioned junctor circuits. The voltage mark on lead 1411 is applied through resistor 1423 to the screen of tube 1420 in junctor 1410. Junctors 1414, 1415, 1416 although not shown in detail are marked in a similar manner.

At trunk frame 1710 a positive potential mark on lead 2113 causes the breakdown of diode 1721 due to negative potential on its other side applied via resistor 1727, control lead 1723 and relay winding 1725. Diode 1722 is caused to break down at the same time due to negative potential on its other terminal applied through resistor 1728, lead 1724 and relay winding 1726. As a result of the operation of diodes 1721 and 1722, the potential rises on leads 1723 and 1724 respectively. The change in potential on lead 1723 of link 1716 causes diodes 1729 and 1730 to fire since the other terminal of diode 1730 is connected via lead 1412 and resistor 1422 to a more negative potential 1433 in junctor 1410 and the other side of diode 1729 is connected via lead 1512 in a similar manner to a more negative potential in junctor 1514. Operation of diode 1730 produces a voltage mark on the start anode of tube 1420 through resistor 1421. In a similar manner the gas tube of junctor 1514 is marked as a result of operation of diode 1729. The change in potential on lead 1724 causes operation of the gas diodes associated with cross-points 1731 and 1732 in secondary switch 1715 which results in a change in voltage on lead 1424 to junctor 1415 and lead 1739 to junctor 1516. Thus, as a result of the mark applied through the out-trunk circuit 2109 diodes 1721, 1722, 1729 and 1730 and the diodes associated with cross-points 1731 and 1732 are fired and marks are applied to the start anodes of gas tubes associated with junctors 1410, 1415, 1514, and 1516.

The junctor circuits are arranged to operate when a mark is present on both the control lead from the line frame and the control lead from the trunk frame. As described for the exemplary system, four of the junctors shown in the drawing are marked from the line side and four of the junctors shown in the drawing are marked from the trunk side but of these only two junctors, 1410 and 1415, are marked on both sides. Now consider tube 1420 of junctor 1410. Presence of the mark on the start anode of the tube through resistor 1421 causes breakdown of the start gap of the tube and presence of the mark on the screen via resistor 1423 permits the discharge to transfer to the main path, that is, from main anode to main cathode. The main anode is connected to ground through resistive-inductive circuit 1425, which is used to provide lock-out as hereinafter discussed. The main cathode of tube 1420 is connected through a capacitor 1426 shunted by a high resistance resistor 1427 and then through the lower winding or relay 1428 to negative battery. When the tube fires in its main gap a current pulse through capacitor 1426 causes operation of relay 1428, the contacts of which shunt capacitor 1426 with a low resistor 1429 so that the relay is held operated by direct current through the tube. Operation of relay 1428 causes battery 1433 to be applied through a small protective resistor 1430, the top closed contact of said relay and the upper winding of said relay to lead 1411, and through resistor 1431 and the bottom closed contact of said relay to the common point of the windings of relay 1432, and then through the lower winding of relay 1432 to control lead 1412.

In the representative showing in the drawing as described above, two junctors were marked on both sides so that the gas tubes in each of these junctors will have a discharge initiated between their control gap cathodes and control gap anodes. In addition to the junctors actually shown, other additional junctors, which may be provided in a typical switching system, will also have voltage potential supplied to both sides thereof. As a result, additional discharges will be initiated across the control gaps of the corresponding tubes of these other junctors. However, as in the exemplary arrangement shown in the drawings, the tubes of all the junctor circuits which are marked on both sides and thus have discharges initiated between their control gap anodes and between their control gap electrodes and voltage applied to their shield or screen members are connected in a lock-out circuit.

The lock-out circuit elements comprising the common impedance network 1425 which is shown as a resistor and inductor connected in series may take any other suitable form. In addition, the control gap cathode is connected to ground through a condenser. The main gap cathode is also connected to ground through a condenser. These condensers are of such size that they maintain these respective cathodes of all of the tubes of a junctor group at substantially the same potential during the lock-out interval. As a result there is substantially no impedance individual to the main anodes or to either the control gap cathodes or the main cathodes of the tube. The only impedance in such circuits during the lock-out interval which takes place before the above-mentioned condensers receive an appreciable charge is the common lock-out impedance 1425. As a result, the discharge initiated between the control gap electrodes of all of the tubes marked as described above can transfer to the main anode in only one tube. Likewise, the transfer to the main cathode can occur only in said one tube, first because the discharge is first transferred to the path between the control gap cathode to the main anode in only one tube due to the lock-out circuits as described above and then to the main cathode which is also connected in a lock-out circuit.

If the transfer has taken place in one of the tubes, the voltage drop across the network 1425 will reduce the voltage on the other main cathodes so that discharges cannot transfer in any of the other tubes. Such lock-out circuits are described in greater detail in the above-identified patent of Hall.

Assuming for purposes of illustration that the discharge transfers in tube 1420 first to the path between the main anode and the control gap cathode and then to the path between the main anode and the main cathode but that a similar discharge is prevented from occurring in any of the other junctor tubes. Thus, by this lock-out action only one junctor will have its gas tube and relays operated so that only one path will be established through the switch network for the connection of the subscriber to a trunk circuit.

With negative battery 1433 applied through low resistance 1430, the current in control lead 1411 increases and since this current flows through diode 1127, relay winding 1132, lead 1126, relay 1123, diode 1111, lead 826, relay 822 and back over lead 811, etc. to positive battery, relays 1132 and 1123 operate. Operation of cross-point relay 1132 shorts out diode 1127 and operation of cross-point relay 1123 shorts out diode 1111 thereby increasing the current in the above described series circuit and causing the operation of relay 822 on its right winding.

Application of negative battery 1433 through low resistance 1431 to the lower winding of relay 1432 and in turn to lead 1412, diode 1730, relay 1734, lead 1723, relay 1725, diode 1721, lead 2113 etc. to positive battery causes an increase in current which operates cross-point relays 1734 and 1725 which in turn short out diodes 1730 and 1721 respectively. The operation of the cross-point relays 1132, 1123, 1734 and 1725 completes a circuit for the operation of relay 2111 as will be described hereinafter.

Shorting of the diodes causes a further increase in current such that relay 1432 operates on its lower winding and relay 2112 operates on its left winding. Operation of relay 1432 closes a holding path to low voltage negative battery 1438 through varistor 1434, through both windings of said relay to lead 1412 and a holding path from battery 1438, through varistor 1435, the upper winding of relay 1428 to lead 1411. Varistors 1434 and 1435 are so poled that negligible current flows through them until the negative battery through resistors 1430 and 1431 is removed. Operation of relay 1436 is caused by ground closed to its winding by a make contact on relay 1432 which also causes lamp 1437 to light as a visual indication of the operation or busy condition of the junctor circuit. The resistor and capacitor 1439 are employed to make relay 1436 slow release. Operation of relay 1436 connects a release transient damping varistor 1440 through the upper winding of relay 1428 to lead 1411 and a negative extinguishing potential 1441 through resistor 1442 to the start anode of tube 1420 and shorts out the lower winding of relay 1428.

When relay 822 operates, it causes the operation of relay 810 which in turn opens the connection from the T and R leads of the line 614 to the contacts of relay 811, opens the main cathode lead 814 of tube 818 which will make this line test busy for any incoming calls, and opens the locking battery to relay 819. Release of relay 819 releases relay 811 and opens lead 824 which permits relay 911, 510, 511, and 512 to return to normal. Release of relay 811 opens lead 823 which permits relay 544 to release which in turn removes anode voltage from tube 918, extinguishing the tube, which releases relays 925, 926, and 927. Release of relay 927 removes the positive voltage mark from lead 930 and thereby from lead 821 to all the line circuits. However, relay 822 holds operated on the circuit from ground through varistor 829, its own two windings in series, the windings of cross-point relays 1123 and 1132, lead 1411, the upper winding of relay 1428, a closed contact of relay 1432 and varistor 1435 to negative battery 1438. At the same time that current is reduced by removal of positive marking voltage, relay 1428 which was held on its upper winding is released.

Release of relay 926 removes main anode battery from the windings of the relays associated with trunk group tubes of the number group and thus relay 950 releases, removing marking voltage from lead 951, which connects by the previously traced path to the common point of the windings of relay 2112 so that the current in the left winding of relay 2112, the windings of cross-point relays 1725, 1734, and junctor relay 1432 is reduced. However, the holding path from battery 1438 in junctor 1410 through varistor 1434, winding of relay 1432, windings of cross-point relays 1725 and 1734, both windings of out-trunk relay 2112 in series aiding and varistor 2114 to ground through the operated contacts of relay 2111 provides sufficient current to hold these relays operated.

The T and R leads of line circuit 800 are carried through the closed contacts of cross-point relays 1123 and 1132 to path 1120 and then through the closed contacts of cross-point relays 1734 and 1725 to the T and R leads of trunk circuit 2109. At this time the direct current through the subset, the line circuit and the switches to the trunk causes the operation of relay 2111 which has its right winding between the T lead and ground and its left winding between the R lead and negative battery. Operation of relay 2111 closes holding ground via lead 2126 to varistor 2114. The varistor connected from lead 2126 to negative battery is used to damp release transients caused by the later removal of holding ground and thereby to prevent accidental refiring of diodes in the switching network. Thus, there is now a connection between line 614 and trunk 2109 through the switches, which is held under control of relay 2111 operated on the direct current flowing through the subset 600. If the subscriber should hang up and interrupt the direct-current circuit by opening switch-hook contacts 612, relay 2111 would release and in turn cause all the associated circuits to return to normal. When the voltage marks are removed from leads 821 and 2113, all switch gas diodes which had broken down to indicate idle paths but which did not take part in the final connection are extinguished and the switches and junctors are ready for use on another connection. The paths through the switching network which were used are marked busy by having the potentials on the control leads altered so they will not be indicated as available when paths are tested in the process of setting up a subsequent call. The extinguishing of all diodes results in removal of voltage marks from all junctors.

The establishment of the connection described above has assumed that all possible paths were idle. When the connection is set up, the control lead 1126 between cross-point relays 1123 and 1132 for instance is negative but near ground potential; thus, if a subscriber connected to the right vertical multiple of switch 1112 desired to make a call or some one desired to call him, diode 1133 would not break down in response to application of marking voltage to this vertical since with path 1126 busy the voltage across diode 1133 is substantially below that required for breakdown, but diode 1134 would break down since path 1117 is idle.

As hereinbefore described, operation of relay 822 initiated a sequence of operations which resulted in the release of relays 510, 512, and 544 and the reoperation of relay 511. Relay 544 in releasing releases the trunk number group so that it is available for use by another receiver-register if required. Release of relay 544 also reoperates relay 825 which recloses main anode battery to the line circuits so that some other subscriber's line gas tube may fire if conditions require it to so do. Operation of relay 825 is delayed slightly by the presence of resistor 827 and capacitor 828 in its winding circuit. This is done to permit the receiver to be completely reset before another line circuit can function to connect to said receiver.

Figure 20:
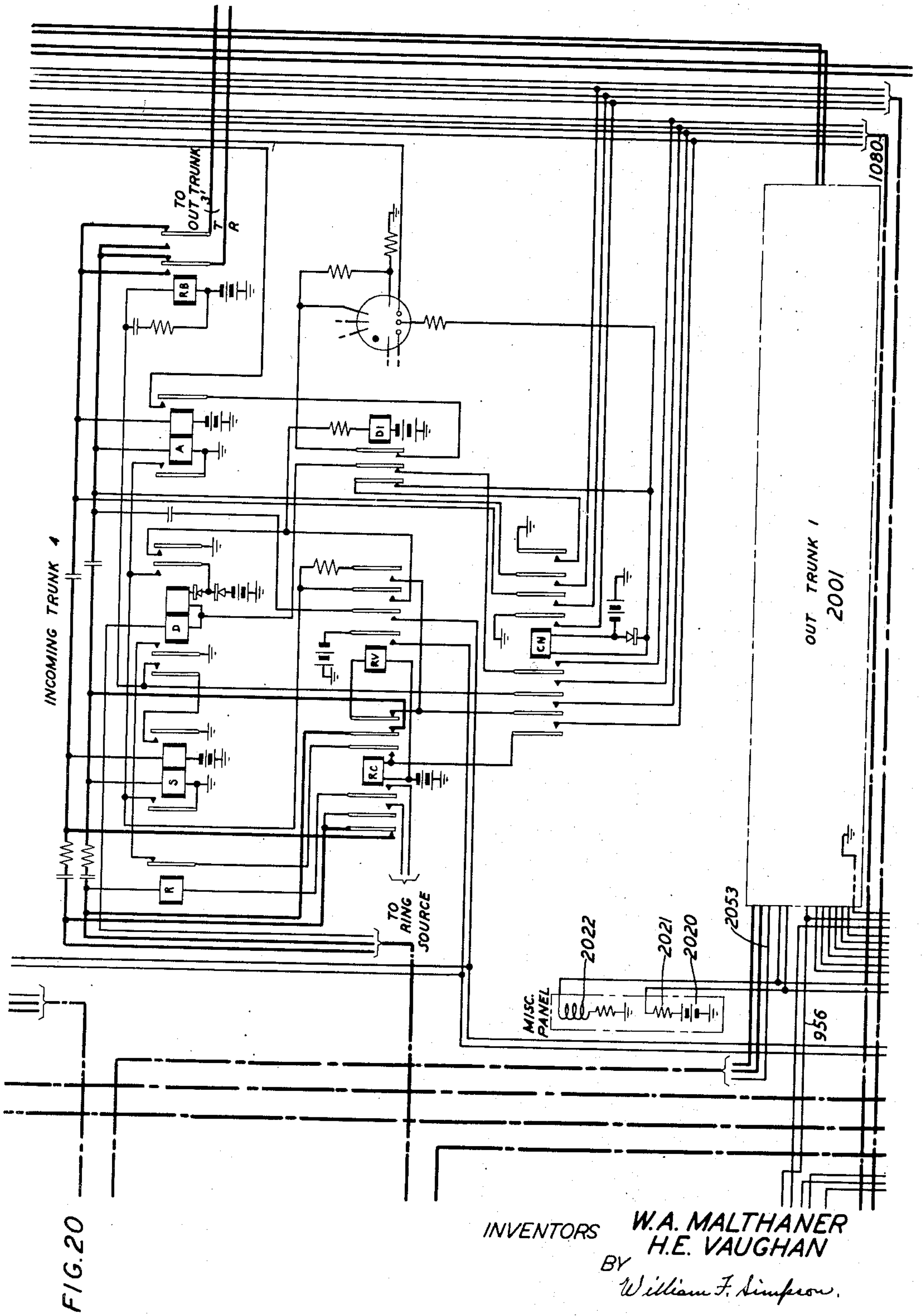
Figure 21:
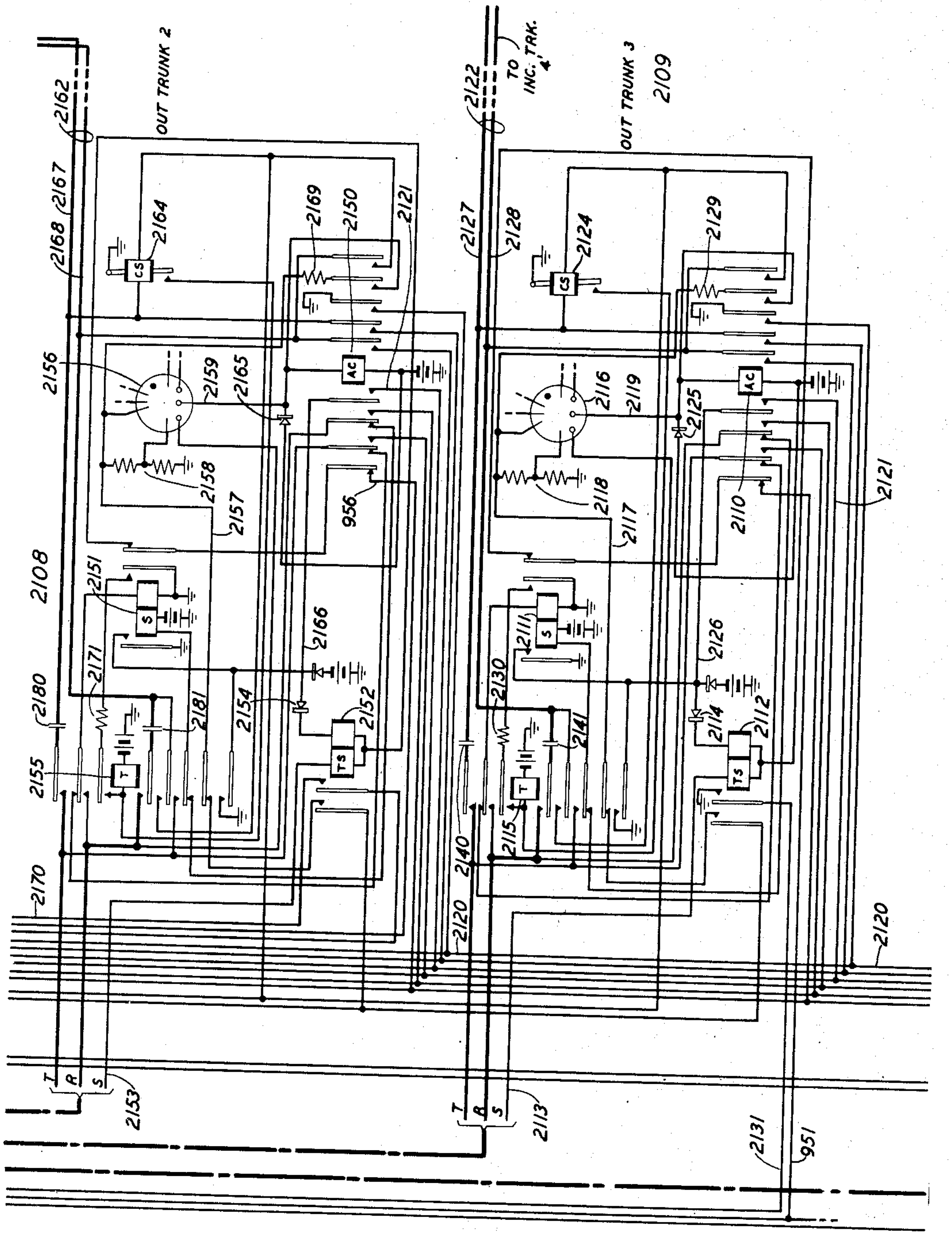
Figure 22:
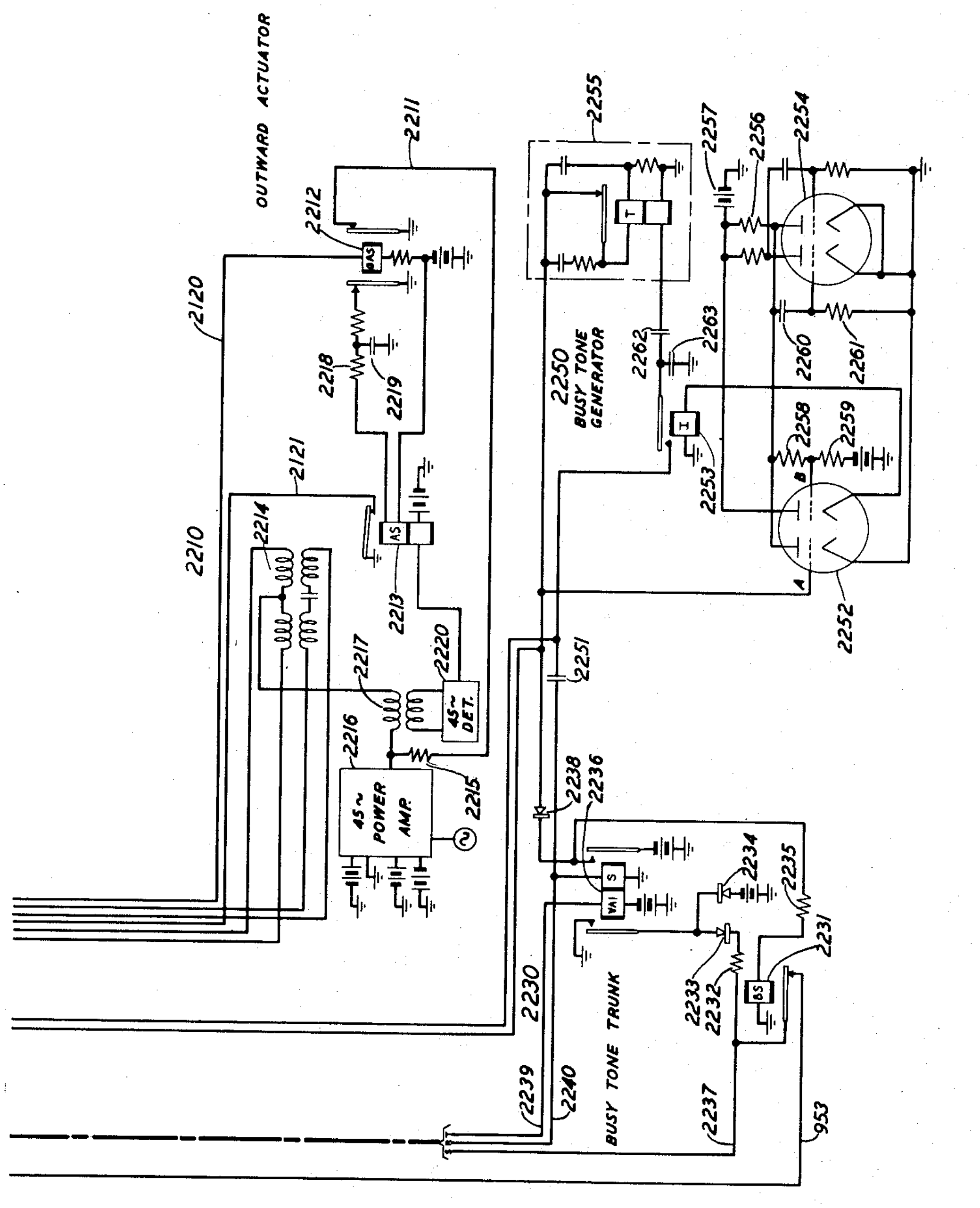
Figure 23:
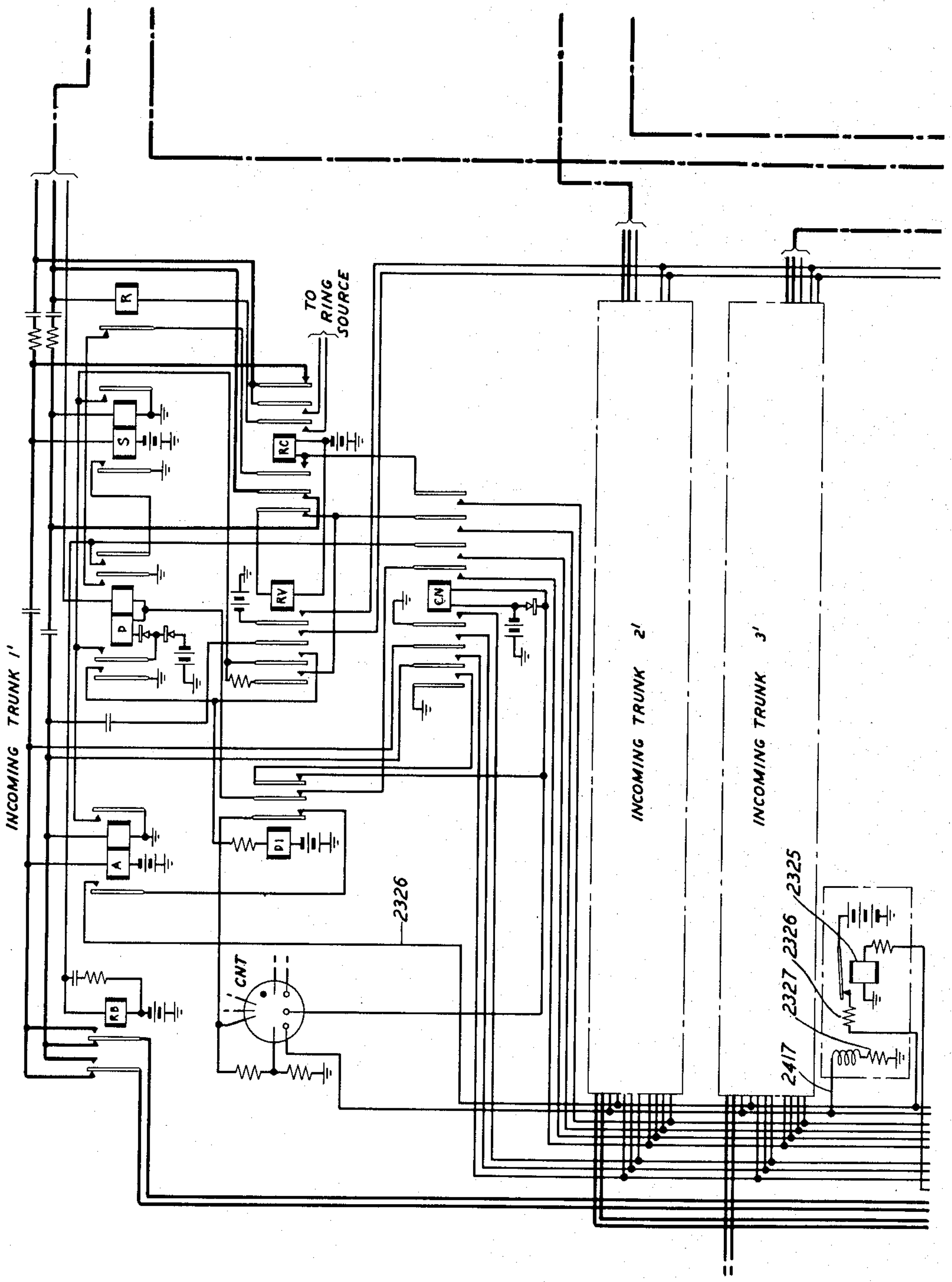
Figure 24:
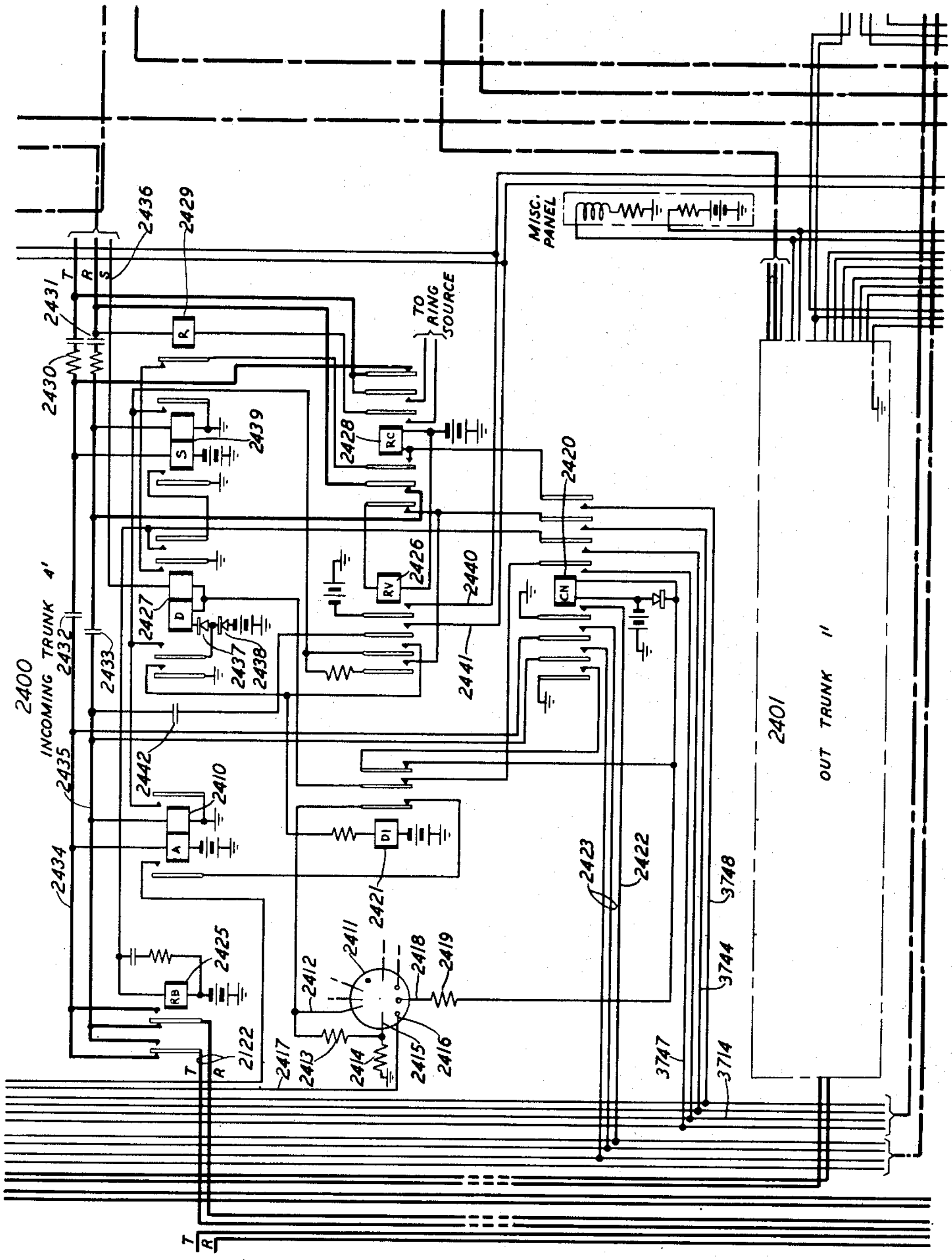
Figure 25:
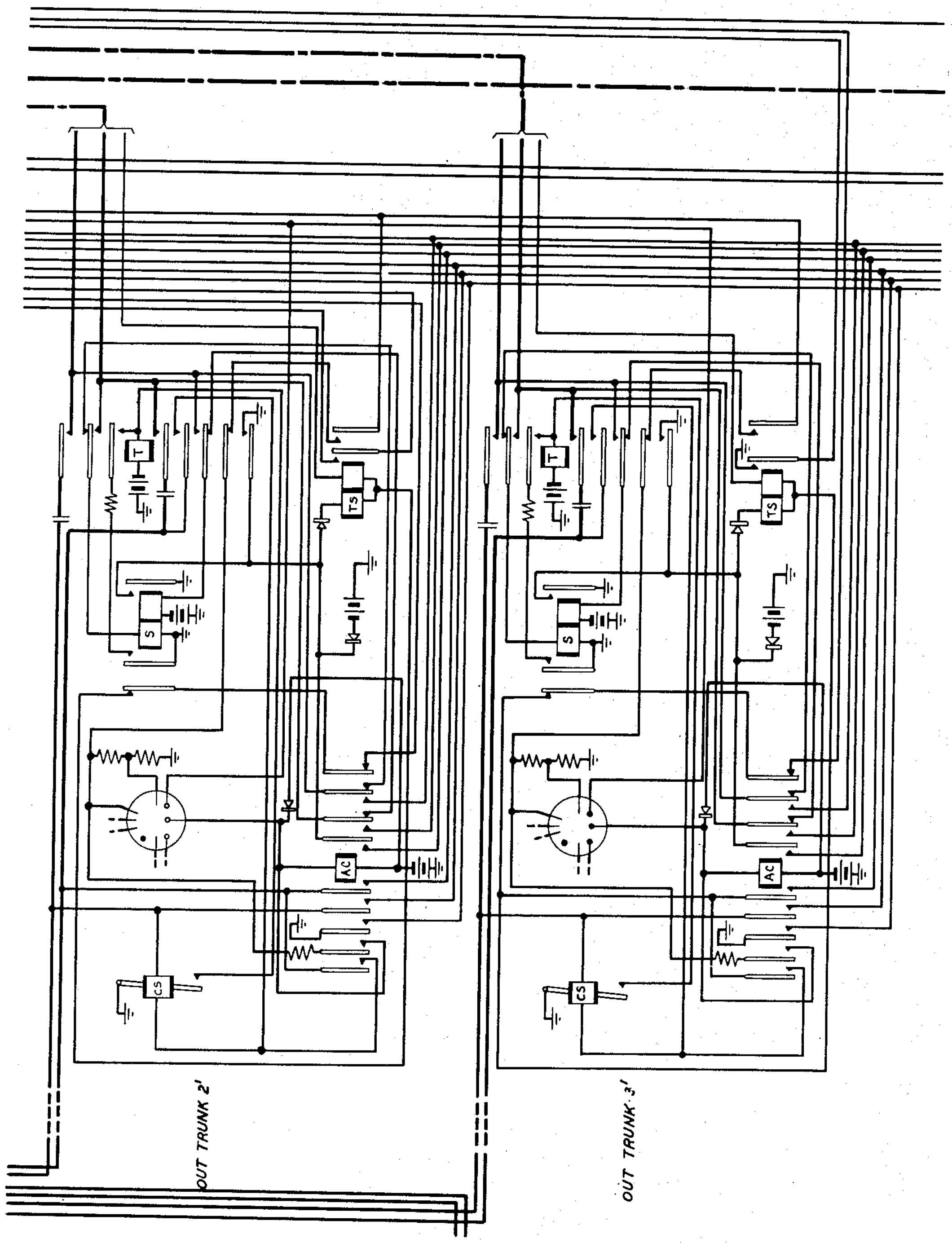
Figure 26:
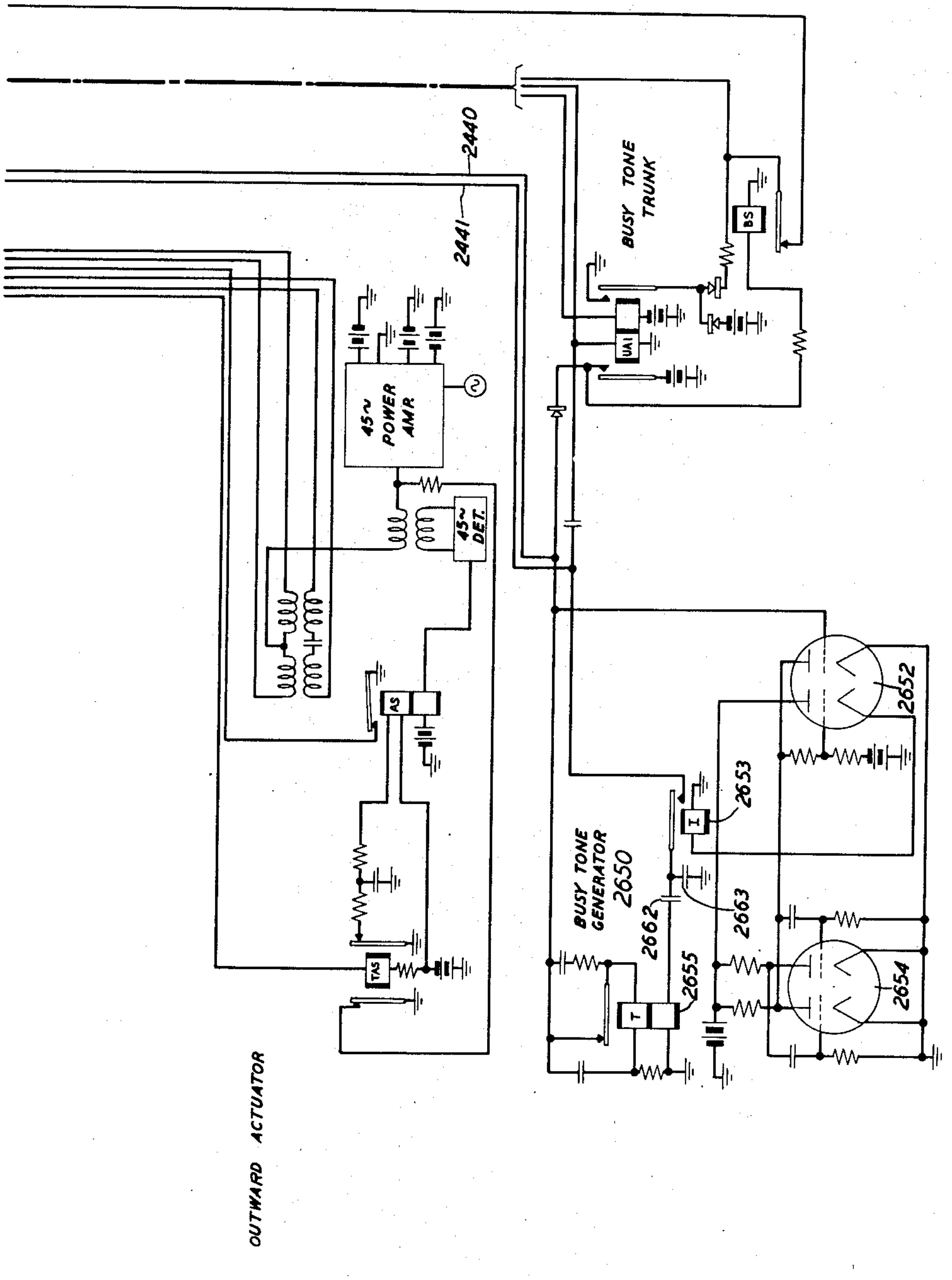

As hereinbefore described the direct-current path across the T and R leads of out-trunk 2109 causes the operation of relay 2111 on a circuit which includes battery, ground and back contacts of relay 2115. The subset at this time is still in the signaling condition since the direction of direct-current flow through polarized latch magnet 617 is in the non-operate direction. Operation of relay 2112 closes a circuit from ground via lead 2131 to the cathode of gas tube 933 making it appear busy for any subsequent calls while the trunk is in use and closes positive battery 2020 through resistor 2021, which is shown in Fig. 20 and is common to all out-trunk circuits, through normal contacts of relay 2115 to lead 2117. Lead 2117 is connected to the voltage dividing network 2118 and to the main anode of gas tube 2116. The tap on voltage divider 2118 is connected to the start anode of tube 2116. If no other out-trunk gas tubes are fired, the voltage condition on tube 2116 will cause breakdown in the start gap and current transfer to the main gap of said tube. Impedance 2022 in Fig. 20 is common to the start cathode of all trunk tubes to provide for transfer lock-out in case of simultaneous tube operation and common resistor 2021 in the main anode provides steady state lock-out. This lock-out circuit operation is disclosed in the heretofore mentioned Mohr and Hall patents. When tube 2116 transfers to its main gap, current in its main cathode circuit flows through the winding of relay 2110 causing its operation thereby connecting outward actuator 2210 to the trunk. Varistor 2125 across the winding of relay 2110 does not affect this operation but is a release transient damping devise used to prevent the refiring of tube 2116 when relay 2110 is released by the later operation of relay 2115.

Operation of relay 2110 extends the ground on lead 2121 to lead 2126 which is already grounded by operation of 2111 and split the trunk so that the T and R leads from the switches are connected to the upper winding of transformer of repeat coil 2214 instead of to the windings of relay 2111. This action causes relay 2111 to be removed from the circuit so that it releases and the ground path furnished to lead 2126 by said relay is removed. The secondary winding of repeat coil 2214 is connected through contacts of operated relay 2110 to leads 2127 and 2128 which connect to the interoffice trunk. Operation of relay 2110 also applies ground to lead 2120 to operate relay 2212 in actuator 2210 and closes a shunting path through resistor 2129 across the main gap of tube 2116 thus reducing the voltage across this gap so that the tube is extinguished but steady state lock-out against the firing of other out-trunk tubes is maintained by the voltage drop across common resistor 2021.

When relay 2212 operates, a shunt resistor 2215 is removed from the output of the 45-cycle power amplifier 2216 so that 45-cycle current flows from the amplifier through the upper winding of monitoring transformer 2217 into the center tap of the upper winding of transformer 2214, through the windings of transformer 2214 on a simplex basis, the closed contacts of relay 2110, and the established path through the switching networks to the subscriber line circuit 614, and the signal generating apparatus of subset 600 to ground. In response to the 45-cycle current, signals are again generated and the called number code transmitted repetitively by the subset as long as the 45-cycle current is supplied as hereinbefore described. Operation of relay 2212 starts the release relay 2213, which is the alternating-current supervisory relay, but due to the network circuit comprising resistors 2218 and capacitor 2219 the relay is slow to release on its upper winding and before it can do so rectified 45-cycle current from the detector 2220 flowing over the subscriber's line and through the lower winding of said relay causes it to remain operated.

Although in the exemplary embodiment of the invention only one outward actuator is shown in each office, in most systems a plurality of outward actuators will be provided with each actuator accessible to an individual specific group of out-trunks through a lock-out arrangement associated with each such trunk-actuator group operating in the manner disclosed herein.

If after this time, the calling subscriber hangs up the 45-cycle current flowing over the subscriber's line and through monitoring transformer 2217 will be stopped by the opened contacts of switchhook assembly 612 and the current in the lower winding of relay 2213 will be reduced and said relay 2213 will release thereby removing ground from leads 2121 and 2126 which will in turn cause the release of the connection through the switches, and actuator 2210 will release due to the release of relay 2112.

Operation of relay 2110 also connects the winding of polar relay 2124 between leads 2127 and 2128 which extend over the interoffice trunk conductors to the incoming trunk circuit 2400 at the distant office thereby providing a direct-current path to the incoming trunk circuit as a signal to the trunk that a call is being placed to it so that said trunk may connect itself to apparatus for receiving digit code signals Signals generated in the subset now pass on a loop basis over line 614, through the switching network and closed contacts of relay 2110 to the upper winding of transformer 2214, and from the lower winding of transformer 2214, through the closed contacts of relay 2110 to leads 2127 and 2128 which connect over the interoffice trunk conductors to the incoming trunk circuit 2400 at the distant office. This condition is maintained until the distant office has all the information it requires regarding the called subscriber's number.

The connection of polar relay 2124 between the tip and ring talking conductors of out-trunk 2109, as described above, completes a direct-current circuit over the interoffice loop conductors 2122 to battery and ground through the windings of relay 2410 in incoming trunk 2400 in the terminating office. Under this condition, relay 2410 operates and the direction of direct-current flow over the interoffice loop is such that polar relay 2124, in the out-trunk remans unoperated. Relay 2410, in operating, connects positive battery from the normally operated contacts of relay 2325 through the closed back contacts of relay 2421 to the main anode 2412 of gas tube 2411 in the incoming trunk circuit and connects a fraction of this same voltage through potential dividing resistors 2413 and 2414 to the start anode 2415 of this gas tube. Start cathode 2416 of this trunk gas tube is connected to ground in common with the start cathodes of similar gas tubes in other incoming trunks through lock-out circuit elements or networks 2327. Under this condition, the start gap of tube 2411 will fire unless other similar gas tubes in the other trunk circuits having access to the same incoming receiver in operating have already caused a voltage drop in the lock-out element 2327. Assuming that tube 2411 fires on its start gap, the dicharge then transfers from start anode 2415 to main anode 2412. The current path between elements 2412 and 2416 of this gas tube, constitutes another stage in the lock-out process, as described in the patents of Mohr and Hall referred to hereinbefore. If tube 2411 is not locked out from service, the discharge finally transfers to the main cathode 2418 at which time the curent flow in this main gap circuit of the tube through resistor 2419 and the winding of receiver and register connector relay 2420 causes the operation of this relay. Relay 2420, in operating, locks to ground under control of a back contact of relay 2421 but the discharge in gas tube 2411 is continued to keep all other incoming trunks in a locked-out condition by means of the voltage drop produced in main anode lock-out resistor 2326 and the resistor in network 2327.

Figure 31:
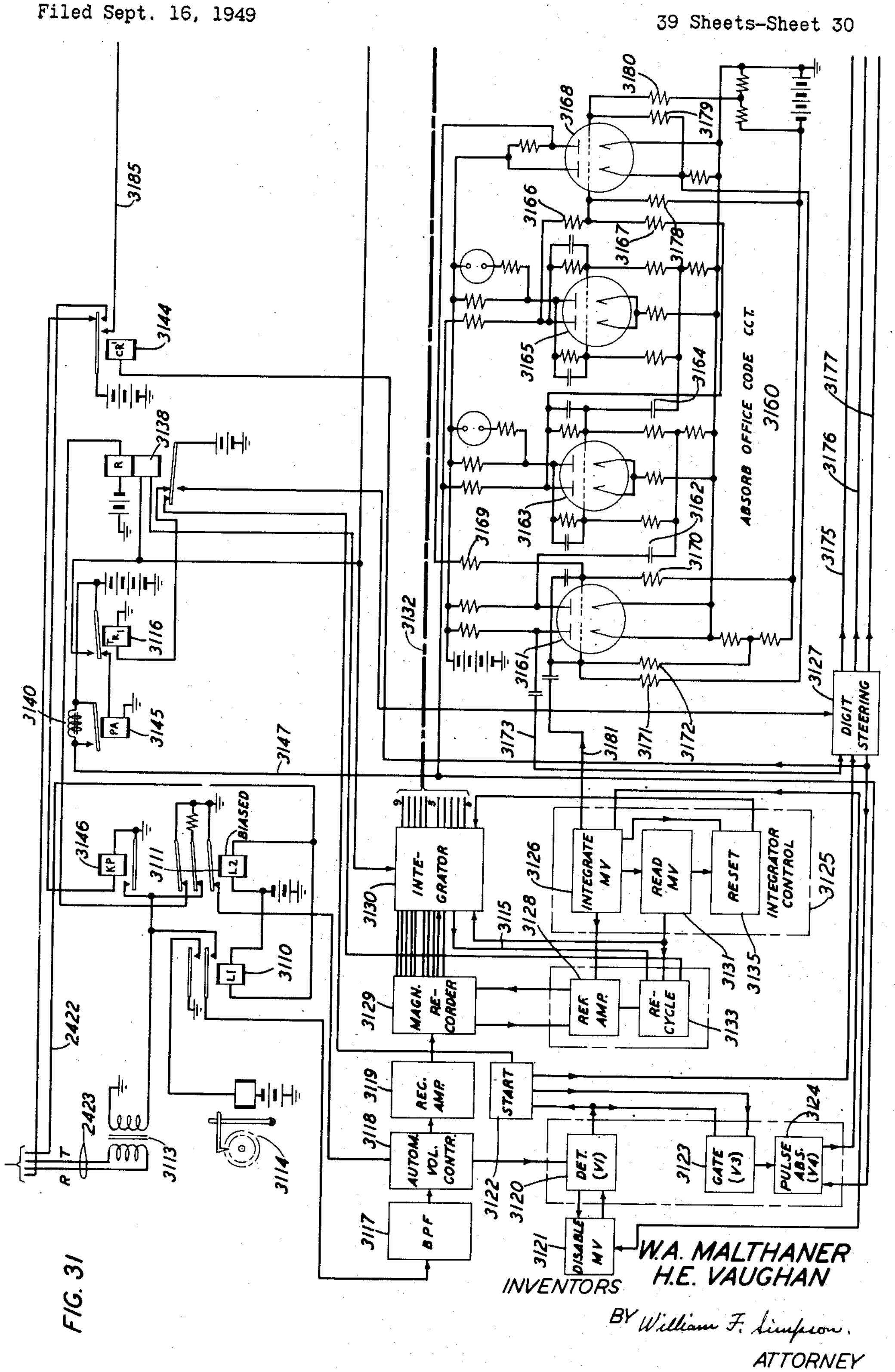
Figure 32:
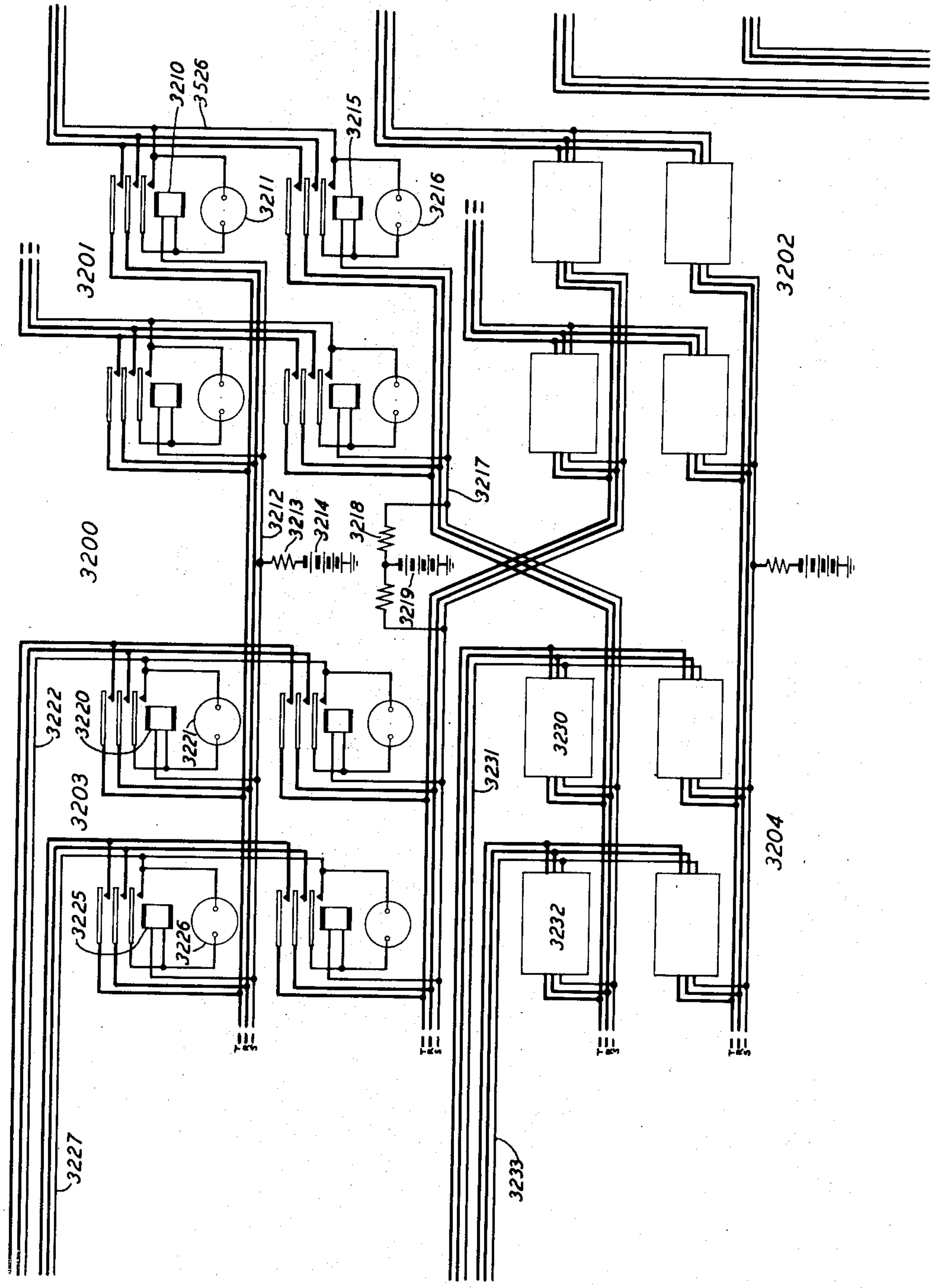
Figure 33:
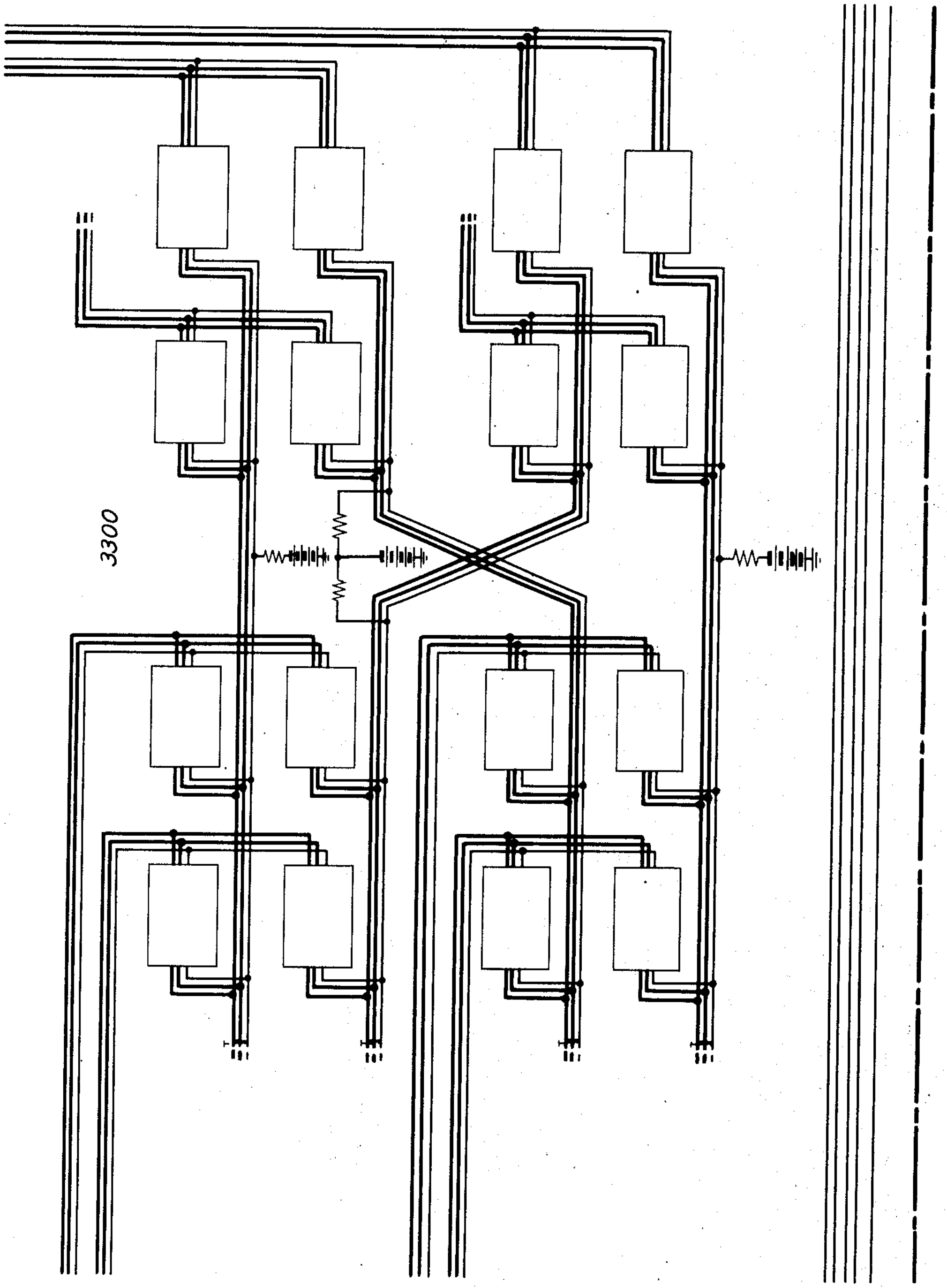

Relay 2420, in operating, closes ground to lead 2422 which operates relay 3110 in the terminating receiver of Fig. 31 and releases relay 3111 which is normally biased into an operated position. Relay 2420 also extends through its operated contacts the incoming tip and ring conductors 2122 from the originating office, on which signaling pulses are now being received, to conductors 2423 to the left winding of the input transformer or repeat coil 3113 of the terminating receiver.

The receiver and register disclosed in the specific embodiment of the present invention as the terminating receiver in office B is similar to the receiver and register disclosed more fully in copending application of Malthaner, Serial No. 68,234 filed on or about December 30, 1948. Alternatively, the receiver and register, disclosed in copending application of Malthaner et al., Serial No. 35,924 filed on or about June 29, 1948, and used in Fig. 16 as the terminating receiver in office A, could also, of course, be used in place of the above-mentioned terminating receiver of Fig. 31 in which case its operation would be as described hereinafter for Fig. 16 and in the corresponding copending patent application.

The operation of relay 3110 in the terminating receiver operates counting device 3114 for supplying a record of the number of times this terminating receiver is used in the establishment of calls and completes the circuit from the right winding of transformer or repeat coil 3113 to band-pass filter 3117 of the receiver circuit. Relay 3111, in releasing, removes a resistance termination from the right winding or repeat coil 3113 so that the incoming signal pulses may pass into the band-pass filter. Relay 3111 also removes ground from the automatic volume control amplifier 3118 so that the incoming signal pulses may cause the gain of this volume control circuit to be adjusted as described hereinafter. In addition, relay 3111 removes ground from the upper winding of relay 3138 permitting this relay to release, and relay 3138 in releasing in turn releases relays 3116 and 3145. The release of relays 3138, 3116 and 3145 connects direct-current power supply voltage to the various control circuits of the receiver so that they are conditioned to receive and decode the incoming signal pulses.

The signaling pulses as received by the receiving circuit first pass through filter 3117 to the volume control amplifier 3118. The gain of said amplifier is regulated by the incoming pulses so that the amplitude of the pulses from this amplifier are substantially independent of the amplitude of the pulses as received. In addition, these signal pulses after being repeated by the amplifier 3118 are transmitted to the digit detector 3120 and this detector circuit repeats a sharpened pulse to the start circuit 3122 and the gate circuit 2123 on the reception of each signal pulse. This gate circuit 3123 is in a normally closed position so that the signal pulses are not repeated through it. However, start circuit 3122 is in a condition to operate and is provided with a timing circuit which recognizes the blank intervals occurring between repetitions of the complete called number designation as transmitted from the calling subscriber's subset. Recognition of a blank interval by start circuit 3122 opens gate circuit 3123 permitting subsequent pulses from detector 3120 to pass through this gate to the pulse absorbing circuit 3124. This pulse absorbing circuit 3124 absorbs the detector pulse associated with the first or start pulse of each digit signal and transmits to the integrator control circuit 3125 a short pulse each time the second or stop pulse of each digit signal is detected. These pulses from the circuit 3124 operate integrator control circuit 3125 which in turn operates digit steering circuit 3127 to cause the registration of the called subscriber's line number as described hereinafter.

The incoming signal pulses after being repeated by automatic volume control circuit 3118 in addition to operating detector 3120 are further amplified by recording amplifier 3119 and recorded on magnetic recorder 3129.

The digital code, as previously described, comprising a series of signal pulses representing a complete number code as preset by the subscriber at his subset, is generated repetitively with a blank interval of two digits duration for use by start circuits, between each complete number code repetition. Digits are transmitted at the rate of 90 digits per second, and each digit is represented by a "start" pulse and a "stop" pulse with the numerical value of the digit defined by the time interval between associated "start" and "stop" pulses. The digital increment which distinguishes one digital value from its adjacent value is called Δ and is approximately 0.44 millisecond. The minimum space between start and stop pulses, which defines the digit one is 8Δ. This minimum spacing is required to permit the transient of a received pulse to decay to a negligible amplitude before the following pulse is received. The spacing between successive start pulses is 25Δ which provides a similar space of 8Δ between the stop pulse position for digital value 0 and the start pulse of the succeeding digit.

The decoding operation of the receiver in Fig. 31 is performed by a signal pulse matching process as follows. Simultaneous with the detecting action, the "start" pulse and in turn the "stop" pulse is recorded on a rotating magnetic disc in recorder 3129. The recorder disc driven by a motor synchronized with the 45-cycle power used in actuators, such as the actuator of Fig. 36, makes one revolution per digit or 90 revolutions per second. After each pulse has been recorded the disc moves it through a reference pick-up or reproducing coil and then through ten additional channel pick-ups in turn. These ten channel pick-up coils are spaced in time around the disc at 8Δ, 9Δ, etc. with respect to the position of the reference pick-up coil to correspond to the possible time spacing of signals in the digital code. Thus, each pulse appears in time sequence on the output of the reference coil and the ten channel pick-up coils so that at the time a "stop" pulse is passing the reference coil, the associated "start" pulse is passing some of the ten channel coils. After a pulse passes the ten channel coils, it comes to an erasing magnet which clears the disk so that it is ready to record the pulses of the next digit.

As described below and more fully in the aforementioned patent application of Malthaner at al., the "stop" pulse output of the reference pick-up is subtracted from each of the ten delayed channel pick-ups and the resulting net difference output of each channel pick-up is rectified and integrated. The channel containing the delay which corresponds to the time spacing between the transmitted "start" and "stop" pulses of the digit will have an integral which does not exceed a reference valve since under ideal conditions the "stop" pulse and the delayed "start" pulse as subtracted should be actually equal and opposite. Following the integration for each digit a test is made for the channel integrator having such a value and after the correspondingly designated digit has been registered, the integrator is reset for use in decoding the succeeding digit.

Thus, magnetic recorder 3129 is a form of delay device having ten digit channel outputs arranged in time sequence so that upon reproduction of the stop pulse of a digit signal in a reference channel, one of these ten outputs should indicate a match as described above corresponding to the transmitted digital value.

The process of matching the second or stop pulse of a digit with the start pulse is accomplished as mentioned above, by recording said stop pulse and then reproducing it through reference amplifier 3128 and adding this reproduced stop pulse in phase opposition in all the delayed start pulse output circuits of magnetic recorder 3129. The identification of a digit corresponding to the information received is obtained from these matched output channels by rectifying and integrating the output of each channel for a short interval after the reception of the stop pulse.

Integrator circuit 3130 is normally held in a reset condition by reset circuit 3135 of the integrator control circuit 3125. Upon reception of the second or stop pulse of a digit, the output of pulse absorbing circuit 3124 causes integrate multi-vibrator 3126 of the integrator control circuit to enable reference amplifier 3128 and in turn, through the matching channels of magnetic recorder 3129 enable the integrator circuit 3130. At the same time, integrate multivibrator 3126 operates reset circuit 3135 to remove the reset condition previously maintained on integrator 3130. Integration is continued for a time interval determined by integrate multivibrator 3126 which is sufficient in duration to include the signal pulse and most of the tail transients which may develop on these signal pulses as described hereinbefore. After this predetermined time interval, integrate multivibrator 3126 returns to normal causing the operation of read multivibrator 3131 which causes a voltage pulse to be developed on one of the ten output leads of integrator 3130 within the group of leads 3132 corresponding to the integrator channel having an acceptable minimum integrated voltage developed in it, which channel is the one corresponding to the received digit signal designation.

A checking circuit is provided in connection with integrator circuit 3130 to insure that on each integration one and only one digital value is established by the integration process. The operation of read multivibrator 3131 causes a signal to be generated on lead 3115 of the integrator 3130 indicating the number of integrator channels having the acceptable minimum integrated voltage. There should, of course, be exactly one such channel. In addition, read multivibrator 3131 in operating, also transmits an enabling signal to the checking or recycle circuit 3133. The signal on lead 3115 is connected to recycle circuit 3133 and if the signal received over this lead indicates that more than one digital value has been identified, the recycle circuit 3133 when enabled directly by the read multivibrator operates relay 3138 on its lower winding and in turn relays 3116 and 3145 causing a reset of all the circuits of the terminating receiver to their initial normal condition and then permits the release of these relays so that the receiver may decode the digital information contained in the next complete transmission of a number from the subscriber subset. In the event no signal is received from the integrator circuit over lead 3115 at the completion of integration, thereby indicating that the digital information for this digit was incapable of being decoded due to signal distortion, the recycle circuit 3133 also operated relays 3138, 3116 and 3145 momentarily, as described above, to reset the circuits for a second attempt at decoding the received signals.

The operation of start circuit 3122 enables digit steering circuit 3127 permitting the output of pulse absorbing circuit 3124 on the reception of each stop pulse to enable, in turn, the various digit register circuits as described hereinafter.

Since this receiver in the exemplary system is required to register only the digits designating the called subscriber's line number, the digits preceding this line number information, which represent the office code and, therefore, were used by receiving equipment in the originating office as described hereinbefore, must be disregarded. This is accomplished by the absorb office code circuit 3160. This absorbing circuit 3160 is operated by pulses transmitted from integrate multivibrator 3126 at the end of each integrate period over lead 3181 through a small coupling condenser to both grids of tube 3161 which is a gate tube permitting the pulses to be repeated either to tube 3163 or to the digit steering circuit 3127. In this pulse absorbing circuit tubes 3163 and 3165 are two double stability or flip-flop circuits arranged to form a two-stage binary counter. These two counter stages jointly control tube 3168 so as to enable either the left section or the right section of gate tube 3161 depending upon the setting of said counter stages.

In the normal condition of this absorbing circuit, counter tubes 3163 and 3165 are conducting in their left sections and cut-off in the right sections. In this normal condition, voltage connected from the left plate of counter tube 3163 through resistance 3167 to the left grid of tube 3168 together with a similar voltage connected from the left plate of tube 3165 though resistance 3166 to the same grid of tube 3168 causes this left section of tube 3168 to be cut off. With the left section of tube 3168 cut off, ground is connected from the cathode of this section through resistor 3179 to the grid of the right section of tube 3168 and negative battery is connected through resistor 3180 to the same right grid. The bias thus established on the right section of tube 3168 keeps this right section also cut off. At this time, ground from the left cathode of tube 3168 is connected through resistance 3171 to the left grid of tube 3161 which, together with the negative voltage supplied to this same grid through resistor 3172, keeps this left section of tube 3161 also cut off. Positive voltage taken from the right plate of tube 3168 through resistor 3169 to the right grid of tube 3161 together with the negative voltage supplied to this same grid through resistor 3170 enables the right section of this tube to just below cut off so that it will amplify the pulses received over lead 3181 from the integrate multivibrator. The negative pulses thus produced in the plate circuit of the right section of tube 3161 are connected through condenser 3162 to the first stage of the counter 3163. Each pulse thus received by counter stage 3163 causes a reversal of the current conditions in the two halves of the stage and the negative pulses generated in the left plate of tube 3163 each time it returns to its normal condition are connected through condenser 3164 to the second stage of the counter 3165 causing its operation in a similar manner.

When three pulses have been transmitted to the counter circuit from lead 3181 and through the right section of tube 3161, indicating that the first three digits of the incoming number signals have been received, both counter tubes will be conducting in their right sections and cut off in their left sections, thus raising the voltage at the plates of these left sections. The voltage, thus connected to the left grid of tube 3168 through the circuit of resistors 3166 and 3167 previously described, brings the left section of tube 3168 to full current conduction, and with the left section of tube 3168 at full conduction, the positive voltage developed in the cathode of this section and connected through resistance 3179 to the grid of the right section brings this right section into a similar conducting condition. With both sections of tube 3168 at full conduction, the potentials which this tube applies to the two sections of tube 3161, through resistors 3171 and 3169 as previously described, causes the right section of tube 3161 to be cut off and the left section to be enabled to just below cut off. With the left section of tube 3161 thus enabled, subsequent pulses from the integrate multivibrator 3126 over lead 3181 are amplified and repeated on lead 3173 to the digit steering circuit 3127.

Figure 34:
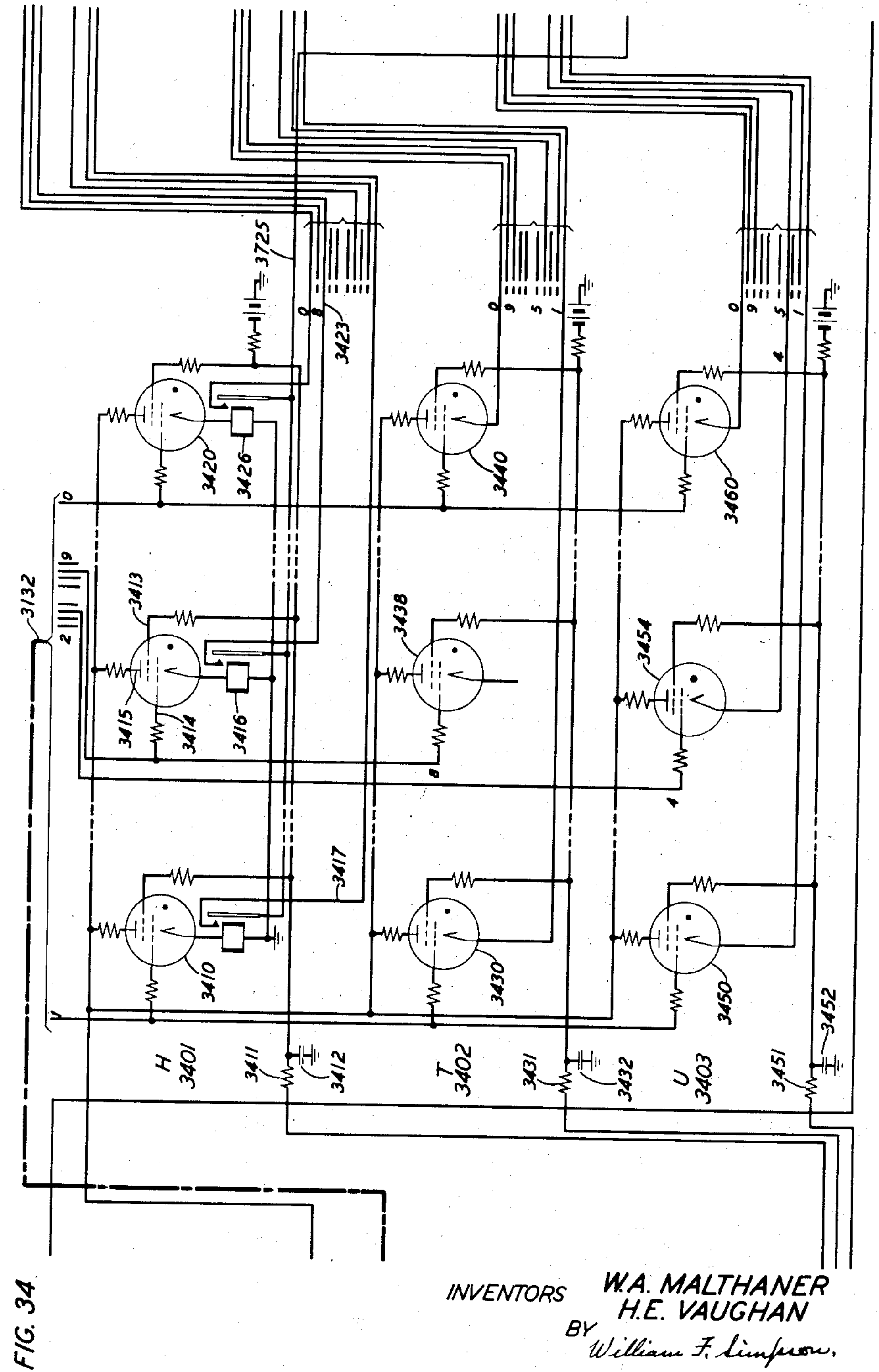
Figure 35:
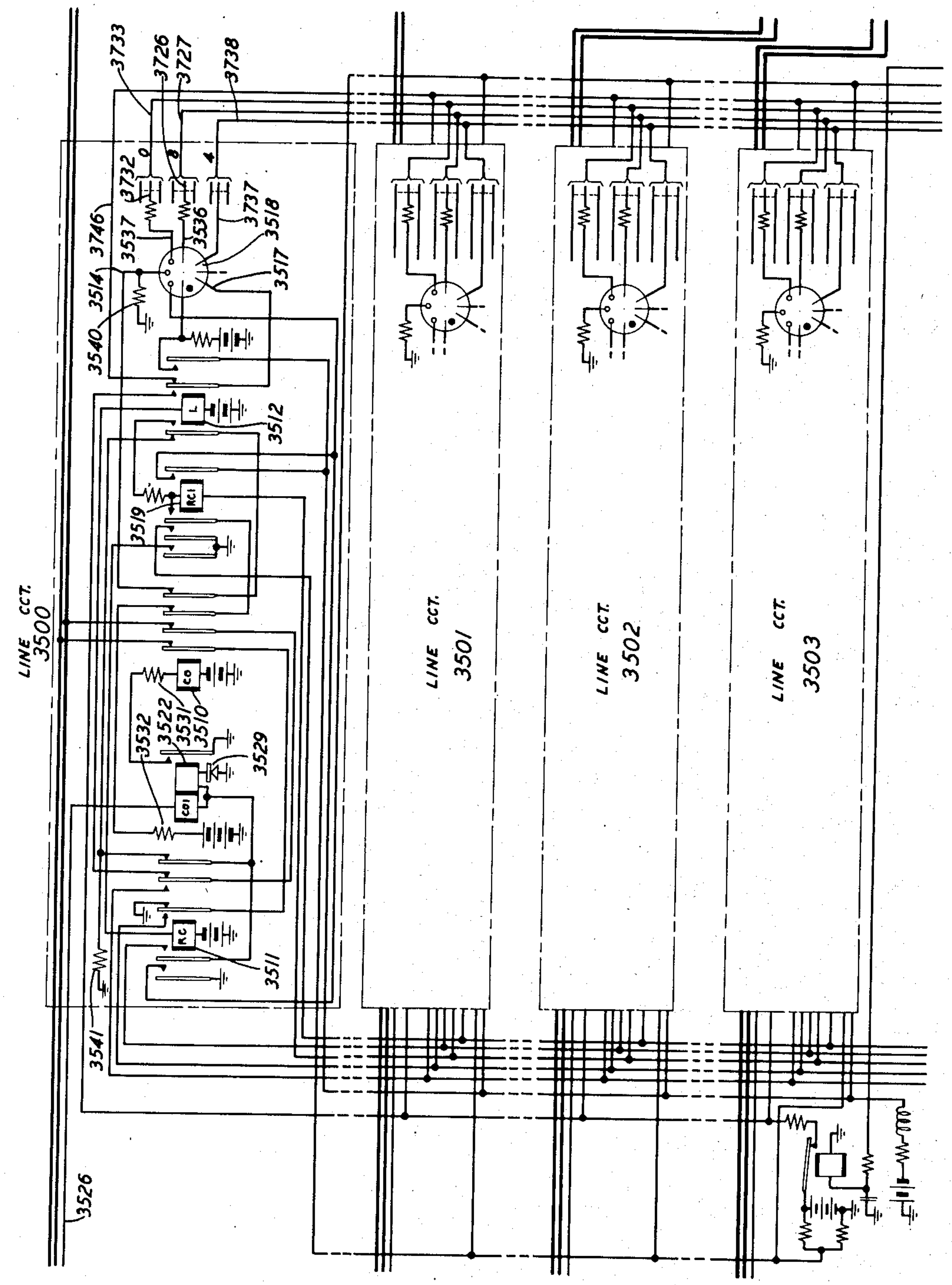
Figure 36:
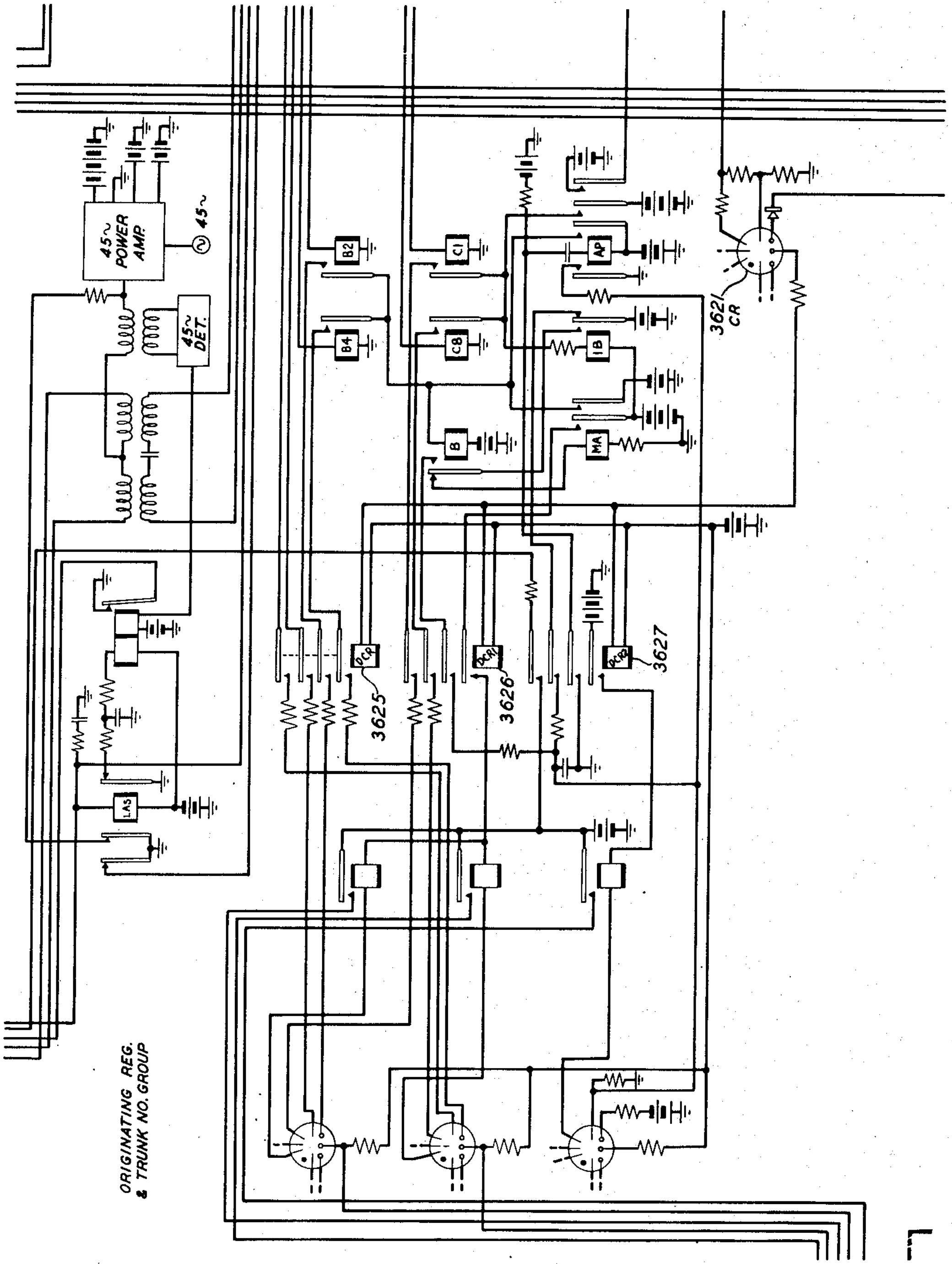

The first pulse received by digit steering circuit 3127 over lead 3173, indicating that integration has been performed for the first digit that it is desired to register, causes the application of a positive potential on lead 3175 to the first row of register gas tubes 3401 in the register circuit shown in Fig. 34. This voltage applied to lead 3175 is connected through the pulse shaping network of resistor 3411 and capacitor 3412 to the screen electrode 3413 of register tube 3410 and to the screen electrode of nine other gas tubes of which only an intermediate and last tube are shown in detail in a similar manner in the digit register row 3401, associated with the first digit to be registered. This voltage, applied to the screens of the ten tubes associated with possible digit values of the first digit, enables these tubes so that the application of a positive voltage on the grid electrode of a tube in this row will fire the tube and cause full conduction through it. The voltage pulses for firing one of these register tubes is obtained from one of the ten input leads of the integrator circuit 3130 in group of leads 3132 which are connected to ten correspondingly designated vertical columns in the gas tube register circuit of Fig. 34. If, for example, the value designated by the integrator circuit for the first digit is eight, a positive voltage is transmitted from the integrator circuit 3130 upon the application of the read pulse through resistor 3414 to the grid of the register gas tube 3418 designating the digit eight and through similar resistors to the corresponding grids of the other gas tubes in the same vertical column, at a time when screen 3413 has been enabled by the steering circuit as described above. This will result in the firing of register tube 3418 and the operation of relay 3416 in its cathode circuit. In a similar manner, at the end of the second digit the screen electrodes of the second row 3402 of the register circuit comprising ten tubes such as 3430, 3438 and 3440 are enabled by the digit steering circuit over lead 3176 and a pulse on one of the ten integrator output leads within the group of leads 3132 fires one of the ten register tubes provided for the second digit. In a similar manner, the third row 3403 of the register circuit is enabled by the steering circuit over lead 3177 and one of its ten tubes fired by a voltage pulse from the integrator 3130 for the third digit.

Figure 37:
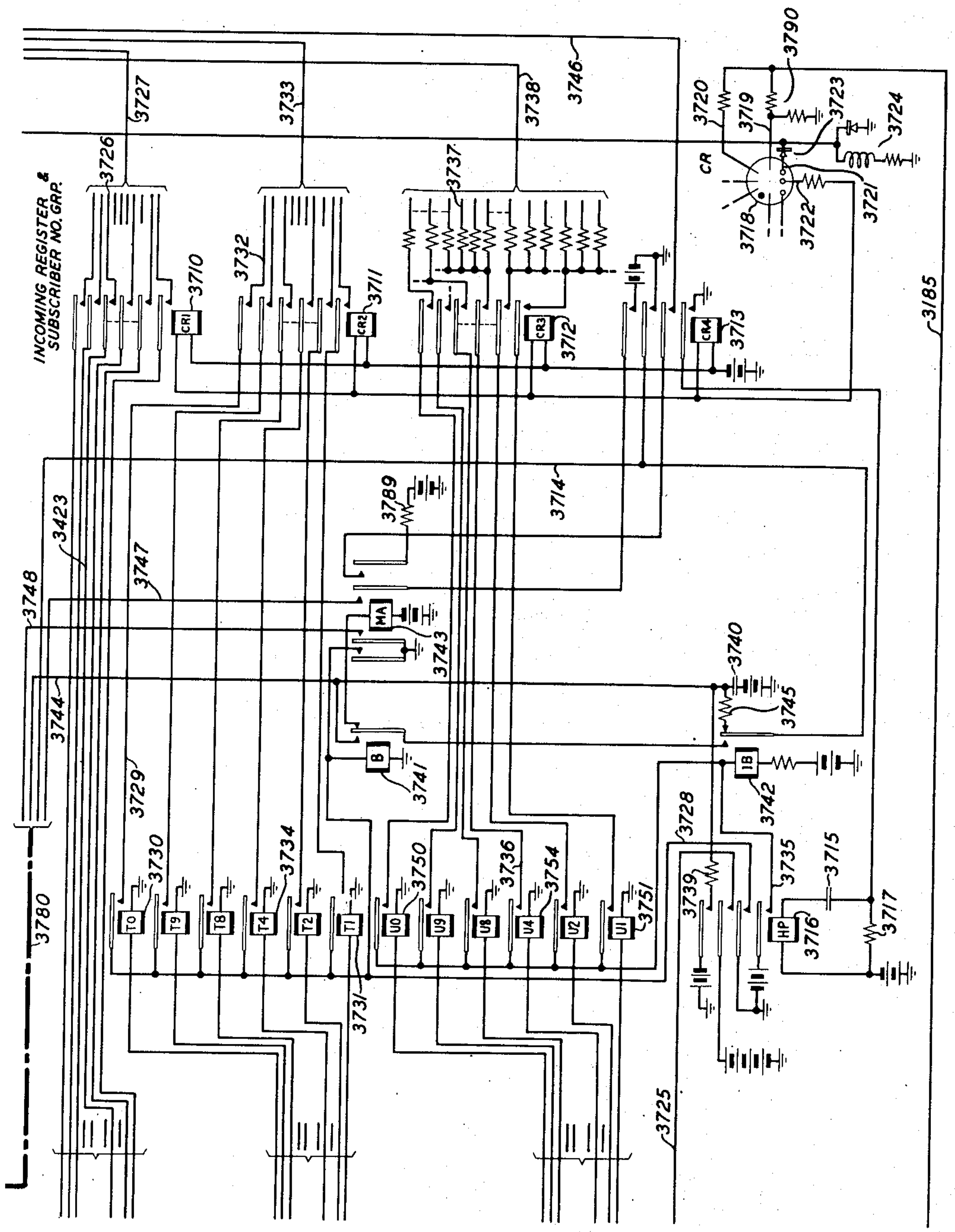
Figure 38:
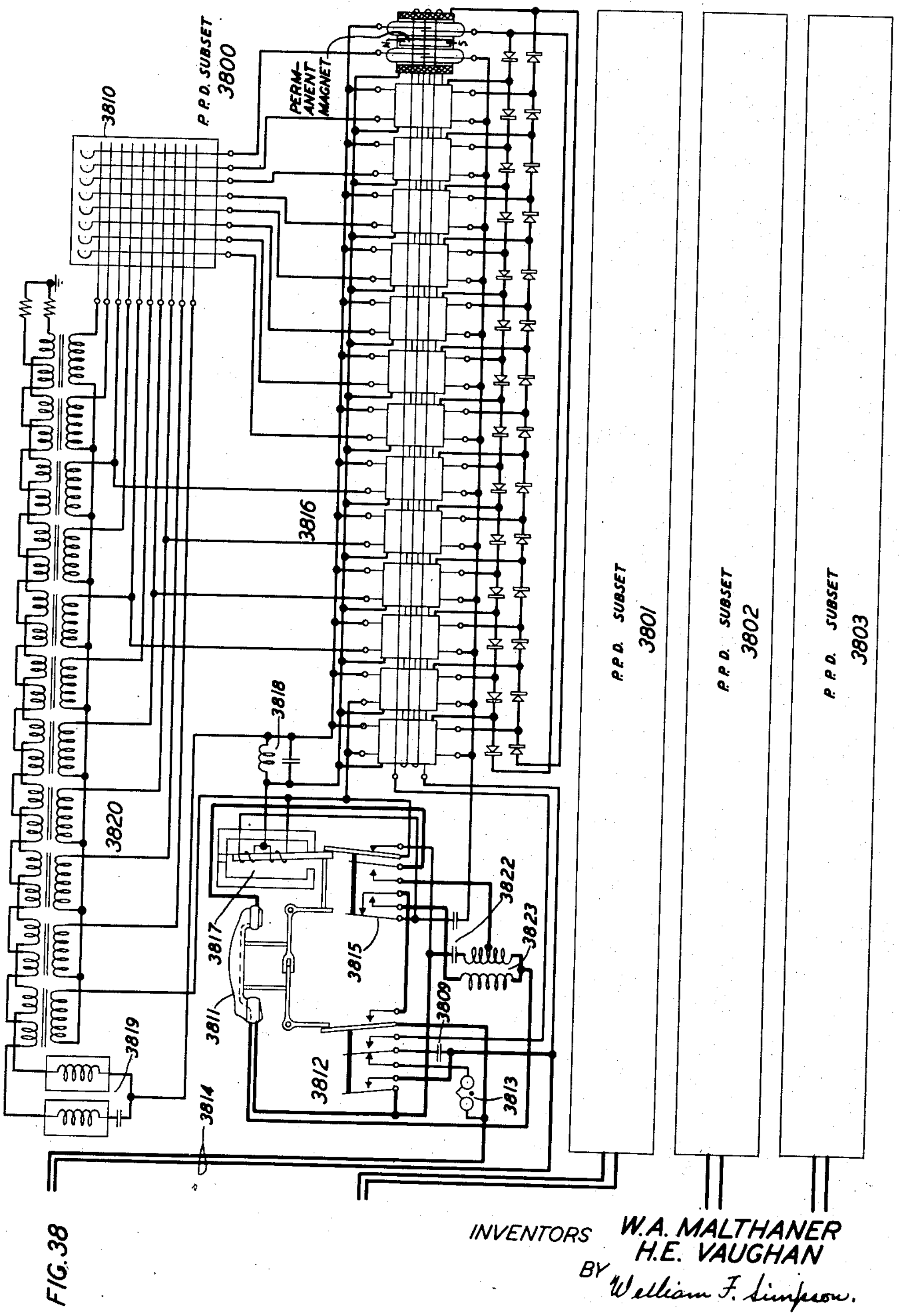
Figure 39:
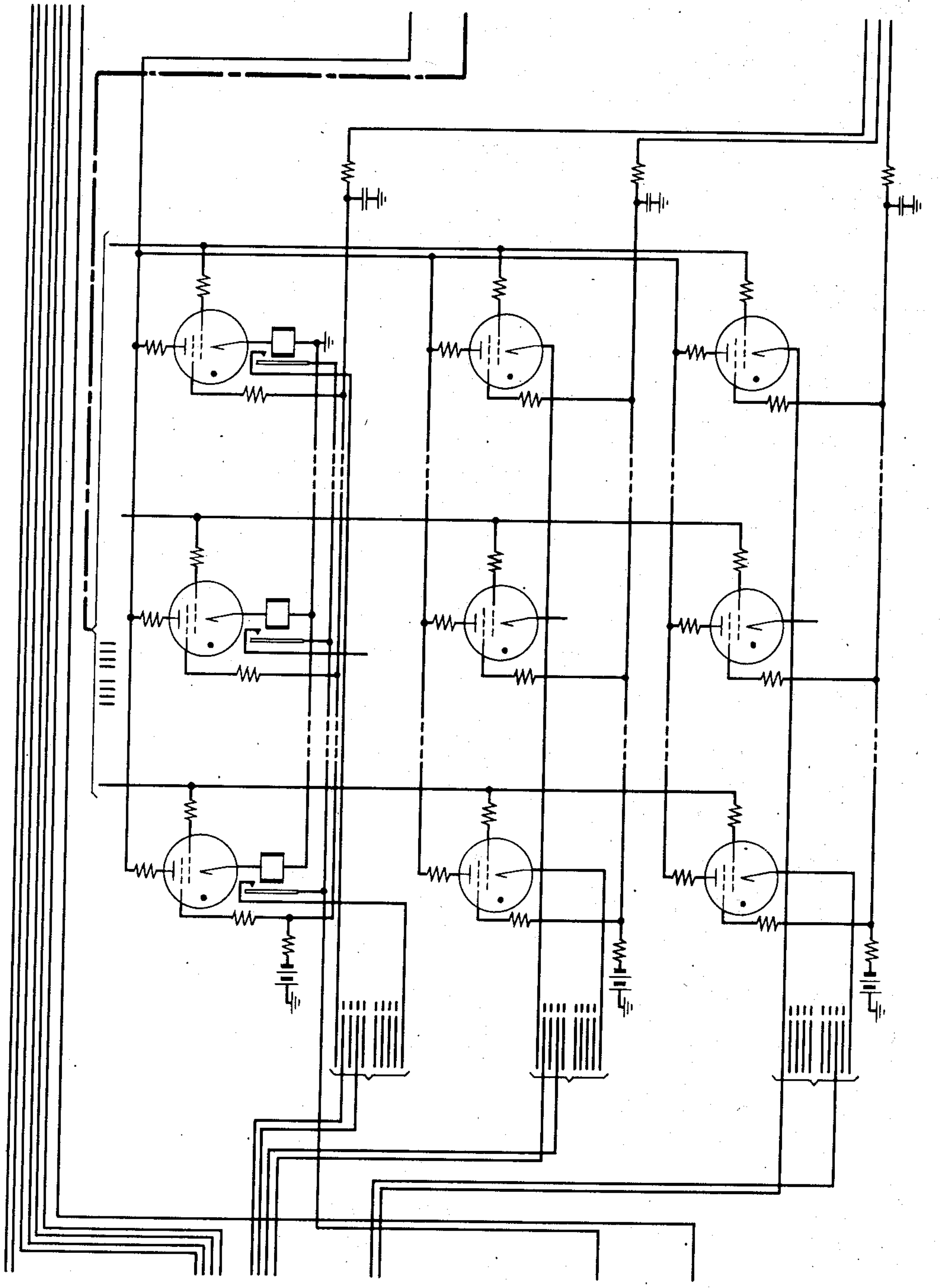
Figure 40:
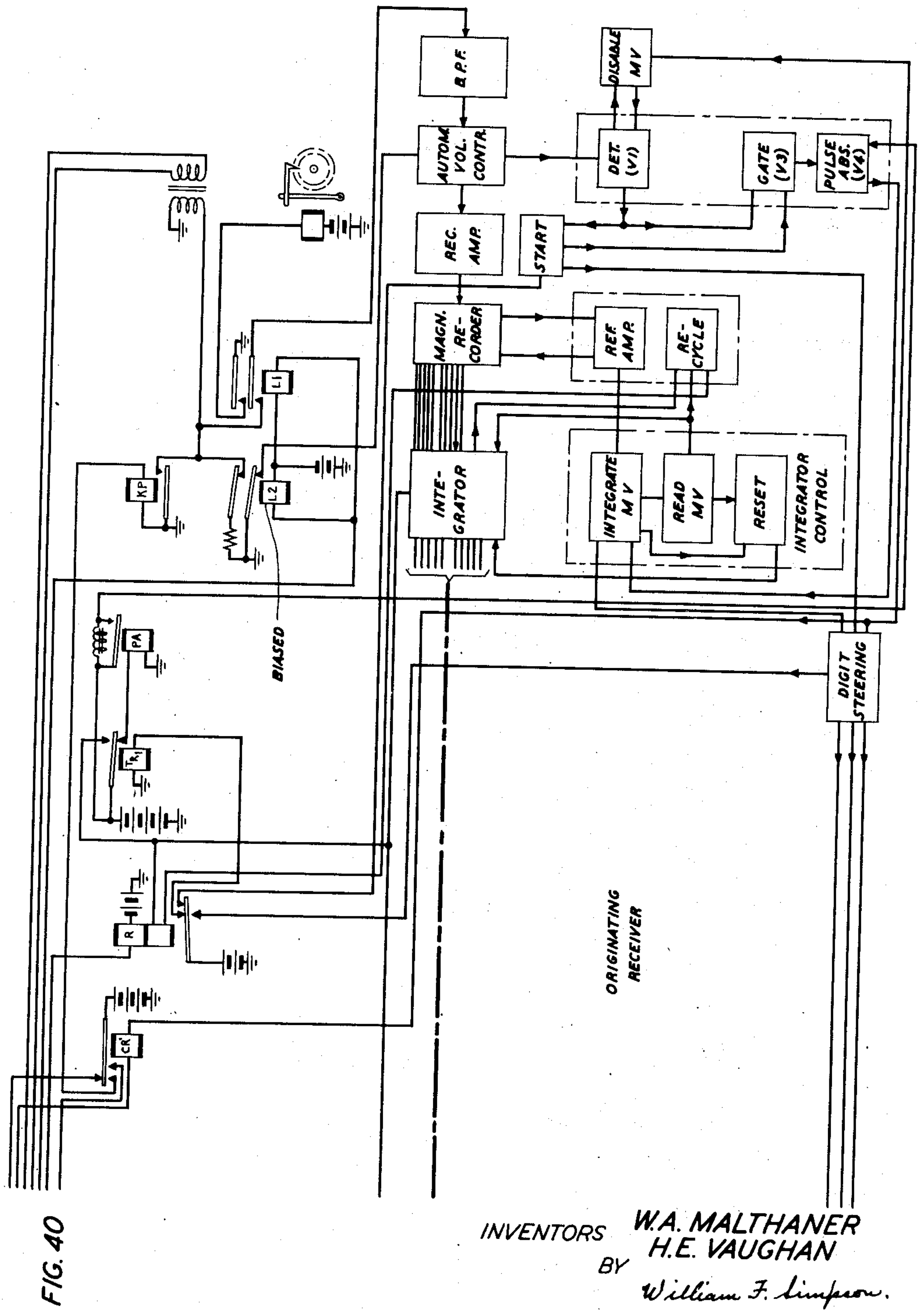

The operation of a register tube in row 3402 causes the operation of the corresponding relay in the group of ten register relays 3730 to 3731 shown in Fig. 37. Assuming that the designation of the second digit is zero, for example, relay 3730 will be operated in the cathode circuit of tube 3440. In a similar manner the digit registered on one of the gas tubes in row 3403 of the register circuit of Fig. 34 results in the operation of a corresponding relay in the group of ten relays 3750 to 3751. If the value of the third digit, for example, is 4, relay 3754 will be operated in the cathode circuit of fired tube 3454.

After the digit steering circuit 3127 has enabled the three rows of register gas tubes, in turn, it then operates relay 3144 as an indication that the registration has been completed. Relay 3144, in operating, operates relay 3146 and releases relay 2325. Relay 3146, in operating, short-circuits the right winding of input repeat coil 3113 of the receiver so that subsequent signal pulses or transients set up in the signaling circuit by subsequent switching operations will not result in the alteration or mutilation of the numbers now registered in the register circuit of Figs. 34 and 37. Relay 2325, in releasing, removes battery from lead 2326, extinguishing gas tube 2411 in the incoming trunk circuit 2400 and preventing the operation of similar gas tubes in other trunk circuits in the same receiver group until after the release of the terminating receiver as described hereinafter. Relay 3144, in operating, also connects positive battery to lead 3185 to connect this receiver to the subscriber's number group circuit, as described hereinafter.

As described above the voltage on lead 3185 is applied to the main anode 3720 of cold cathode tube 3718 through a resistor and to the start anode 3719 of this gas tube through a potential dividing resistance network 3790. The start cathode 3721 of this gas tube is permanently connected through varistor 3723 to the lock-out element 3724. This lock-out element also connects in a similar manner to the start cathode of gas tube 3621 in the trunk number group circuit of Fig. 36. Since the connections through the switching network, which these connector circuits in part establish, must be performed on a one-at-a-time basis as described hereinbefore, lock-out is provided between the connector tubes 3718 and 3621 by the lock-out elements on a simultaneous basis by the inductance of element 3724 and on a steady state basis by resistance in order to prevent the operation of connector relays 3625, 3626, and 3627 of the trunk number group at a time when the connector relays 3710, 3711, 3712 and 3713 of the subscriber number group are operated and vice versa.

Although only one originating and one terminating receiver is shown in each office in the drawing, a plurality of each type receiver may be and usually will be provided, each receiver serving a group of line or incoming trunk circuits and each receiver having access to the corresponding number group circuit through the lock-out arrangement shown so that this lock-out may serve to insure that only one connection between a number group circuit and a receiver exists at one time regardless of the fact that there are two types of number group circuits in an office and that receivers may desire simultaneously to connect to the same or different number groups.

The voltage applied to tube 3718 results in the firing of the tube between the start anode 3719 and the start cathode 3721, followed by transfer to the main anode 3720—start cathode 3721 path, and either of these operations may be prevented if tube 3621 of the trunk number group is fully operated or simultaneously attempting to operate.

Assuming that tube 3718 is not locked out by this process, the discharge within it will finally transfer to the main anode 3720—main cathode 3722 path, thereby operating connector relays 3710 to 3713, inclusive. Relay 3710 connects ten test and control leads, associated with the possible first or hundred digits of called subscriber line number designations, from the cold cathode gas tubes of the line circuits to the incoming register of Figs. 34 and 37. Relays 3711 and 3712 make similar connections for the test and control leads associated with the second or tens digits and with the third or units digits of possible line designations respectively. The operations over these leads will be described hereinafter.

Connector relay 3713 completes, in part, circuits for controlling the switching network, as described hereinafter, and connects ground to lead 3714 for interpreting the results of an idle, busy or vacant test to be performed on the designated called line and to cause the circuits of the originating office and the calling subscriber's subset to transfer from signaling condition to a talking condition.

This transfer to a talking condition is accomplished as follows: The ground, applied to lead 3714, extends through contacts of the operated receiver connector relay 2420 of the incoming trunk 2400 to operate relay 2425. Relay 2425, by means of its transfer contacts reverses the connections between the interoffice loop conductors 2122 and the ground and battery supplied to these conductors through the windings of relay 2410 thus causing a reversal in the direction of direct-current flow over this interoffice loop and through the winding of polar relay 2124 in the associated out-trunk 2109 of the originating office. Relay 2124 now operates, in turn operating relay 2115.

Relay 2115 applies ground through varistor 2114 to the right winding of relay 2112 to maintain a holding condition on relay 2112 and on the connection established through the switching network of this originating office, as previously described. Relay 2115, in operating, also reconnects battery and ground through the windings of relay 2111 to the tip and ring conductors extending from this out-trunk through the switching network and over the calling subscriber's loop 614 to the calling subscriber's subset in the reverse manner to that in which the connection of this relay to the subscriber's loop was originally made as described hereinbefore. The reverse flow of direct current thus established through the windings of polar latch magnet 617 of the calling subscriber's subset causes this magnet to operate releasing the previously latched switchhook contact assembly 615, thus removing from the loop conductors 614 the signaling apparatus in the subset comprising digit selector 610, digit stepper 616, signaling pulse generator transformers such as 620 and 621 and the other signaling apparatus previously described, and in turn connecting to the loop conductors 614 the usual talking apparatus comprising a transmitter and receiver in the handset 611, condenser 622 and the induction coil of transformer 623. Relay 2115 in operating also opens the path from common battery 2020 on which the actuator connector relay 2110 was being held permitting relay 2110 to release and thus opening the connections between out-trunk 2109 and outward actuator 2210. Interruption of the path from the common battery 2020 will permit tubes corresponding to tube 2116 of other out-trunk circuits to fire in lock-out if they are waiting for connection to an actuator circuit.

Relay 2212 in the outward actuator circuit now releases, reestablishing a ground connection through conductor 2211 and resistor 2215 to the output circuit of signaling power amplifier 2216, thus discontinuing transmission of signaling power through output transformer 2214. Relay 2212 also establishes a holding connection on the upper winding of relay 2213 in turn maintaining ground on lead 2121 to all the out-trunk circuits in this actuator group.

Relay 2115 also closes a circuit for maintaining the connection of the winding of relay 2124 between the tip and ring conductors of interoffice leads 2122 after the release of relay 2110. Relay 2115 connects the tip and ring conductors of the loop extending to the calling subscriber to the tip and ring conductors of interoffice loop 2112 through series capacitors 2140 and 2141 respectively, thereby establishing a talking connection between the said subscriber's loop and interoffice loop conductors. Relay 2111, operating on the direct current applied over the subscriber's loop circuit from the battery and ground connected to its windings, supplies an additional holding ground through varistor 2114 to relay 2112 and the switching network connection through the origniating office, and also completes a locking circuit for relay 2115, thus placing the maintenance of the connection established between the calling subscriber and this out-trunk circuit now under the control of switchhook contacts 612 of the calling subscriber's subset and direct-current relay 2111 of this out-trunk.

Meanwhile relay 3713 supplies ground through capacitor 3715 for momentarily operating relay 3716 in order to start the process of selection of the called subscriber's line and the busy-idle-vacant test of this line. Relay 3716 in operating connects positive battery to lead 3725 which passes through the contacts of the operated relay associated with the first digit of the called subscriber's number in register row 3401, such as relay 3416 if the registered digit is 8. From the contacts of this relay the voltage is extended to the associated register lead, lead 3423 in this exemplary case of the digit 8. Lead 3423 is in turn connected through operated contacts of relay 3710 to lead 3726 within the group of conductors 3727 and in turn through a resistor to start anode 3536 of the designated called line gas tube 3518 of line circuit 3500 and through similar resistors to the start anode of similar gas tubes in other line circuits having the same first digit designation. Ground is also connected by the operation of relay 3716 to conductor 3728 and in turn through the operated register relay associated with the second designating digit of the called subscriber's line, such as relay 3730 if this second digit is 0, to conductor 3729 and in turn through an operated contact of relay 3711 to conductor 3732 of the group of conductors 3733. This ground connection is extended through a resistor to the start cathode 3537 of the gas tube 3518 in the called subscriber's line circuit and through similar resistors to the start cathode of similar gas tubes in other line circuits having the same second digit designation. These potentials, applied to the start cathode and start anode, result in the firing of this gap in all gas tubes having this combination of first and second digits. However, relay 3716 also connects positive battery to conductor 3735 and through the register relay associated with the third digit of the called subscriber's number, such as relay 3754 if this third digit is four, and in turn to conductor 3736. This voltage on conductor 3736 is further extended through an operated contact of relay 3712 to the common junction of a group of resistors, one resistor for each possible first digit, and through one of these resistors to conductor 3737 within the group of conductors 3738 to anode 3737 of the called line gas tube and to the corresponding anode of gas tubes in the other line circuits and having the same last digit as this designated line. The voltage connected through a contact of relay 3712 to the group of resistors associated with the registered third digit is similarly connected through other resistors of the group to the anodes of groups of line tubes having other first digits. Thus, of the group of line gas tubes fired on the start cathode-start anode gap only the tube in the designated called line circuit will also have voltage applied to the second anode and thus will be the only tube to transfer its discharge to the second anode-start cathode path. Relay 3716 is operated long enough for the above discharge paths to be established in the line circuit gas tube after which time relay 3716 releases, removing the original battery and ground circuits which it had closed to initiate said discharges. However, relay 3741 continues to supply ground through its winding to conductor 3728 which is connected, as described above, to the start cathode of the designated called line circuit, and relay 3742 continues to supply positive battery through its winding to conductor 3735 which is connected to the second anode of the called line gas tube, as previously described. The idle, vacant or busy condition of the called line is determined by the operation or non-operation of relay 3741 and 3742 after the release of relay 3716 in response to the current flow conditions which they find to have been established in the gas tube of the called line circuit.

Considering in a little more detail the line circuit and its associated gas tube, assume that line circuit 3500 is the desired called line circuit and corresponds to line number 804 in the directory listing plan. The potentials applied by relay 3716 to the paths previously described to the control elements of the line gas tube associated with the digits 804 will have produced conduction on one of various paths within the gas tube 3518 associated with this line. The discharge will have initially been caused between the start cathode and start anode, and will have transferred to the start cathode-secondary anode path, as previously described. In addition, however, if this line is in an idle condition the circuit from main cathode 3514 will be completed through the back contact of relay 3510 in its normal position and a back contact of relay 3512 in its normal position through resistor 3541 to ground and also from this point through a back contact of relay 3511 in its normal position to the junction of the two windings of relay 3522 and through the left winding of this relay to conductor 3526 to the control appearance of this line on the switching network of Fig. 32. A path will also be completed from the common point of the windings of relay 3522 through the right winding and varistor 3539 to ground. Under this idle line condition, the discharge in gas tube 3518 will transfer to the path between anode 3737 and main cathode 3514. If the line is busy, however, the main cathode 3514 will be connected to ground only through a high valued resistor 3540, the connection to resistor 3541 having been opened by the operation of 3510 or relay 3512 in which case the discharge through the gas tube will remain through the gap between anode 3737 and start cathode 3537. Furthermore, if there is no line in the office corresponding to the received designation 804, there will be no corresponding line gas tube and will be no discharge through a line gas tube, after the release of relay 3716.

Assuming that the called line is idle and that the discharge in the line gas tube is transferred to the anode-main cathode path, as described above, the current in this discharge path will cause the operation of relay 3742, but relay 3741 which is connected to the start cathode of the line tube will remain unoperated, because the discharge current will flow through the tube to the main cathode and not to the start gap cathode under these conditions. If the called line is in a busy condition, the discharge through the line gas tube will be between the starter cathode and anode 3737 and will cause the operation of relay 3741 as well as relay 3742; and if the line is vacant, of course neither of these relays will be operated.

Considering the case of an idle called line, the ground connected to conductor 3714 by the operation of relay 3713, as described hereinbefore, will be extended through an operated make contact of relay 3742 and a back contact of unoperated relay 3741 to the winding of relay 3743 thereby causing its operation. At the same time, ground will be removed by the operation of relay 3742 from conductor 3744 which is used in the trunk circuit in case the line is busy or vacant, as will be described hereinafter. Relay 3743, in operating, places a shunting ground around the winding of relay 3741 to insure that it does not operate subsequently and applies ground to conductor 3748 which passes through a contact of connector relay 2420 in the incoming trunk circuit 2400 to the winding of relay 2428 thereby causing its operation. Relay 2428 opens the operating circuit of relay 2426 to prevent its subsequent operation. Relay 2428 also connects a source of ringing power through relay 2429 to the ring conductor and directly to the tip conductor of the outgoing talking leads of this trunk which will be extended through the switching network to called subscriber's subset as described hereinafter. In addition relay 2428 removes short circuits from the series resistor capacitor networks 2430 and 2431 in the tip and ring conductors of the in-trunk so that a fraction of the ringing voltage will be transmitted through these networks and through the tip and ring talking condensers 2432 and 2433 to the tip and ring conductors which extend from trunk 2100 and through the switching network of the originating office to the calling subscriber. This ringing tone informs the calling subscriber that a connection to the subscriber, he has designated by the setting of the signal generating apparatus in his subset, is being established.

Figure 27:
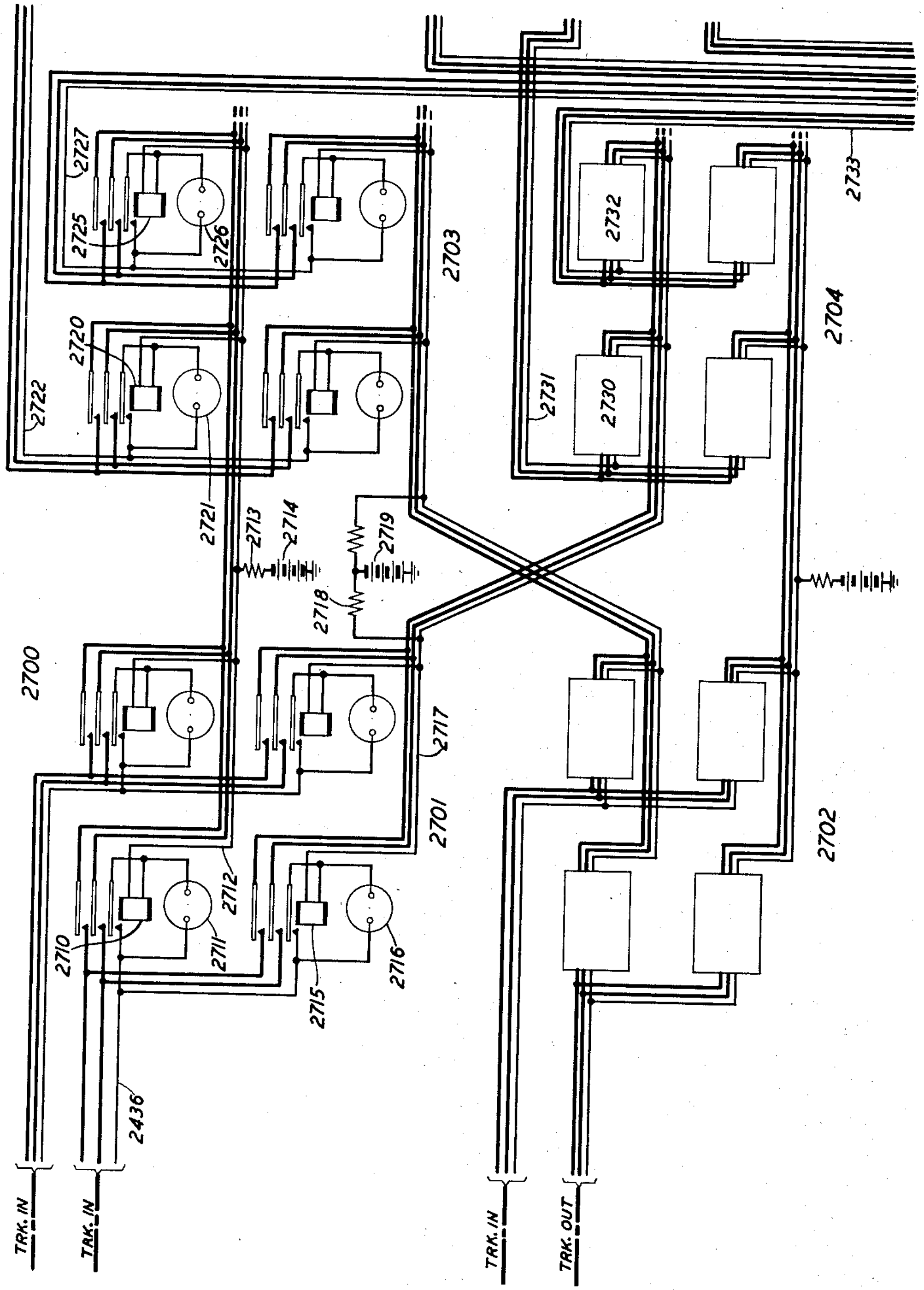
Figure 28:
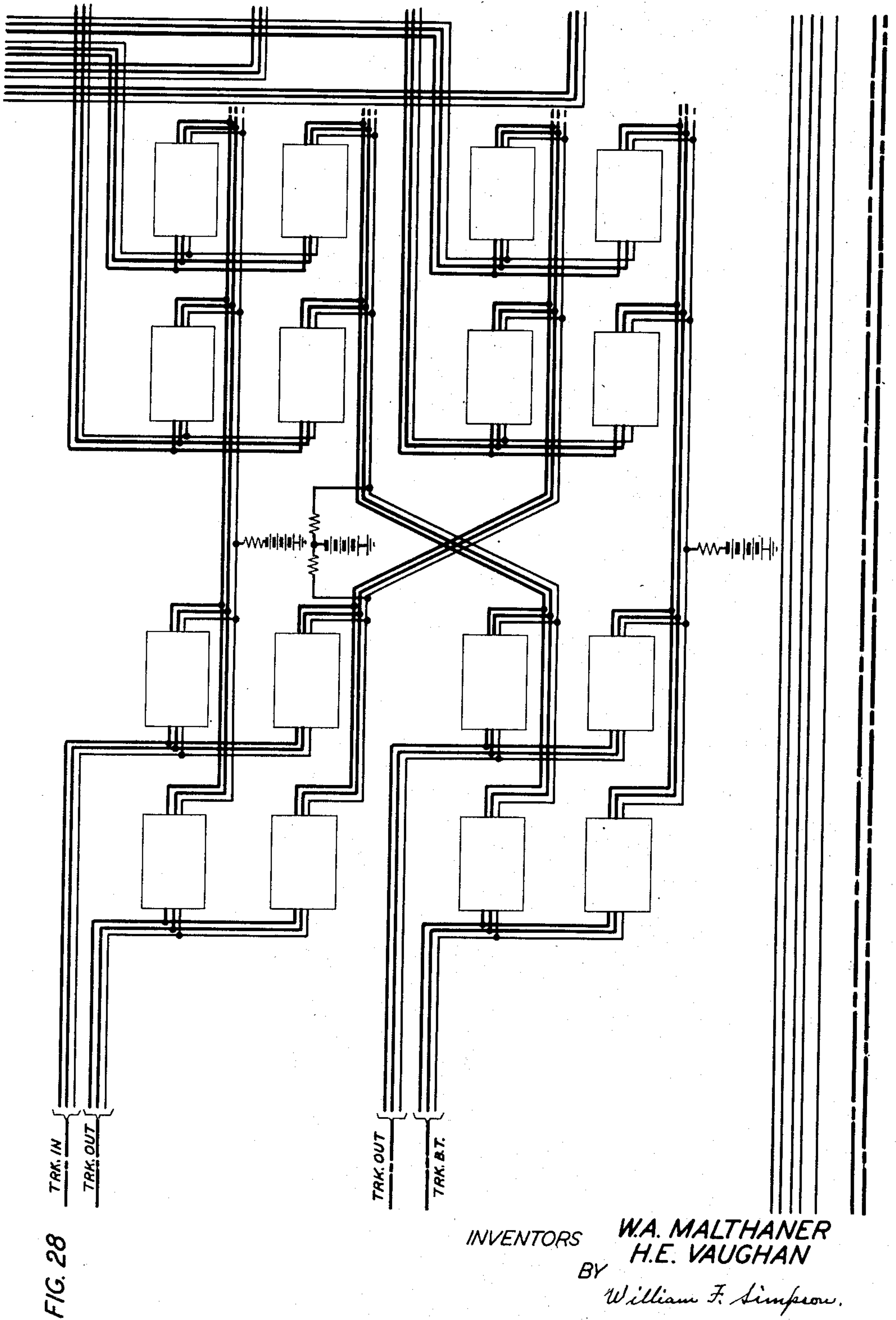
Figure 29:
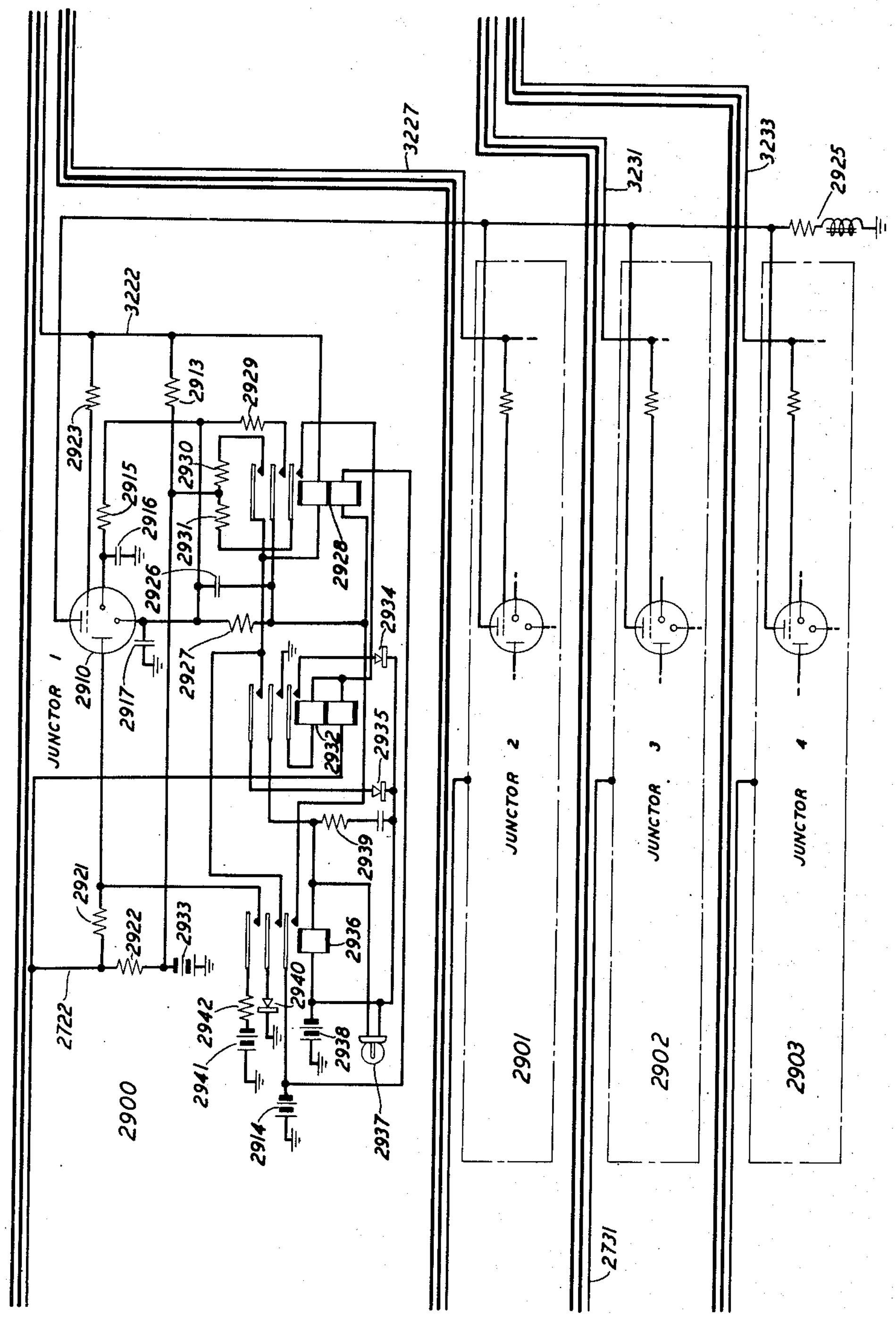
Figure 30:
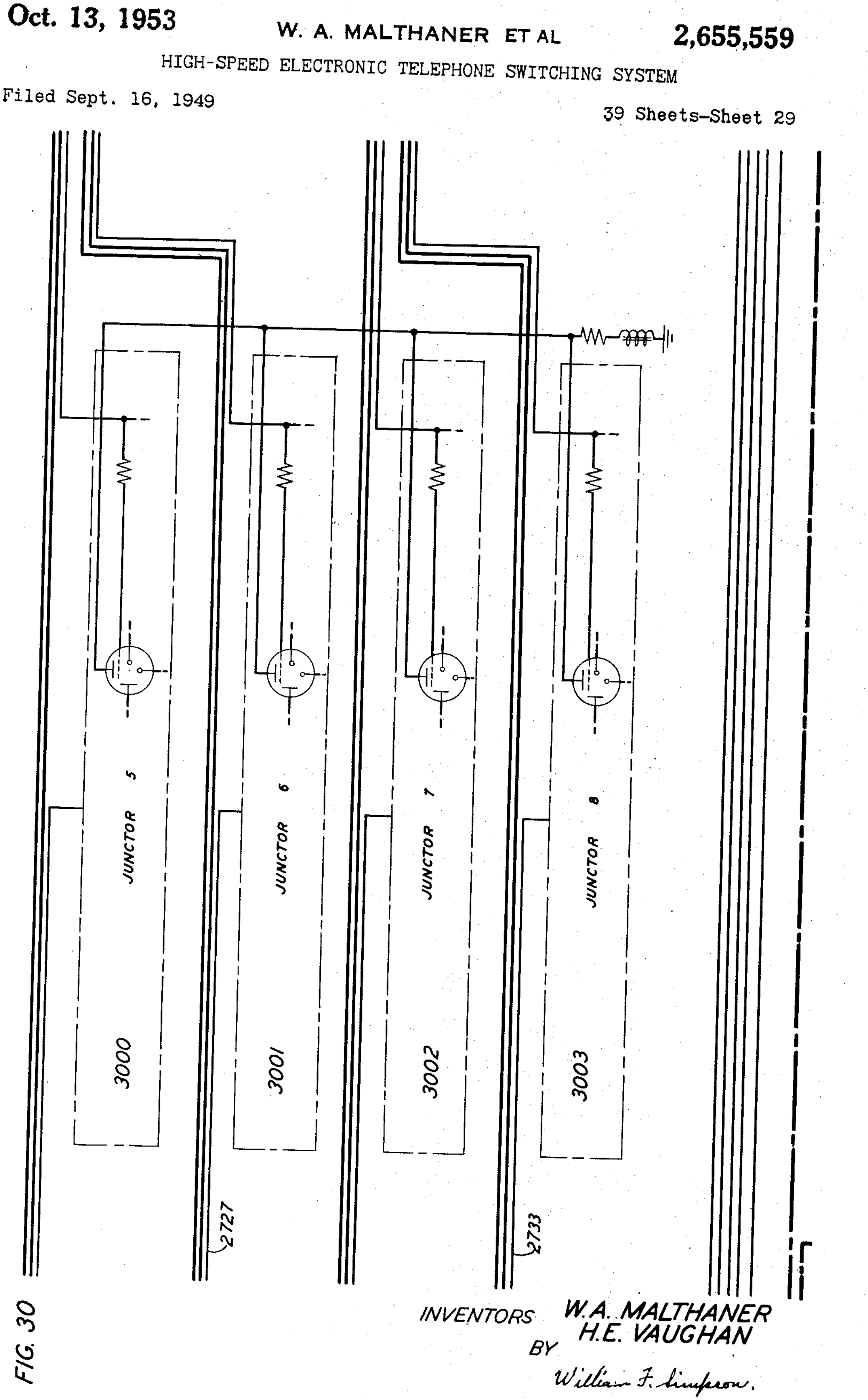

Relay 3743, in operating as described above to indicate that the desired called subscriber's line is idle, applies a positive voltage over lead 3437, through an operated contact of relay 2420 and a closed back contact of relay 2421 to the common junction of the windings of relay 2427 and through the right winding of this relay to the appearance of the control lead 2436 of trunk 2400 on the switching network of Fig. 27. Positive voltage through resistor 3789 is applied through another contact of operated relay 3743 and a series contact of operated relay 3713 to conductor 3746 which is connected through a back contact of relay 3512 to a main anode 3517 of the called line circuit 3500 and in a similar manner to the main anodes of the gas tubes in the other line circuits. This application of voltage to main anode 3517 causes a transfer of the discharge in this line gas tube to the main cathode-main anode path thereby developing a positive voltage marking potential in the main cathode circuit across resistor 3541 which mark is extended over the path previously described to the control lead 3526 of this line circuit and its appearance on the switching network of Fig. 32.

With voltage applied to the control lead 2436 at the trunk side of the switching network and to control lead 3526 at the line side of the switching network, the various possible paths between these two points through the switching network are revealed by the ionization of the cold cathode gas diodes in the various cross-points of the switching network in a manner similar to that described previously for the switching network in the originating office. Specifically, assuming that all the paths shown in the drawing are idle in the exemplary system, the voltage applied to lead 2436 together with the voltage from batteries 2714 and 2719 fires diodes 2711 and 2716 in primary switch 2701 of trunk frame 2700 and thereby produces by the voltage drop in resistors 2713 and 2718 an altered voltage condition on link leads 2712 and 2717 between the primary and secondary switches of this trunk frame. This altered voltage condition on primary-secondary link lead 2712 results in the firing of cold cathode gas diodes 2721 and 2726 in secondary switch 2703 of this trunk frame producing, in turn in a similar manner, an altered voltage condition on leads 2722 and 2727 respectively. Lead 2722 connects through resistor 2921 to the start anode of cold cathode gas tube 2910 in junctor circuit 2900 and similarly lead 2727 connects to the start anode of a similar gas tube in junctor circuit 3001. In addition, the altered voltage condition on primary-secondary link lead 2717 similarly fires the cold cathode gas diodes in cross-points 2730 and 2732 of secondary switch 2704 of the trunk frame, in turn producing an altered voltage condition on lead 2731 to the start anode of the gas tube in junctor 2902 and on control lead 2723 to the control anode of the gas tube in junctor 3003.

Again assuming that all the paths shown in the drawing in the line frame 3200 are idle and considering specifically the voltage applied to lead 3526 at the line side of the switching network, cold cathode gas tubes 3211 and 3216 in primary switch 3201 of line frame 3200 fire thereby altering the voltage on primary-secondary link leads 3212 and 3217, respectively. The altered voltage condition on lead 3212 in turn fires the diodes 3221 and 3226 in secondary switch 3203 of this line frame extending voltage marks on conductors 3222 and 3227 to the screen electrodes of the gas tubes in junctors 2900 and 2901, respectively. In a similar manner the altered voltage condition on primary-secondary link lead 3217 fires the gas diodes in cross-points 3230 and 3232 of secondary switch 3204 of this line frame extending voltage marks on conductors 3231 and 3233 to the screen electrodes of the gas tubes in junctors 2902 and 2903, respectively.

Of the various junctors to which voltage marks have thus been extended, only junctors 2900 and 2902 are marked from both trunk and line sides of the switching network and are thus the only junctors shown associated with possible complete paths through the switching network. The tubes of junctor circuits 2900, 2902, 3001 and 3003 have voltage marked supplied to their start anodes which will initiate a discharge between the start anode and start cathode of the tubes of each of these junctor circuits. These discharges will then transfer to the screen or shield element of these tubes in junctors 2900 and 2902 and will start a transfer to the conduction path extending from the start cathode to the main anode. However, junctors 2900 and 2902 have their main anode circuits connected to main anode lock-out network 2925 and the control cathodes are effectively grounded at this time by condensers corresponding to condenser 2916 so that by the process of lock-out previously described the tube in only one of these two junctors will succeed in accomplishing this transfer. Assuming that the discharge in the tube of junctor 2900 transfers to the main anode-start cathode gap, the discharge then further transfers to the main anode-main cathode circuit operating relay 2928 in the main cathode circuit on its lower winding by the pulse of current through capacitor 2926. The operation of relay 2928 completes a circuit from battery 2933 through resistor 2930 and the upper winding of the relay around resistor 2913 across which the voltage on lead 3222 was developed, and in a similar manner the operation of relay 2928 completes a shunt through resistor 2931 and the lower winding of relay 2932 around resistor 2922 on which the marking voltage on lead 2722 was originally developed. These shunt paths permit additional current to flow from battery 2933 through the windings of relays 2932 and 2928 and through the various cross-point diodes in each direction from the junctor and their associated cross-point relay windings to the marking voltages supplied to the switching network on conductors 2436 and 3526 causing the operation of the cross-point relays associated with said switching path.

The operation of the cross-point relays in the line frame places short-circuits around the gas diodes of these cross-points thereby causing a further increase in the current flow in the control lead path between the junctor and the line circuit through the upper winding of relay 2928 which in turn operates relay 3522 in the line circuit on its left winding. The operation of the cross-point relays in the trunk frame places short-circuits around the gas diodes of these cross-points thereby causing a similar further increase in the current flow in the control lead between the junctor and the trunk circuit which operates junctor relay 2932 on its lower winding and trunk relay 2427 on its right winding.

The operation of relay 2932 prepares a holding path from negative battery 2938 through varistor 2934 and both windings of relay 2932 which path is completed through the cross-point relay windings, both windings of relay 2427, a contact of relay 2427 and varistor 2437 to ground through the right-hand operated contacts of relay 2410. Relay 2932 also prepares a holding path from negative battery 2938 through varistor 2935 and the upper winding of relay 2928 which path is completed through the line frame cross-point relay windings, both windings of relay 3522 and varistor 3529 to ground. Relay 2932 operates relay 2936 and lights a lamp 2937 as a visual indication of the operation of the circuit. The winding of relay 2932 is shunted by a resistor-capacitor network 2939 to make it slow release. Operation of relay 2936 connects a release transient damping varistor 2940 through the upper winding of relay 2938 to lead 3222; connects a negative extinguishing potential 2941 through resistor 2942 to the start anode of tube 2910; and, shorts out the lower winding of relay 2928.

The operation of relay 3522 in line circuit 3500 on the increased current in the control lead path through the switching network, as described above, operates relay 3510 through resistor 3531. Relay 3510, in operating, opens the marking voltage path between line gas tube 3518 and the windings of relay 3522, opens the locking path for relay 3519 which is used on originating from this line, and removes the winding of relay 3512 and ground from the tip and ring conductors of the line. Tube 3518 is extinguished and a busy indication for subsequent tests by the subscribers' number group established at this tube by the open contacts of relay 3510. Relay 3522 is held operated by current flowing over the circuit extending from ground through varistor 3529, through both windings of relay 3522 to control lead 3526 and then through the switching network, the upper winding of relay 2928, and resistor 2930 to negative battery 2933. Varistor 2935 is so poled that negligible current flows to battery 2938 at this time. The removal of marking voltage from the line side of the switching network by the operation of relay 3522 reduces the current flow over the control lead path through the switches. This is a lower value of current than that established by the marking voltage and permits the release of junctor relay 2928. The release of relay 2928 removes battery 2933 from the control lead paths; thus, permitting holding current for these paths to now flow from negative battery 2938 through varistors 2934 and 2935.

Relay 2427, in operating, extends ground from an operated contact of relay 2410 to the junction of the two varistors 2437 and 2438 associated with the winding of relay 2427 thus preparing a holding condition for the path established through the switching network between the trunk and junctor circuit 2900. Relay 2427 also connects the ground through a back contact of relay 2429 for locking relay 2428 in an operating condition to maintain the connection of ringing power to the called subscriber's line after the relay 2420 to the terminating receiver and subscriber number group circuits has released. Relay 2427 also operates relay 2421 which in turn opens the marking voltage path to the common point of the windings of relay 2427, extinguishes gas tube 2411 and releases relay 2420.

The release of relay 2420 opens the connection between this incoming trunk circuit and the terminating receiver of Fig. 31 causing the release of relay 3110, the reoperation of relay 3111 in this receiver circuit, and the release of trunk relay 2425. The release of relay 2425 restores the direct-current flow over interoffice conductors 2122 to its original direction, thereby releasing relay 2124 in the out-trunk.

Relay 3110, in releasing, releases call counting device 3114 and opens the path between the signal input transformer 3113 and the band-pass filter 3117. Relay 3111, in operating, connects ground to automatic volume control circuit 3118 restoring this circuit to its maximum gain condition, applies a resistance termination across the right winding of input transformer 3113 and reoperates relay 3138. Relay 3138, in operating, removes battery from the digit steering circuit 3127 thereby restoring this circuit to its normal condition, and supplies battery to start circuit 3122 to restore it to its normal condition and operates relay 3116. Relay 3116, in operating, removes battery from the integrator circuit 3130 and from the tubes of the register circuit of Fig. 34 to restore these circuits to their normal conditions, and operates relay 3145. Relay 3145, in operating, removes a short circuit from inductive element 3140 thus producing a negative pulse in the battery supply lead 3147 to the start pulse absorbing circuit 3124 and the office code absorbing circuit 3160 restoring these circuits to their normal condition.

With the connection established as described above from in-trunk 2400 through the switching network, the line circuit 3500 and local subscriber loop conductors 3814 to subset 3800, the ringing power supplied from in-trunk 2400 operates ringer 3813 through capacitor 3809 and the closed contacts of switchhook assembly 3812 to summon the called subscriber.

When the called subscriber answers the call by removing handset 3811 from its switchhook cradle, switchhook assembly 3812 operates removing ringer 3813 from the line conductors 3814 and connects these line conductors through closed contacts of latched switchhook assembly 3815 to the windings of latch magnet 3817. The impedance of the direct current path completed through the latch magnet windings causes the operation of the trip ringing relay 2429 in the in-trunk on the ringing power and/or the superimposed direct current provided therewith. Relay 2429, in operating, opens the locking path to relay 2428 which releases, in turn removing ringing power from the conductors extending to the called subscriber and causing the release of relay 2429. Relay 2428, in releasing, also places short-circuits around networks 2430 and 2431 through which ringing tone was supplied to the calling subscriber's subset, and thereby completes a direct current path from ground and battery through the windings of relay 2439 to the conductors extending to the called subscriber's subset and through the windings of latch magnet 3817 thereat. Relay 2439 now operates, and the direction of current flow through latch magnet 3817 from the battery and ground at the windings of relay 2439 causes the operation of this latch magnet releasing switchhook assembly 3815. Relay 2439, in operating, supplies an additional locking ground to relay 2427 and reoperates relay 2425. The reoperation of relay 2425 reverses the direction of current flow over interoffice conductors 2122 causing the reoperation of polar relay 2124 in out-trunk 2109. This reoperation of relay 2124 may be used, by means not shown but well known in existing telephone systems, to operate a registering device for charging the call to the calling subscriber's account.

The release of switchhook assembly 3815 in the called subscriber's subset 3800 removes latch magnet 3817 and the signaling apparatus comprising digit selector 3810, signal generating device 3820, digit stepper 3816 and the phase-splitting networks 3818 and 3819 from the loop conductors 3814 and completes the talking circuit from these loop conductors through the usual talking apparatus comprising a receiver and transmitter in handset 3811 and the usual capacitor 3822 and transformer or induction coil 3823.

The calling subscriber at subset 600 may now converse with the called subscriber at subset 3800 with transmitter bias current provided for these subsets through the windings of relays 2111 in out-trunk 2109 and the windings of relay 2439 in in-trunk 2400, respectively.

The talking connection through the originating office is maintained at this time under the joint control of out-trunk relays 2111 and 2115 which relays are in turn held by the direct current flowing in the called subscriber's talking loop and by the current flowing over the trunk circuit 2122. For the trunk frame section of the originating office, ground is provided from relays 2111 and 2115 in the out-trunk through the windings of relay 2112, the windings of the associated operated crosspoint relays of trunk frame 1710 and the windings of relay 1432 in junctor 1410 to negative battery 1438; and for the line frame section of the originating office, battery 1438 is connected through the contacts of the operated relay 1432 in the junctor 1410 through the upper winding of relay 1428, the windings of the associated operated crosspoint relays of line frame 1110 and the windings of relay 822 in the calling line circuit 800 to ground.

In a similar manner, the talking connection through the trunk frame of the terminating office is maintained at this time under the direct control of in-trunk relay 2439, which is in turn held by the direct current flowing in the called subscriber's talking loop, and in a joint manner by relay 2410 which in turn is controlled by the out-trunk relay 2111, which in turn is held by the direct current flowing in the calling subscriber's talking loop. Ground is provided from relays 2439 and 2410 in the in-trunk through the windings of relay 2427, the windings of the associated operated crosspoint relays of trunk frame 2700 and the windings of relay 2932 in junctor 2900 to negative battery 2938; and for the line frame section of the terminating office, battery 2938 is connected through contacts of the operated relay 2932 in junctor 2900 through the upper winding of relay 2938, the windings of the associated operated crosspoint relays of line frame 3200 and the windings of relay 3522 in the calling line circuit 3500 to ground.

As described above, the talking connection in both the originating and terminating office is held under the joint control of both the calling and called subscribers. If the calling subscriber hangs up first at the end of conversation, the operation of switchhook assembly 612 opens the current path to out-trunk relay 2111 which releases and thereby opens its locking ground path to out-trunk relay 2115; however relay 2115 is held operated by the operated relay 2124 so that holding ground is maintained to relay 2112 and the switching network. When the called subscriber then hangs up, the operation of switchhook assembly 3812 opens the current path to in-trunk relay 2439 which releases in turn releasing relay 2425. With relay 2425 normal, the reversal of the direction of direct current flow in the interoffice loop conductors 2122 releases polar relay 2124 in the out-trunk in turn releasing relay 2115. The release of relay 2115 opens the holding ground to relay 2112, and this relay together with the series operated crosspoint relays in trunk frame 1710 and junctor relay 1432 releases. The release of junctor relay 1432 in turn opens the circuit from battery 1438 through the upper winding of relay 1428 and the series of windings of the operating crosspoints in the line frame 1110 and the windings of relay 822 in the calling line circuit, permitting the release of the relays along this current path. The release of junctor relay 1432 also releases relay 1436 restoring the junctor to its normal condition and the release of line circuit relay 822 releases relay 810 restoring the calling line circuit to its normal condition.

The release of relay 2115 in the out-trunk also opens the bridging connection through the winding of relay 2124 established between the talking conductors of interoffice loop 2122 thus causing the release of in-trunk relay 2410. The release of relay 2410 opens the holding ground to relay 2427 and this relay together with the series operated crosspoint relays in trunk frame 2700 and the junctor relay 2932 releases. The release of junctor relay 2932 in turn opens the circuit from battery 2938 through the upper winding of relay 2928 thus releasing the series operated crosspoint relays of the line frame and relay 3522 in the line circuit. The release of junctor relay 2932 also releases relay 2936 restoring the junctor to its normal condition and the release of relay 3522 releases relay 3510 restoring the called line circuit to its normal condition.

If the called subscriber hangs up first, the operation of switchhook assembly 3812 opens the direct current path to in-trunk relay 2439 which releases in turn releasing relay 2425. With relay 2425 normal, the reversal of the direction of current flow in the interoffice loop conductors 2122 releases polar relay 2124 in the out-trunk; however, the connection in the originating office is still held under the control of relay 2111, and relay 2410 in the in-trunk remains operated over the interoffice loop to hold the connection in the terminating office. When the calling subscriber then hangs up, the operation of switchhook assembly 612 opens the direct current path to out-trunk relay 2111 which releases, in turn releasing relay 2115. The release of relay 2115 then causes the release and return to normal of out-trunk 2109, in-trunk 2400, line circuits 600 and 3500 and the junctors and crosspoint relays used in the connection as described above when both subscriber's have hung up.

The operation of the circuits disclosing the specific exemplary embodiment of the invention have been described for the completion of a call from a calling subset 600 in office A to a called subset 3800 in office B for the case in which the called subset 3800 was idle. Returning to the operation of the terminating receiver and register of Figs. 31 and 34 and the subscribers' number group of Fig. 37 in making an idle-busy-vacant test of the called subscriber's line as described hereinbefore, the alternate operations of the system will now be described for the case in which this test results in an indication that the called line is busy or vacant.

As described hereinbefore, if the called line designated by the number registered on the register relays of Figs. 34 and 37 is vacant, relays 3741 and 3742 both remain unoperated after the release of relay 3716. The release of relay 3716 removes the battery connected through resistor 3739 to capacitor 3740 which has been holding the capacitor in a substantially uncharged condition, thus permitting this capacitor to charge through resistor 3745 and a back contact of relay 3742 to ground provided from relay 3713. As a result of the charging of this capacitor, the voltage on lead 3744 connected to the capacitor will approach ground potential thereby operating relay 2426 in the in-trunk circuit after a time interval sufficient to permit the operation of relay 3742.

If instead of a vacant line, the call is to a busy line, relays 3741 and 3742 both operate after the release of relay 3716 as described hereinbefore. With relays 3741 and 3742 operated, the ground from relay 3713 is connected directly to lead 3744 operating relay 2426 in the in-trunk without delay.

Relay 2426, when operated, locks under control of operated relay 2410, connects negative battery to lead 2440 to cause the operation of the busy tone generator 2650 and connects the resulting busy tone on lead 2441 through capacitor 2442 to the ring conductor of the in-trunk. This tone is transmitted over the previously established and described connection of interoffice conductors 2122, out-trunk 2109, and the switching network of the calling office to the calling subscriber's subset 600 which is now in talking condition as described hereinbefore to inform the calling subscriber that the desired called subscriber may not at present be reached.

The operation of the busy tone generator 2650 is as follows. Briefly, the negative voltage applied to lead 2440 cuts off the right section of tube 2652 permitting tube 2654 to operate as a multivibrator, in turn operating and releasing relay 2653 through the left section of tube 2652 which operates as a cathode follower. The negative voltage on lead 2440 also causes relay 2655 to buzz on its back contact and upper winding at a rate determined by the inductance and resistance of the relay winding and by the associated resistor-capacitor network. A characteristic tone rich in harmonics, thus generated in the lower winding of relay 2655, is connected through condenser 2662 and the tone interrupting contacts of relay 2653 to the in-trunk via lead 2441 as described above.

Relay 2426, in addition to providing busy tone to the calling subscriber, operates relay 2421 thereby extinguishing gas tube 2411 and releasing relay 2420 as described hereinbefore. The release of relay 2420 permits the return to normal of the terminating receiver and register and the subscribers' number group as described hereinbefore.

When the calling subscriber recognizes the busy tone and hangs up, the connection established through the switching network, out-trunk 2109 and in-trunk 2400 will release and restore to normal, as described hereinbefore for the case of the calling subscriber hanging up last.

The specific embodiment of the circuits disclosing central office B and its associated subscriber stations as shown in Figs. 23 to 40, inclusive, are similar to the circuits for central office A shown in Figs. 4 to 22, inclusive, except for the signal receiving circuits. The two signal receivers of office A are of the same type, and the two signal receivers of office B are of a second type; and the operation of each type has been described hereinbefore. In addition to the various calls described hereinbefore wherein all the calls were assumed as originating at subscribers' stations in office A, calls may of course be similarly originated by subscribers in office B and will be handled in a similar manner as may be readily understood by reference to the descriptions of circuit operation given hereinbefore.

In the hereinbefore described conditions it was assumed that trunks in the desired trunk group were idle. Mention was made, however, if all trunks in a trunk group are busy, the trunk group tube 933 will be marked busy by application of a ground on its main cathode 942. If this condition arises relays 939 and 938 will both operate as a result of the idle-busy-vacant test hereinbefore described and positive battery will be applied through the closed contacts of said relays, the closed contacts of relay 926 and resistor 944 to the start anode of tube 946 and to a shunt capacitor 945 to ground. The combination of resistor 944 and capacitor 945 slows down the rise of the anode voltage so there is a small delay in firing the start gap of tube 946. The tube 946 having fired on its start gap will transfer to its main gap causing operation of relay 952 which causes a positive voltage to be applied to lead 953 which is connected through a back contact of relay 2231 in busy tone trunk 2230 to lead 2237 which is the control lead to the right vertical of primary switch 1814 on trunk frame 1810.

The presence of the positive voltage mark on lead 2237 causes the diodes associated with crosspoints 1815 and 1816 to fire. Breakdown of these diodes causes a change of potential on the control lead of links 1821 and 1822 so that diodes associated with crosspoints 1820, 1819, 1818 and 1817 break down. As a result of the above-mentioned diodes firing, marks of increased voltage are applied to control leads 1826, 1827, 1823 and 1825 which cause control gaps of cold cathode gas tubes similar to tube 1420 in junctor 1410 to break down across the control gap in junctors 1414, 1416, 1510 and 1515.

As hereinbefore described, when a connection was made to the trunk number group, a positive voltage mark was applied through the winding of line relay 822 to lead 826 which causes breakdown of diodes 1111 and 1121 which resulted in an increase of potential on control lead 1126 of link 1116 and control lead 1129 of link 1117. Increase of potential on lead 1126 caused breakdown of diodes 1127 and 1128 which in turn caused increased potential on control lead 1411 to junctor 1410 and lead 1417 to junctor 1414. Increase of potential on lead 1129 of link 1117 caused diodes associated with crosspoints 1130 and 1131 to fire which caused an increase in potential on lead 1418 to junctor 1415 and lead 1419 to junctor 1416. These marks increase the screen voltage of cold cathode tubes in the junctors similar to tube 1420 in junctor 1410. Of all the junctors shown as marked due to increased potential on control leads only junctors 1414 and 1416 have marks on both sides thus permitting their gas tubes to fire on the control gap and transfer to the main gap. However, due to the presence of common lockout impedance 1425 in the main anode circuit and the condensers between the control gap cathode and ground and between the main cathode and ground, only one tube will transfer to the main gap, which is assumed to be the tube 1456 of junctor 1416. When the tube fires, a relay in the junctor similar to relay 1428 in junctor 1410 will operate and the action will be then identical to that hereinbefore described for junctor 1410 with the final result that relay 822 in the line circuit will be operated, relays in the junctor similar to relays 1432 and 1436 in junctor 1410 will be operated and a metallic path will be established through crosspoint 1122, link 1117, crosspoint 1131, path 1824, crosspoint 1818, link 1822, crosspoint 1816 to the tip 2239 and ring 2240 leads of busy tone trunk 2230. A direct current path through the subset over line 614, the above-mentioned path and through supervisory relay 2236 causes operation of said relay 2236 which places a holding ground on lead 2237 through varistor 2233 and resistor 2232 for holding the connection to the busy tone trunk. Varistor 2234 is used to suppress transients which might re-fire crosspoint diodes when the connection is released.

Operation of relay 822 starts a sequence of events which causes the release of actuator 900, the receiver-register and number group, the extinguishing of all diodes in the switches and the removal of marks from the junctors so that another line circuit and/or incoming trunk circuit may proceed with the establishment of a connection, as described hereinbefore.

When relay 2236 operates, it operates relay 2231 through resistor 2235. Operation of relay 2231 opens the marking path between lead 953 and lead 2237.

At the time the transmission path is cut through the switches to the busy tone trunk and relay 2236 is connected to the subset, the condition of battery on tip lead 2237 and ground on ring lead 2240 is such as to trip the electromagnetic latch 617 in the subset 600 so said subset is now in the talking condition. Lead 2240 is connected through capacitor 2251 to the busy tone generator 2250 which can be common to a group of busy tone trunks and incoming trunks in the office. If some busy tone trunk or incoming trunk is already using the generator it will already be enabled and sending a busy tone which is an intermittent buzzer tone replete with harmonies.

When the busy tone generator is not in use, the left triode of vacuum tube 2252 rests with its grid at ground and saturation current is drawn through resistor 2256. Under this condition the voltage on the plate of said triode is considerably below the plate battery 2257 with the result that the voltage on the grid of the right triode of tube 2252 is below cutoff since it is derived by summing the plate potential of the left triode of tube 2252 through resistor 2258 with the negative battery through resistor 2259. When the right triode of 2252 is cut off, no current flows through relay 2253. Saturation of the left triode maintains low potential on the right plate of tube 2254, a twin triode. Operation of relay 2236 applied negative battery through varistor 2238 to cut off the left triode of tube 2252. At this time, tube 2254 which has normally low potential on the right plate functions as a conventional free running multivibrator. At the part of the on-off cycle during which the right triode of tube 2254 is cut off and the left triode of tube 2252 is cut off, the grid of the right triode of tube 2252 becomes positive and current flows in the cathode circuit of said triode causing the operation of relay 2253 which connects the tone generating circuit consisting of a buzzing relay circuit 2255 to the ring side 2240 of the line. Application of battery through varistor 2238 also causes the tone generating relay to buzz on its back contact and thereby to generate the busy tone in its secondary winding. During the part of the multivibrator cycle when the right triode of tube 2254 is saturated and the right triode of tube 2252 is cut off, relay 2253 releases. Thus, the interrupter circuit comprises a free running multivibrator 2254, which may be normally disabled by the left triode of tube 2252, with a cathode follower, right triode of tube 2252 and relay 2253.

The voltage output of the tone generator is fractionated by means of the capacitors 2262 and 2263.

The interrupter buzzing tone continues to be transmitted to the subset until the subscriber hangs up. At that time relay 2236 releases due to opening of the direct current path, the busy tone generator circuit releases and removal of ground from lead 2237 releases relays in junctor 1416 similar to relays 1432 and 1436 in junctor 1410 and relay 822 in line circuit 800 releases. Release of crosspoints 1122, 1131, 1818 and 1816 is also accomplished. The switches and junctor are then ready for use in another call. Release of relay 822 permits the conditions in line circuit 800 to return to normal as hereinbefore described so that it may handle another call.

Only one busy tone trunk is shown in the drawing. However, the office would be engineered with a sufficient number of busy tone trunks to satisfy the maximum simultaneous busy tone demand.

It has been hereinbefore stated that a vacant call is routed to the busy tone trunk. This has been done in the exemplary embodiment of the system shown but it is assumed that in a large office a separate group of trunks would be available to handle this condition by routing the call to an intercept operator who would render assistance to the subscriber. The size of this group of trunks would be engineered to give good service and be consistent with the number of subscribers and trunks in the office.

The following description traces the operation of the system for a call from a subscriber in central office A to another subscriber in the same office.

When the subscriber having subset 600 desires to place a call he presets the number of the desired line on the finger wheels or other manually settable selectors associated with digit selector switch 610, thereby making a connection between each vertical digit wire and the corresponding desired horizontal digital-values buses of said subset. Specifically in the exemplary system shown by way of example, if the called line is in the same office as subset 600 assume that the first three digits of the number will be CH8 or numerically 248 the office code. The final part of the number of the called station is also set by the subscriber. The handset 611 is then lifted from the cradle causing closure of switchhook contacts 612 so that a direct current path is established through subset 600, line 614 and line circuit 800 to cause the operation of relay 812 in the manner hereinbefore described.

Operation of relay 812 causes firing of the control gap and transfer to the main gap of gas tube 814 provided no other line tubes are fired at this time. When tube 814 is operated, all other lines are locked out and relay 819 operates operating in turn relay 811. Operation of relay 819 applies ground to lead 824 which operates relay 911, which enables the 45 cycle power amplifier. The ground applied to lead 824 by the operation of relay 819 also operates relays 510 and 512 and releases relay 511 which relays in turn connect the receiver of Fig. 5 to actuator 900 and render the receiver ready to cooperate with the subset for the reception and registration of the called number as hereinbefore described.

Operation of relay 811 connects actuator 900 to line 614 and subset 600 so that 45 cycle current may pass over the associated simplex circuit to control generation of the signals in said subset which are returned over the loop through the aforementioned connections to the receiver. Supervision of the call is maintained by monitoring the 45 cycle simplex current by means of transformer 915, detector 916 and relay 910 as hereinbefore described. If the 45 cycle current is interrupted, release of relay 910 results, which removes ground from the winding of relay 819 which releases and causes the connection to be discontinued.

The signaling pulses as received by the receiving circuit shown in Fig. 5 first pass through filter 517 to the volume limiter 518 causing the gain of said limiter to be set at the proper level as described in the above-identified application of Malthaner et al. In addition, these pulses, after being repeated by the limiter circuit, are transmitted to the code detector 520 through amplifier 519 which detector is provided with a timing circuit which recognizes the blank interval between the series of pulses representing a complete called number designation. The other circuits of the receiver are rendered ineffective and are blocked until such a blank interval is received. At this time the code detector 520 as well as the other portions of the start circuit respond to the blank interval and cause the various other circuits of the receiver to be conditioned to thereafter receive the pulses. These circuits then respond to the succeeding pulses received from the subscriber station and cause the magnitudes represented by the various pulses to be stored on binary counters 531, 532 and 533 which counters are arranged to register the first three digits following the blank interval occurring in a train of pulses from the calling subscriber's subset.

As set forth, above, the pulses are received and amplified by the volume limiting amplifier circuit 518. The gain of this amplifier is automatically regulated so that the amplitude of the pulses from this amplifier are substantially independent of the amplitude of the pulses as received. Pulses are then further amplified by amplifier 519 and then supplied to code detector 520 and digit detector 521. As described above the code detector 520 together with the blank interval timer 522 recognizes the blank intervals between each complete series of pulses representing the entire subscriber station designation. The digit detector 521 is normally rendered inoperative. However, in response to the operation of the blank interval timer which in turn operates the code start circuit 523, the digit detector 521 is rendered operative so that it will respond to the succeeding pulses received from the calling device of subscriber station 600. The first six signaling pulses received thereafter are received by the detector 521 which controls the switching device 524, the multivibrator 525, the step-steering circuit 526 and the steering circuit 527 in the manner hereinbefore described so that the first seven timing pulses from multivibrator 525 are passed through switch 529 to the seven-counter 530 and the subsequent pulses through switch 529 to the binary counters 531, 532 and 533 which register the magnitudes of the A, B and C digits respectively of the called office code. The output of digit detector 521 is also applied to a sixteen-pulse counting circuit 534 which controls counter reader 535.

Assuming that a total of sixteen pulses, as required in the exemplary embodiment of the invention set forth herein, is received between the two blank intervals then the counter reader 535 will condition the locking circuit 542 instead of the recycle circuit 536 to repeat a pulse from the code end circuit 560 in response to the succeeding blank interval. The locking circuit 542 then functions through cathode follower 543 to operate relay 544 thus indicating that the proper number of pulses have been received. The setting of the counter tubes in each of the digit counters 531, 532 and 533 alters the bias on cathode follower tubes 710 to 715, inclusive, which are associated with the individual stages of the counters so that the settings of these counters are transferred to an operated combination of relays in the corresponding three sets of translator relays shown in Fig. 7.

The first digit is then represented in binary code form by the operated combination of relays 720 to 723, the second digit by the operated combination of relays 730 to 733 and the third or last digit of the office code by the operated combination of relays 740 to 743. The contact springs on each of these digit groups of relays form a translator network for converting the binary digit registration into a decimal digit registration. This translation is accomplished, for example, by the network shown associated with relays 720 to 723 in that if voltage is applied to the armature of relay 723 it will pass through various contacts of relays 720 to 723 appearing finally on only one of the ten output leads shown associated with relay 720 and bearing a decimal designation corresponding to the original decimal designation preset by the calling subscriber. In the case of the second and third digits, this decimal translation results in the operation of decimal register relays shown in Fig. 9. Since the office code designated by the calling subscriber is 248, voltage applied to the output lead 736 of the translator network for the second digit operates relay 935 and voltage applied to the translator output lead 746 for the third digit operates relay 937. This registration of the office code, designated by the calling subscriber, on the decimal relays of Fig. 9 occurs during the interval in which the remaining five digits are being transmitted to the receiver of Fig. 5 and thus this registration occurs before the operation of relay 544.

Relay 544, in operating, operates relays 545 and 546. Relay 545 resets the pulse counter 534 and the square wave generator 524 to their initial conditions, and relay 546 places a short-circuit across the left winding of receiver input repeating coil 513 to prevent the reception of any further pulses by this receiver and to prevent any alteration of established conditions by spurious pulses. Relay 544, in operating, also removes battery from lead 550 which releases relay 825 thereby removing the voltage applied to the main anodes of the cold cathode gas tubes in the various line circuits so that any other line circuits which have originating calls awaiting on them are prevented from connecting to the receiver of Fig. 5 until this receiver has completely restored to normal as described hereinafter. In addition relay 544 in operating connects battery to lead 549 in order to connect this receiver to the trunk number group of Fig. 9 if the switching network is not at the moment being operated upon by any other combination of register and number group.

Battery on lead 549 is applied through resistor 961 to the main anode 920 of tube 918 and through the voltage divider 919 to the start anode of said tube. If no other similar tubes are fired, tube 918 breaks down across its start gap, transfers the breakdown to the 920–921 gap and maintains lockout by virtue of the voltage drop across impedance 924. Next, breakdown is established across the main gap and current flows causing the operation of relays 925, 926 and 927. Operation of relay 927 applies a positive voltage to lead 930, which marks the calling line appearance on the switches, and operates relay 929 momentarily, which initiates the busy-idle-vacant test of the called trunk group. Relays 925 and 926 connect the A, B and C digit register leads to the trunk number group gas tubes. Operation of relay 929 causes capacitor 945 to be discharged through resistor 943, thereby preventing tube 946 from firing at this time; causes positive battery to be applied to the armature of relay 723; causes positive battery to be applied to armatures of C digit relays; and causes negative battery to be applied to armatures of B digit relays. The battery on the armature of relay 723 passes through the back contact of said relay, a back contact of relay 722, a front contact of relay 721, which is operated due to registration of 2 for the A digit, and a back contact of relay 720 to lead 725 which is connected through a contact of relay 925 to the start anode of cold cathode gas tube 954.

The battery from the armature of relay 723 is also connected to the start anode of other tubes having the same A digit. The path from the armature relay 723 is the same as that described above through the contacts of relay 925. Thereafter the circuit extends through an individual resistor similar to 932 to the respective start gap anodes. Inasmuch as there may be one hundred such trunks having the number 2 as the A digit, this voltage may be applied to one hundred start gap anodes. If the office is not fully equipped with one hundred such trunk groups, then the voltage is applied to a lesser number of tubes. For a purpose of illustration, however, assume that this voltage is applied to one hundred start gap anodes each associated with one of one hundred different trunk groups having 2 as the A digit.

The negative battery applied to the armatures of the B-digit relays is connected through the operated contacts of relay 929, a closed contact of relay 935, which is operated due to registration of 4 as a B digit, and a contact on relay 925 to the start cathode 959 of tube 954. This voltage is likewise applied through an individual resistor to the start gap cathode of all the tubes of the number group being designated by the number 4 as the B digit. In a three-digit number group such as set forth herein, there will therefore be a maximum of one hundred such tubes. Of course, if the entire possible maximum of one hundred trunk groups is not required, then a lesser number of tubes will be required so that this voltage may be applied to a lesser number of start gap cathodes. For the purpose of illustration, however, assume that this voltage is applied to one hundred start gap cathodes. It should be noted, however, that the voltage from the A-digit relays and the voltage from the B-digit relays are simultaneously applied to only ten tubes. In other words, only ten tubes are common to both groups of one hundred tubes. Consequently, the presence of these two voltages on the start gap cathode initiates a discharge across the ten tubes having 2 for the A digit and 4 for the B digit.

The positive voltage on the armature of the C-digit relay is connected through the operated contacts of relay 929, the front contact on relay 937, which is operated for the registration of an 8 for the C digit, and through a contact on relay 926 to a main anode 958 of tube 954. This voltage is likewise applied to a maximum of one hundred tubes, that is ninety-nine tubes similar to tube 954 which one hundred tubes all have 8 as the C digit, assuming, of course, that all of said tubes are provided. It should be noted, however, that only one tube of said one hundred tubes will be common to the group of ten tubes having a discharge between its control gap cathodes and control gap anode. As a result, the discharge transfers to the path between the main anode and the control gap cathode in this one tube. As will be described hereinafter, the discharge will again transfer between the path between the main anode and main cathode of the tube if a trunk in the associated trunk group is idle. On the other hand, if all of the trunks in the trunk group are busy, the discharge will not make the second transfer. Instead it will continue between the control gap cathode and main anode as will be described hereinafter.

After a very short time relay 929 releases since operating ground was applied through capacitor 931. Release of relay 929 removes the negative battery from the armatures of the B digit relays and positive battery from the armatures of the C digit relays and in so doing permits the operation of relay 939 since positive battery is now furnished to the gas tube through its winding and series resistor 941. The operation of relay 939 and non-operation of relay 938 is the result of an idle indication on the idle-busy-vacant test of the trunk group tube as described hereinbefore. Operation of relay 939 with relay 938 released operates relay 949 which shorts the winding of relay 938 so that it cannot operate subsequently and applies positive battery through a contact of relay 926 and the winding of relay 955 to the main anode of tube 954; and discharge in said tube now transfers to the main gap causing the operation of relay 955 which applies a positive voltage on lead 956 for marking the appearance of idle trunks in the desired trunk group on the trunk frames of the switching networks.

If the trunk group has been busy when the test was made, the main cathode of tube 954 would have been at ground potential and the breakdown in the tube would have remained across the 958--595 gap causing the operation of both relays 939 and 938 with the result that tube 946 would be fired and the calling line eventually connected to a busy-tone trunk as hereinbefore described. This method of locating the trunk tube and making the busy-idle-vacant test is similar to that described in the heretofore identified case of Cornell et al.

When the trunk group tube 954 transfers to its main gap, the current flowing through the circuit causes operation of relay 955 which applies a positive voltage to lead 956. This voltage is applied in out-trunk 2108 through the back contact of relay 2150, and a series back contact of relay 2151 if the trunk is idle to the common point of the windings of relay 2152, and extended through the left-hand winding of relay 2152 via lead 2153 to the right vertical of primary switch 1713 on trunk frame 1710 of the switching network. The voltage is also applied through a similar circuit in out-trunk 2001 if idle to lead 2053 and via lead 2053 to the right vertical of primary switch 1812 of trunk frame 1810 of the switching network. Thus, a voltage mark exists for each idle trunk of the group of two trunks shown, one appearing on each of the two trunk frames so that the calling line may be connected to either out-trunk circuit.

The mark on lead 2153 causes firing of the diodes of crosspoints 1735 and 1736 provided the associated links are idle. Firing of the diode of crosspoint 1735 causes a rise in potential on the control lead of link 1718 so that the diodes of crosspoints 1742 and 1743 are fired and the potential on lead 1412 to junctor 1410 and on lead 1512 to junctor 1514 is raised and the junctor gas tubes similar to tube 1420 in junctor 1410 fire on their start gaps. Firing of the diode of crosspoint 1736 causes a rise in potential on the control lead of link 1719 so that diodes of crosspoints 1740 and 1741 are fired and the potential on leads 1739 and 1424 is raised and the start gaps of the gas tubes in junctors 1516 and 1415, similar to tube 1420 in junctor 1410, are fired.

The marking on lead 2053 causes diodes in crosspoints 1828 and 1829 to fire thereby raising the potential of leads 1833 and 1831 so that the diodes of crosspoints 1834, 1935, 1836, and 1837 are fired in the manner hereinbefore described. Firing of the diode of crosspoint 1834 causes the gas tube of junctor 1414 to fire on its start gap due to increased potential on lead 1826. In a similar manner firing of diodes of crosspoints 1835, 1836 and 1837 cause firing of start gaps of gas tubes in junctors 1510, 1416 and 1515 respectively. Thus, in this exemplary case with two trunks in a trunk group, the trunk sides of all eight junctors have been marked, if all are idle.

When connection of the register to the trunk number group was completed as hereinbefore described, a voltage mark was applied over lead 821 through the winding of relay 822 to lead 826 which caused breakdown of diodes 1111 and 1121, if not busy. Firing of these diodes causes a rise in potential on control leads 1126 and 1129 provided the links are idle. Rise in potential of lead 1126 causes firing of diodes 1127 and 1128 with the result that the potential on leads 1411 and 1417 is raised causing a mark on the screen of tube 1420 in junctor 1410 and a mark on the screen of a similar gas tube in junctor 1414. Rise in potential of lead 1129 causes the screens of tubes in junctors 1415 and 1416 to be marked due to breakdown of diodes 1130 and 1131 respectively in the manner described hereinbefore. Thus, four junctors 1410, 1414, 1415 and 1416 of the eight have their screens marked and are fired across their start gaps and two possible paths are provided from the calling line to each of the two trunks of the trunk group. Due to the presence of common impedance 1425 in the main anode circuit of the junctor tubes only one tube will transfer to its main gap. Which one transfers is a matter of chance. Assume that tube 1420 in junction 1410 transfers. At this time the voltage drop across common impedance 1425 causes the voltage across the main gaps of all other tubes to be below the transfer value and thus all other tubes are locked out. Break down of the main gap of tube 1420 operates relay 1428 which applies negative battery through low valued resistors 1430 and 1431 to the marked leads to the switching network so that the increase in current due to this low impedance voltage source operates crosspoint relays 1132 and 1123 in line frame 1110 and operates relays associated with crosspoints 1743 and 1735 in trunk frame 1710. Operation of relays 1132 and 1123 shorts their associated diodes thereby raising the current flowing through the right winding of relay 822, which operates and initiates a sequence of operations described hereinbefore which disconnect the line circuit 800 from actuator 900, from receiver of Fig. 5, from register and translator of Fig. 8, and from the trunk number group so that these circuits may serve another call when required to do so. Operation of relays in crosspoints 1743 and 1735 shorts out their associated diodes thereby raising the current flowing through the left winding of relay 2152 and the lower winding of relay 1432 causing their operation. Operation of relay 1432 operates relay 1436 and operation of relay 2152 closes part of the path which marks the trunk group tube 954 busy. If both trunks are in use, a ground supplied in out-trunk 2001 is applied over lead 2170 through the closed contact of relay 2152 to the cathode 957 of tube 954. In the case of more trunks in the same group, this ground path is extended in series through contacts of relays similar to relay 2152 in out-trunk 2108 to the relay of the last trunk in the group so that the cathode of the trunk group tube 954 is only grounded when all trunks in the group are busy.

After operation of relays 822 and 2152, the marks are removed, all fired diodes are extinguished and the switches are ready to handle the next call over existing idle paths and with the paths just established marked busy as hereinbefore described. Operation of crosspoint relays established a direct current path from subset 600 through line 614, line circuit 800, switch crosspoints 1123, 1132, 1743 and 1735 to relay 2151 which has battery and ground applied through its windings to ring and tip respectively of the out-trunk circuit. Thus, current flows in this circuit and relay 2151 is operated which furnishes through its contacts a holding ground through varistor 2154 and the windings of relay 2152 to the established switching network connection.

Operation of relay 2152 applies battery 2020 through resistor 2021 to cold cathode gas tube 2156. If no other gas tubes in this group are fired, tube 2156 will breakdown and transfer to its main gap in the manner hereinbefore described causing the operation of relay 2150 which, in a manner similar to that hereinbefore described, splits the input and output tip and ring talking conductors of the out-trunk circuit, connects repeat coil 2214 through the switches, line circuit 800, and line 614, back to the subscriber's set 600, provides a temporary holding ground to varistor 2154 under control of relay 2213, releases relay 2151, connects relay 2164 across leads 2168 and 2167 of trunk 2162, causes tube 2156 to be extinguished and provides a locking path for itself through resistor 2169. Operation of relay 2150 also operates relay 2212 which removes a short from the output of power amplifier 2216 so that 45 cycle current is applied to the subset 600 through the simplex of the connection previously described for the generation of signals which are returned over the loop of said connection and pass through repeat coil 2214 and the closed contacts of relay 2150 to the tip 2167 and ring 2168 of the trunk 2162. When relay 2212 operates, relay 2213 starts to release but is held operated on its upper winding due to slow release circuit 2218, 2219 until the detected 45 cycle current in its lower winding causes said relay to be held. Supervision of the connection is maintained during signaling by this process of monitoring the 45 cycle current which is substantially reduced if the calling subscriber hangs up or the connection is broken in any way. The connection of relay 2164 across the trunk 2162 provides a direct current path to incoming trunk 1900 to inform said trunk that it should call for a receiver to receive, decode, and register the signals identifying the called line.

The connection of polar relay 2164 between the tip and ring talking conductors of out-trunk 2108 completes a direct current circuit over local trunk 2162 to battery and ground through the windings of relay 1910 in in-trunk 1900 in the same office. Under this condition relay 1910 operates and the direction of direct current flow over the inter-trunk loop is such that polar relay 2164 in the out-trunk remains unoperated. Relay 1910, in operating, connects positive battery from the normally operated contacts of relay 1955 through the normally closed contacts of relay 1921 to the main anode 1912 of gas tube 1911 in the incoming trunk circuit and closes a fraction of this same voltage through potential dividing resistors 1913 and 1914 to the start anode 1915 of the same gas tube. Start cathode 1916 of this trunk gas tube is connected to ground in common with the start cathodes of similar gas tubes in other incoming trunks in the same receiver group through lockout element 1957. Under this condition, the start gap of tube 1911 fires unless other similar gas tubes in the other trunk circuits have already operated causing a voltage drop in the lockout element 1957. Assuming that tube 1911 fires on this start gap, the discharge will then transfer from start anode 1915 to main anode 1912. The current path between elements 1912 and 1916 of this gas tube, constituting another stage in the lockout process, is described in the patent to Hall referred to hereinbefore. If tube 1911 is not locked out from service, the discharge finally transfers to the main cathode 1918 at which time current flows in this main gap circuit of the tube through resistor 1919 and the winding of relay 1920 causing the operation of this relay. Relay 1920, in operating, locks to ground under control of a back contact of relay 1921 but the discharge in gas tube 1911 is continued to keep all other incoming trunks in a locked out condition. Relay 1920, in operating, closes ground to lead 1922 which operates relays 1610 and 1612 in the terminating receiver and releases relay 1611 which is normally biased into an operated position. Relay 1920 also extends through its operated contacts the incoming tip and ring conductors on which signaling pulses are now being received from out-trunk 2108 via conductors 1923 to the input transformer or repeat coil 1613 of the terminating receiver.

The operation of relay 1610 in the terminating receiver operates counting device 1614 for supplying a record of the number of times this terminating receiver is used in the establishment of calls and completes a circuit from the right winding of repeat coil 1613 to the band-pass filter 1617 of the receiver circuit. Relay 1611, in releasing, removes a resistance termination from repeat coil 1613 so that the incoming signal pulses may pass into the band-pass filter. Relay 1611 also removes ground from the automatic volume control circuit 1618 so that the incoming signal pulses may cause the gain of this volume control circuit to be adjusted as described hereinafter. In addition, relay 1611 removes ground from the winding of relay 1615 permitting this relay to release and relay 1615, in releasing, enables the code detector 1620. The release of relay 1611 also releases relay 1616 to apply battery supply potentials to the various control circuits of the receiver so that they are conditioned to receive and decode the incoming signal pulses.

Figure 16:
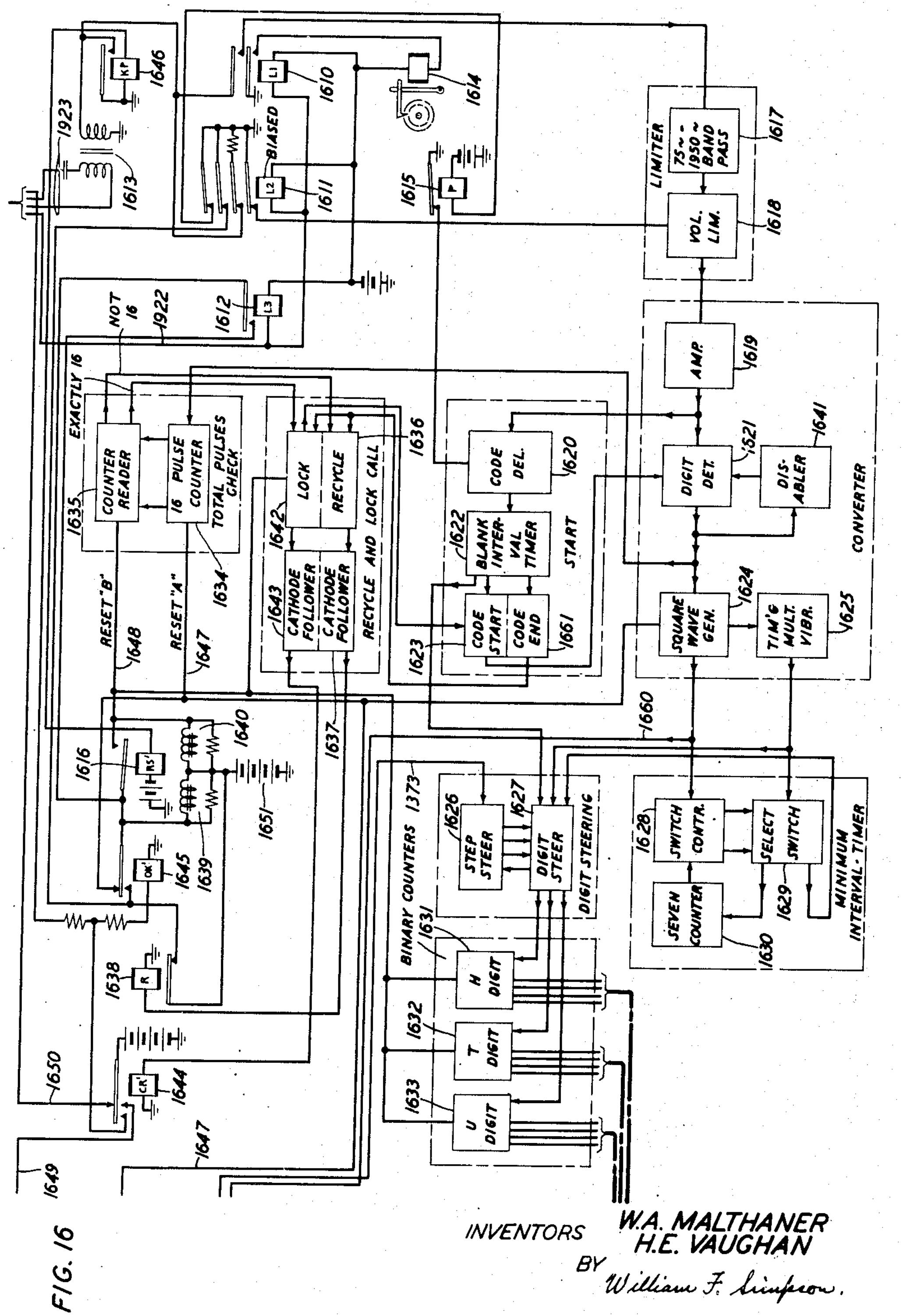

The signal pulses as received by the receiving circuit shown in Fig. 16 first pass through filter 1617 to the volume limiter 1618 causing the gain of said limiter to be set at the proper level as described in the above identified application of Malthaner et al. In addition these pulses, after being repeated by the limiter circuit, are transmitted to the code detector 1620 through amplifier 1619 which detector is provided with a timing circuit which recognizes the blank interval between the series of pulses representing a complete called number designation. The other circuits are rendered ineffective and are blocked until such a blank interval is received. At this time the code detector 1620 as well as the other portions of the start circuit respond to the blank interval and cause the various other circuits to be conditioned to thereafter receive the pulses. These circuits then respond to the succeeding pulses received from the subscriber station and cause the magnitudes represented by the various pulses to be stored on binary counters 1631, 1632, and 1633 after absorbing the three pairs of pulses which it is not desired to register since they designate the called office.

The gain of volume limiting amplifier 1618 is automatically regulated so that the amplitude of the pulses from this amplifier are substantially independent of the amplitude of the pulses as received. Pulses are then further amplified by amplifier 1619 and then supplied to code detector 1620 and digit detector 1621. As described above the code detector together with the blank interval timer 1622 recognizes the blank intervals between each complete series of pulses representing the entire subscriber station designation. The digit detector 1621 is normally rendered inoperative. However, in response to the operation of the blank interval timer which in turn operates the code start circuit 1623, the digit detector 1621 is rendered operative so that it will respond to the succeeding pulses received from the calling device of subscriber station 600. The first start pulse thereafter is received by the digit detector 1621 which pulse is employed to control the square wave generator or switching device 1624 and in turn to start the operation of a timing circuit such as multivibrator 1625.

Since this receiver is required to register the digits designating the called subscriber's line number, the digits preceding this line number information, which represent the office code and were therefore used by receiving equipment in Fig. 5 as described hereinbefore, must be discarded. This is accomplished by absorb office code circuit 1360. This absorbing circuit 1360 is operated by pulses transmitted from square wave generator 1624 on the first or start pulse of each digit over lead 1660 through a small coupling condenser to both grids of tube 1361. In this pulse absorbing circuit tubes 1363 and 1365 are two double stability or flip-flop circuits arranged to form a two-stage binary counter. These two counter stages jointly control tube 1368 so as to enable either the left section or the right section of tube 1361 depending upon the setting of said counter stages. In the normal condition of this absorbing circuit, counter tubes 1363 and 1365 are conducting in their right sections and cut off in the left sections.

In this normal condition voltage connected from the right plate of counter tube 1363 through resistor 1367 to the right grid of tube 1368 together with a similar voltage connected from the right plate of tube 1365 through resistor 1366 to the same grid of tube 1368 causes this right section of tube 1368 to be cut off. With the right section of tube 1368 cut off, ground is connected from the cathode of this section through resistor 1379 to the grid of the left section of tube 1368 and negative battery is connected through resistor 1380 to the same left grid. The bias thus established on the left section of tube 1368 keeps this left section also cut off. At this time ground from the right cathode of tube 1368 is connected through resistor 1371 to the right grid of tube 1361 which, together with the negative voltage supplied to this same grid through resistor 1372, keeps this right section of tube 1361 cut off. Positive voltage taken from the left plate of tube 1368 through resistor 1369 to the left grid of tube 1361 together with the negative voltage supplied to this same grid through resistor 1370 enables the left section of this tube to amplify the pulses being received over lead 1660 as described above. The negative pulses thus produced in the plate circuit of the left section of tube 1361 are connected through capacitor 1362 to the first stage of the counter 1363. Each pulse thus received by counter stage 1363 causes a reversal of the current conditions in the two halves of this stage and the negative pulses generated in the right plate of tube 1363 each time it returns to its normal conducting condition are connected through condenser 1364 to the second stage of the counter 1365 causing its operation in a similar manner. When three pulses have been transmitted to this counter circuit from lead 1660 and through the left section of tube 1361 indicating that the first three digits of the incoming signals have been received, both counter tubes will be conducting in their left sections.

The voltage thus connected to the right grid of tube 1368, through the circuit of resistors 1366 and 1367 previously described, brings the right section of tube 1368 to current saturation. With the right section of tube 1368 at saturation, the positive voltage developed in the cathode of this section and connected through resistor 1379 to the grid of the left section brings this left section into a similar condition of saturation. With both sections of tube 1368 at saturation, the potentials which this tube applies to the two sections of tube 1361 through resistors 1371 and 1369 as previously described, causes the left section of tube 1361 to be cut off and the right section to be enabled. With the right section of tube 1361 enabled, subsequent pulses from the square wave generator 1624 over lead 1660 are amplified and repeated on lead 1373 to the step-steering circuit 1626. The first pulse received by step-steering circuit 1626 over lead 1373 causes the step-steering circuit 1626 to condition the digit steering circuit 1627 so that when pulses are applied to it, as will be described hereinafter, they will be directed to the first digit counting and storing circuit 1631. In response to each first or start pulse applied to the digit detector the disabling circuit 1641 is actuated which in turn renders the digit detector unresponsive to any further received currents for the interval time required for the transients to die out. At the end of this time the digit detector 1621 is again rendered operative so that it will properly respond to the stop pulse. Meantime however, the multivibrator or timing circuit 1625 has been arranged to transmit or generate seven pulses which pulses are applied to the selective switching circuit 1629. The selective switching circuit 1629 was set by the output of the square wave generator 1624 and the switch controlling circuit 1628 in response to the first start pulse as described above so that the selective switching circuit 1629 causes the first pulses received thereby to be transmitted to the counter circuit 1630. The counting circuit 1630 counts seven of these pulses, that is the pulses received during the time the transient of the initial start pulses are dying out, and at the end of the seventh pulse actuates the switching control circuit 1628 so that switch 1629 is actuated to a position or condition where it causes the remaining pulses received from multivibrator 1625 to be transmitted to the digit steering circuit 1627 instead of the counter 1630.

Until the absorb office code circuit 1360 has completed its operations, steering circuit 1627 is in a non-transmitting condition; however, when the right section of tube 1361 has been enabled and has transmitted a pulse to the step-steering circuit 1626 to condition in turn steering circuit 1627 to transmit pulses to counter 1631, as described above, each succeeding pulse from source 1625 over the initial seven is transmitted to the binary counter circuit 1631 which circuit counts each of the succeeding pulses from the said timing circuit. If the first digit has a magnitude of one, the timing multivibrator 1625 will have time to transmit only one pulse to the counting circuit 1631 before the stop pulse is received. If the magnitude of the first digit is 5, then five pulses will be transmitted to circuit 1631 before the stop pulse is received. If the magnitude of the first digit is 5, then five pulses will be transmitted to circuit 1631 before the stop pulse is received. Thus, the time of reception of the stop pulse relative to the start pulse is employed directly to designate the magnitudes of the digits or characters of the designation of the called station code.

The reception of the stop pulse operates digit detector 1621 and square wave generator 1624 to stop the operation of multivibrator 1625. The stop pulse also causes the digit detector 1621 to be disabled by disabler 1641 for seven increments of time during which the transients associated with the stop pulse can die out. The next start pulse will then cause the circuits to operate in a manner similar to that described above in reference to the preceding start pulse except that the stepping circuit 1626 will advance the digit steering circuit 1627 and cause the succeeding pulses over and above the first seven from multivibrator 1625 to be transmitted to and recorded by the counter circuit 1632. In a similar manner the magnitude of the third digit is recorded on digit counter 1633.

Checking provisions have also been provided for checking the operation of the circuits to insure that the proper number of signal pulses have been received. As pointed out above two pulses are required to represent each digit. Since in the exemplary embodiment set forth herein the complete subscriber's designation comprises eight digits then sixteen pulses should be included in each series of pulses between the blank intervals. The output of digit detector 1621 is applied to a sixteen-pulse counting circuit 1634. If more or less than sixteen pulses are received by counting circuit 1634 between two blank intervals, the circuits are arranged to cancel all registrations and start over in response to the next series of pulses. In order to accomplish this the sixteen-pulse counter 1634 controls the counter reader 1635. If counter 1634 has counted other than sixteen pulses, the counter reader 1635 conditions the recycle circuit 1636 so that it will repeat a pulse from the code end circuit 1661 through circuit 1636 in response to the next blank interval and cause the operation of relay 1638 through cathode follower circuit 1637. Relay 1638, in operating, removes a short-circuit from inductive networks 1639 and 1640 in battery supply 1651 to the various counter and switching circuits so that these circuits are all restored or set to their initial condition, after which time they may again respond to the succeeding series of pulses transmitted from the calling subset 600. If a total of sixteen pulses as required in the exemplary embodiment of the invention set forth herein is received between the two blank intervals then the counter reader 1635 will condition the locking circuit 1642 instead of the recycle circuit 1636 to repeat a pulse from the code and circuit 1661 in response to the succeeding blank interval. The locking circuit 1642 then functions through cathode follower 1643 to operate relay 1644 indicating that the proper number of pulses have been received.

Figure 13:
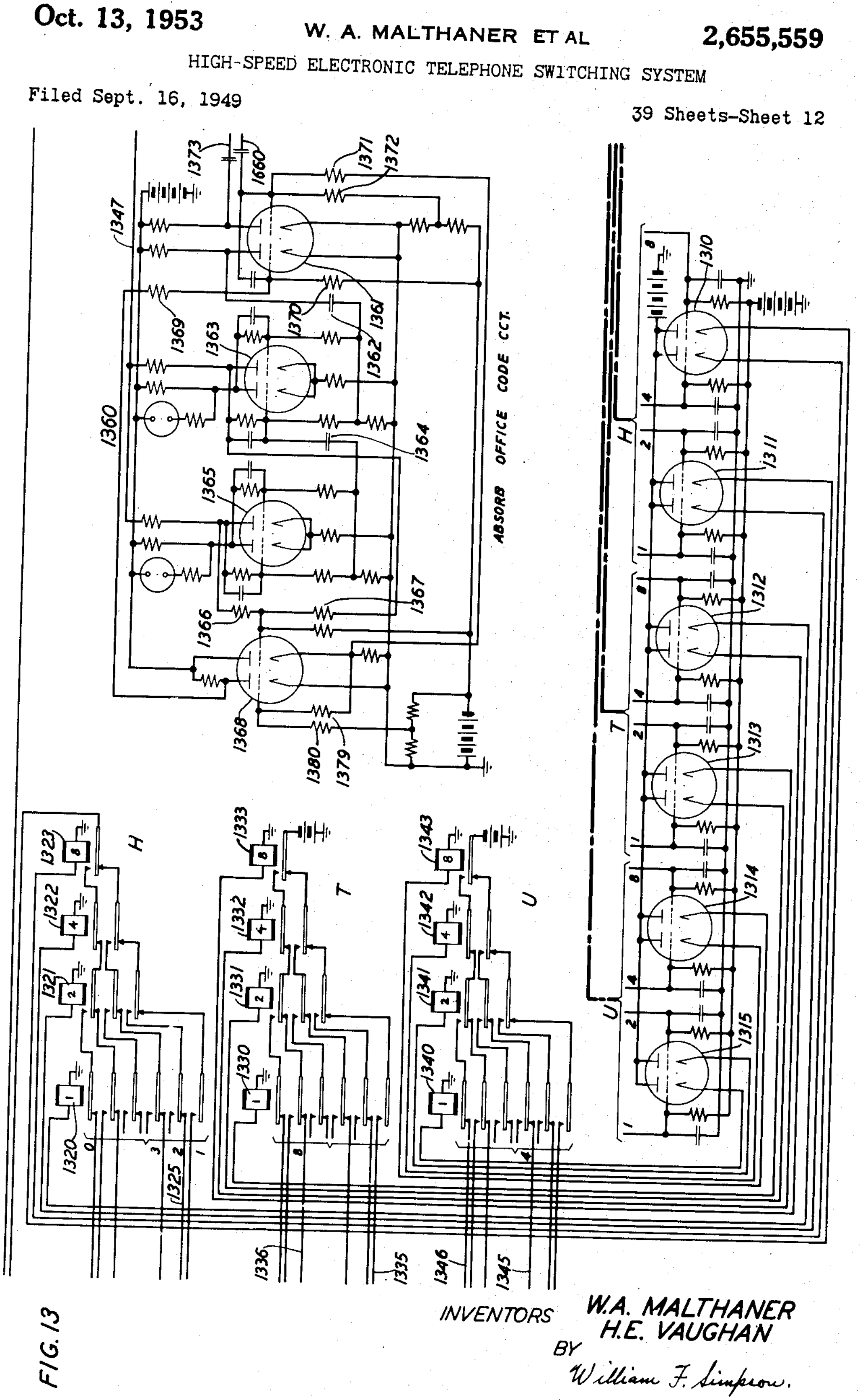
Figure 14:
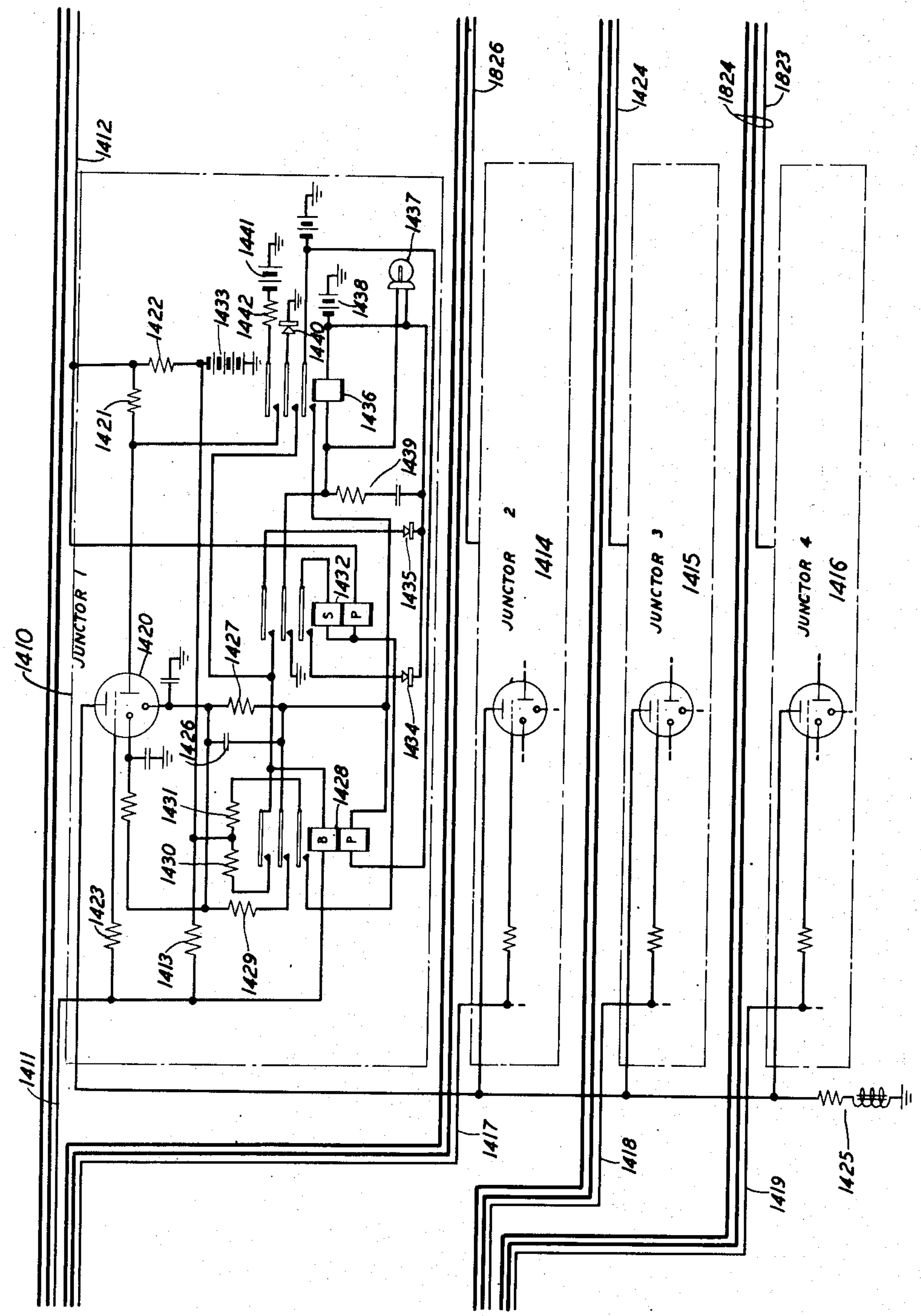
Figure 15:
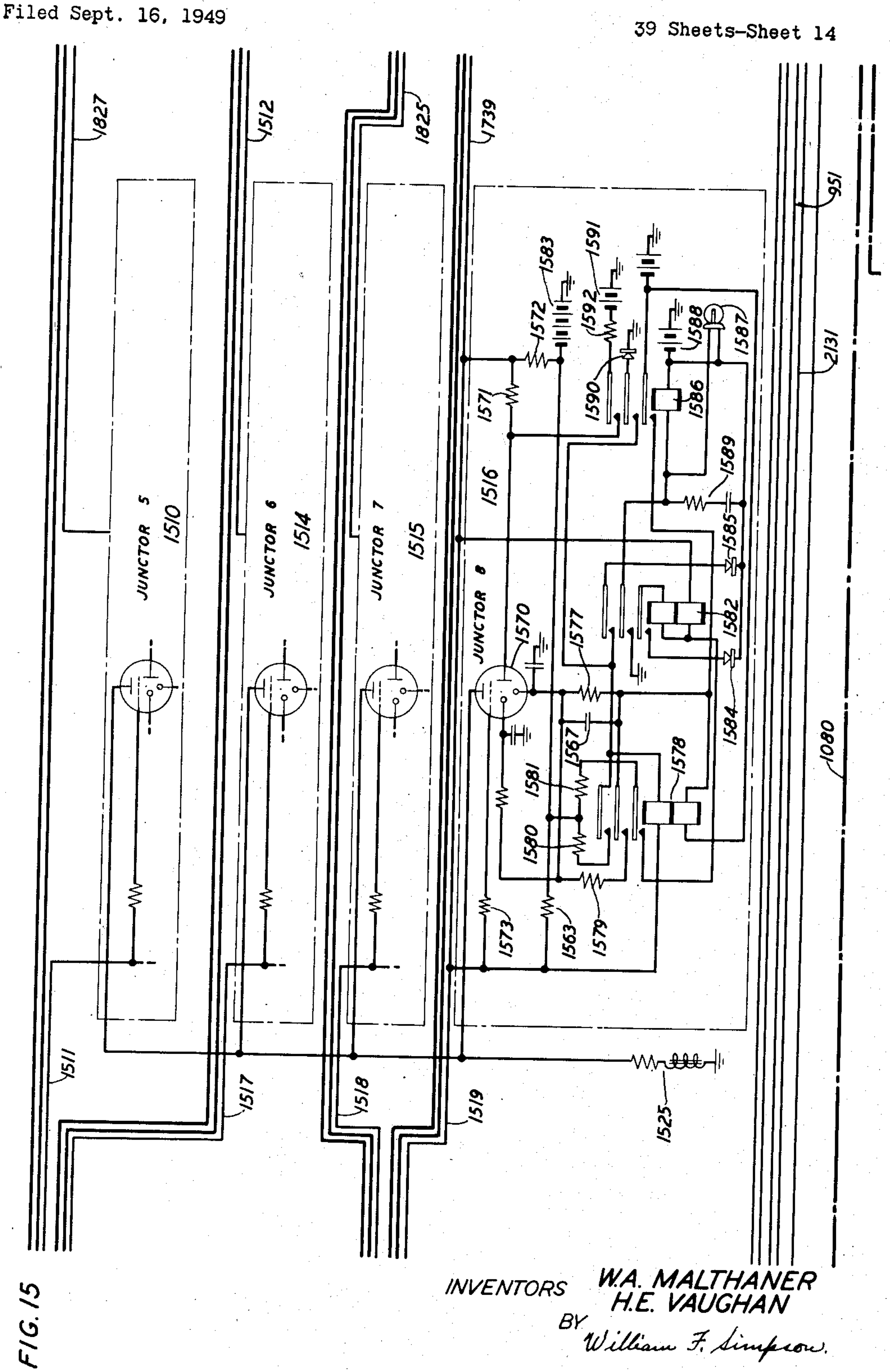

The setting of the counter tubes in each of the digit counters 1631, 1632 and 1633 controls the bias on cathode follower tubes 1310 to 1315 inclusive which are associated with the individual stages of the counters so that the setting of these counters is transferred through these tubes 1310 through 1315 to a combination of relays in the corresponding three sets of translator relays shown in Fig. 13. The hundreds digit is then represented in binary code form by the operated combination of relays 1320 to 1323, the tens digit by the operated combination of relays 1330 to 1333 and the units or last digit of the called subscriber's directory number by the operated combination of relays 1340 to 1343. The contact springs on each of these digit groups of relays form a translator network for converting the binary digit registration into a decimal digit registration. This translation is accomplished for example by the network shown associated with relays 1320 to 1323 in that if voltage is applied to the armature of relay 1323 it will pass through various contacts of relays 1320 to 1323 appearing on one of the ten output leads shown associated with relay 1320 and bearing a decimal designation corresponding to the original decimal designation preset by the calling subscriber. In the case of the tens and units digits, this decimal translation results in the operation of decimal register relays shown in Fig. 10. If we assume, for example, that the directory number designated by the calling subscriber is 284, voltage applied to the output lead 1336 of the translator network for the tens digit operates relay 1034 and voltage applied to the translator output lead 1345 for the third digit operates relay 1054. This registration of the called line directory number designated by the calling subscriber is rapidly registered on the decimal relays of Fig. 10 and thus occurs before the operation of relay 1644.

Relay 1644 in operating in response to the reception of the proper number of pulses for a complete subscriber's designation operates relays 1645 and 1646. Relay 1645 resets the pulse counter 1634 and the square wave generator 1624 to their initial conditions and relay 1646 places a short-circuit across the right side of receiver input repeating coil 1613 to prevent the reception of any further signaling pulses by this receiver. Relay 1644 in operating also removes battery from lead 1650 which releases relay 1955 thereby removing the voltage applied to the main anodes of the cold cathode gas tubes in the various line circuits so that any other line circuits which have originating calls awaiting on them are prevented from connecting to the receiver of Fig. 16 until this receiver has completely restored to normal as described hereinafter. In addition relay 1644, in operating, connects battery to lead 1649 in order to connect this receiver to the subscriber's number group of Fig. 10 if the switching network is not at the moment being operated upon by any other combination of receiver and number group.

The voltage on lead 1649 connects to the main anode 1020 of cold cathode tube 1018 through a resistor and to the start anode 1019 of said gas tube through a potential dividing resistance network. The start cathode 1021 of this gas tube is permanently connected through varistor 1023 to the lockout elements or network 924. This lockout element also connects in a similar manner to the start cathode of gas tube 918 in the trunk number group circuit of Fig. 9 and in a similar manner to similar gas tubes associated with other receivers and to number group connectors not shown in detail. Since the connections through the switching network which these connector circuits in part establish must be performed on a one-at-a-time basis, as described hereinbefore, lockout is provided in exemplary system shown between the connector tubes 918 and 1018 by the lockout elements, on a simultaneous basis by the inductance of element 924 and on a steady state basis by resistance in order to prevent the operation of connector relays 925, 926 and 927 at a time when the connector relays 1010, 1011, 1012 and 1013 of the subscriber number group are operated and vice versa. The voltage applied to tube 1018 results in the firing of the tube between the start anode 1019 and the start cathode 1021 followed by transfer to the main anode 1020—start cathode 1021 path, and either of these operations may be prevented if tube 918 of the trunk number group is fully operated or simultaneously attempting to operate.

Assuming that tube 1018 is not locked out by this process, the discharge within it finally transfers to the main anode 1020—main cathode 1022 path, thereby operating connector relays 1010 to 1013, inclusive. Relay 1010 connects the ten test and control leads associated with the possible hundreds digits of called subscriber line number designations from the cold cathode gas tubes of the line circuits to the incoming register of Figs. 10 and 13. Relays 1011 and 1012 make similar connections for the test and control leads associated with the tens digits and with the units digits of possible line designations respectively. The operations over these leads will be described hereinafter.

Connector relay 1013 completes, in part, circuits for controlling the switching network, as described hereinafter, and connects ground to lead 1014 for interpreting the results of an idle—busy—vacant test to be performed on the designated called line and to cause the circuits of the originating office and the calling subscriber's subset to transfer from its signalling condition to a talking condition. This transfer to a talking condition is accomplished as follows. The ground applied to lead 1014 extends through contacts of operated receiver connector relay 1920 of the incoming trunk 1900 to operate relay 1925. Relay 1925 by means of its transfer contacts reverses the connections between the intra-office loop conductors 2162 and the ground and battery supplied to these conductors through the windings of relay 1910 thus causing a reversal in the direction of direct current flow over this intra-office loop and through the winding of polar relay 2164 in the associated out-trunk 2108 of the originating section of the office. Relay 2164 now operates, in turn, operating relay 2155.

Relay 2155 applies ground through varistor 2154 to the left winding of relay 2152 to maintain a holding condition on relay 2152 and on the connection established through the switching network of this originating section of the office as previously described. Relay 2155, in operating also reconnects battery and ground through the windings of relay 2151 to the tip and ring conductors extending from this out-trunk through the switching network and over the calling subscriber's loop 614 to the calling subscriber's subset 600 in the reverse manner to that in which the connection of this relay to the subscriber's loop was originally made as described hereinbefore. The reverse flow of direct current thus established through the windings of latch magnet 617 of the calling subscriber's subset causes this magnet to operate releasing the previously latched switchhook contact assembly 615, thus removing from the loop conductors 614 the signaling apparatus in the subset comprising digit selector 610, digit stepper 616, signaling pulse generator transformers such as 620 and 621 and the other signaling apparatus previously described, and in turn connecting to the loop conductors 614 the usual talking apparatus comprising a transmitter and receiver in the handset 611, condenser 622 and the induction coil or transformer 623.

Relay 2155 in operating also opens the path from common battery 2020 on which the actuator connector relay 2150 was being held permitting relay 2150 to release, thus opening the connections between out-trunk 2108 and outward actuator 2210, and thereby permitting another trunk circuit to seize this actuator 2210. Relay 2212 in the outward actuator circuit now releases reestablishing a ground connection through conductor 2211 and resistor 2215 to the output circuit of signaling power amplifier 2216 to discontinue transmission of signaling power through output transformer 2214. Relay 2212 also establishes a holding connection on the upper winding of relay 2213 in turn maintaining ground on lead 2121 to all the out-trunk circuits in the same actuator group.

Relay 2155 also closes a circuit for maintaining the connection of the relay 2164 between the tip and ring conductors of intra-office leads 2162 after the release of relay 2150. Relay 2155 connects the tip and ring conductors of the loop extending to the calling subscriber to the tip and ring conductors of intra-office loop 2162 through series condensers 2180 and 2181 respectively thereby establishing a talking connection between the said subscriber's loop and the intra-office loop conductors.

Relay 2151 operating on the direct current applied over the subscriber's loop circuit from the battery and ground connected through its windings supplies an additional holding ground through varistor 2154 to relay 2152 and the switching network connection through the originating section of the office and also completes a locking circuit for relay 2155, thus placing the maintenance of the connection established between the calling subscriber and this out-trunk circuit now jointly under the control of switchhook contacts 612 of calling subscriber's subset which in turn control relay 2151 of out-trunk 2108 and relay 2164 of the out-trunk circuit 2108.

Meanwhile, relay 1013 supplies ground through condenser 1015 for momentarily operating relay 1016 in order to start the process of selection of the called subscriber's line and the busy-idle-vacant test of this line. Assume that line circuit 803 is the desired called line circuit and corresponds to the line number 284 in the directory listing plan. Relay 1016, in operating, connects positive battery to lead 1025 which connects to the armature of relay 1323 and passes through the contacts of the relay contact network associated with the hundreds digit of the called subscriber's number including a front contact of operated relay 1321 and in turn to lead 1325 since designated hundreds digit is 2. Lead 1325 is in turn connected through operated contacts of relay 1010 to lead 1026 within the group of conductors 1027 and in turn through a resistor to start anode 890 of line tube 864 in the designated called line and through similar resistors to the start anode of similar gas tubes in other line circuits having the same first digit designation.

Ground is also connected by the operation of relay 1016 to conductor 1028 and in turn through the operated register relay associated with the tens designating digit of the called subscriber's line, such as relay 1034 if this second digit is 8, to conductor 1029 and in turn through an operated contact of relay 1011 to conductor 1032 of the group of conductors 1033. This ground connection is extended through a resistor to the start cathode 891 of gas tube 864 in the called subscriber's line circuit and through similar resistors to the start cathode of similar gas tubes in other line circuits having the same tens digit designation. These potentials, applied to the start cathode and start anode, result in the firing of this gap in all line gas tubes having this combination of hundreds and tens digits, a maximum of ten in a thousand line group.

However, relay 1016 also connects positive battery to conductor 1035 and through the register relay associated with the units digit of the called subscriber's number, such as relay 1054 for the case in which this units digit is 4, and in turn to conductor 1036. This voltage on conductor 1036 is further extended through an operated contact of relay 1012 to the junction of a group of resistors and through one of these resistors to conductor 1037 within the group of conductors 1033 to anode 1037 of the called line gas tube and to the corresponding anode of gas tubes in the other line circuits having the same units digit as this designated line. Thus, of the group of line gas tubes fired on the start cathode-start anode gap only the tube in the designated called line circuit will also have voltage applied to the second anode and thus will be the only tube able to transfer its discharge to the second anode-start cathode path.

Relay 1016 is operated only long enough for the above discharge paths to be established in the line circuit gas tube after which time it releases, removing the original battery and ground circuits which it had closed to initiate said discharges extinguishing all discharges in line tubes except the discharge in the tube of the designated called line. The tube of the called line remains fired however, since relay 1041 continues to supply ground through its winding to conductor 1028 which is connected, as described above, to the start cathode of the designated called line circuit 803 and relay 1042 continues to supply positive battery through its winding to conductor 1035 which is connected to the second anode of the called line gas tube, as previously described. The idle, vacant or busy condition of the called line is determined by the operation or non-operation of relays 1041 and 1042 in response to the current flow conditions which they find to have been established in the gas tube of the called line circuit.

Considering in a little more detail the line circuit and its associated gas tube, assume as before that line circuit 803 is the desired called line circuit and corresponds to the line number 284 in the directory listing plan. The potentials applied by relay 1016 over the paths previously described to the control elements of the line gas tube associated with the digits 284 will have produced conduction on one of various paths within the gas tube 864 associated with this line. The discharge will have initially been caused between the start cathode and start anode, and will have transferred to the start cathode-secondary anode path, as previously described. In addition, however, if this line is in an idle condition the circuit from main cathode 868 is completed through a back contact of relay 860 and a back contact of relay 862 through resistor 892 to ground and from this resistor through a back contact of relay 861 to the junction of the two windings of relay 872 and through the right winding of this relay to conductor 876 and to the appearance of this line on the switching network of Fig. 12. A path is also completed from the common point of the windings of relay 872 through the left-hand winding and series varistor 879 to ground. Under this idle line condition the discharge in gas tube 864 will transfer to the path between secondary anode 1037 and main cathode 868. If the line is busy however, the main cathode 868 will be connected to ground only through a high valued resistor 893 in which case the discharge through the gas tube will remain across the gap between secondady anode 1037 and start cathode 891. Furthermore, if there is no line in the office corresponding to the received designation 284 there will be no corresponding line gas tube and will be no discharge through a line gas tube after the release of relay 1016.

Assuming that the called line is idle and that the discharge in the line gas tube has transferred to the secondary anode-main cathode path, as described above, the current in this discharge path causes the operation of relay 1042 but relay 1041 which is connected to the start cathode of the line tube remains unoperated because the discharge has transferred from the start cathode to the main cathode. If the called line is in a busy condition, the discharge through the line gas tube will not transfer to the main cathode. Instead it will continue to the start cathode and as a result will cause the operation of relay 1041 as well as relay 1042, and if the line is vacant of course neither of these relays will be operated.

Considering the case of an idle called line, the ground connected to conductor 1014 by the operation of relay 1013, as described hereinbefore, will be extended through an operated make contact of relay 1042 and a series back contact of unoperated relay 1041 to the winding of relay 1043 thereby causing its operation. At the same time ground will be removed by the operation of relay 1042 from conductor 1044 which is used in the trunk circuit in case the line is busy or vacant, as will be described hereinafter. Relay 1043, in operating, places a shunting ground around the winding of relay 1041 to insure that it does not operate subsequently and applies ground to conductor 1048 which passes through a contact of connector relay 1920 to the winding of relay 1928 thereby causing its operation. Relay 1928 opens the operating circuit of relay 1926 to prevent its subsequent operation. Relay 1928 also connects a source of ringing power through relay 1929 to the ring conductor and directly to the tip conductor of the outgoing talking leads of this trunk which will be extended through the switching network to the called subscriber's subset as described hereinafter. In addition, relay 1928 removes short circuits from the series resistor capacitor networks 1930 and 1931 in the tip and ring conductors of the incoming trunk so that a fraction of the ringing voltage is transmitted through these networks and through the tip and ringing talking capacitors 1932 and 1933 to the tip and ring conductors which extend through trunk 2108 and through the switching network of the originating section of the office to the calling subscriber. This ringing tone informs the calling subscriber that a connection to the subscriber, he has designated by the setting of the signal generating apparatus in his subset, is being established.

Relay 1043, in operating as described above to indicate that the desired called subscriber's line is idle, applies a positive voltage from an operated contact of relay 1013 via conductor 1047 through an operated contact of relay 1920 and a series closed back contact of relay 1921 to the common junction of the windings of relay 1927 and through the left winding of this relay to the appearance of control lead 1936 of trunk 1900 on the switching network of Fig. 17. Positive voltage is also applied through another contact of operated relay 1043 and an operated series contact of relay 1013 to conductor 1045 which is connected through a back contact of relay 862 normal to the main anode 867 of tube 864 of the called line circuit, and in a similar manner to the main anodes of the gas tubes in the other line circuits. The application of voltage over lead 1046 to the main anodes of the line tubes associated with idle lines produces no effect in any of these tubes except tube 867 because none of the other tubes have a discharge between any of their elements at this time and the voltage applied to lead 1046 is not high enough to initiate a discharge between the electrodes to which it is applied and any other element of the tubes. This application of voltage to main anode 867 causes a transfer of the discharge in this line gas tube to the main cathode-main anode path thereby developing a positive voltage marking potential across resistor 892 in the main cathode circuit which is extended over the path previously described to the control lead 876 of this line circuit and its appearance on the switching network of Fig. 12.

With voltage applied to the control lead 1936 at the trunk side of the switching network and to control lead 876 at the line side of the switching network, the various possible paths between those two points through the switching network are revealed by the ionization of the cold cathode gas diodes at the various crosspoints of the switching network in a manner similar to that described previously for this switching network in establishing the originating connection between calling line 600 and out-trunk 2108. Specifically, and assuming that the paths are all idle except those employed in establishing the connection for the call being described, the voltage applied to lead 1936 fires diodes associated with crosspoints 1737 and 1738 in primary switch 1712 of trunk frame 1710 and thereby produces by the voltage drop in resistors 1727 and 1728 an altered voltage condition of leads 1723 and 1724 between the primary and secondary switches of this trunk frame. This altered voltage condition on primary-secondary link lead 1723 results in the firing of cold cathode gas diode 1729 in secondary switch 1714 of this trunk frame, producing in turn in a similar manner an altered voltage condition on lead 1512. Diode 1730 which is also connected to link lead 1723, however, does not fire since the voltage on lead 1412 is being maintained near ground potential by the busy junctor circuit 1410 which is in use on the originating section of the call. Lead 1512 connects to the start anode of a gas tube in junctor circuit 1514 similar to the tube shown in junctor 1410. In addition, the altered voltage condition on primary-secondary link lead 1724 similarly fires the cold cathode gas diodes in crosspoints 1731 and 1732 of secondary switch 1715 of the trunk frame, in turn producing an altered voltage condition on lead 1739 to the start anode of gas tube 1570 in junctor 1516 and on control lead 1424 to the control anode of a similar gas tube in junctor 1415.

Considering specifically the voltage applied to lead 876 at the line side of the switching network, cold cathode gas tubes of crosspoints 1210 and 1211 in primary switch 1201 of line frame 1200 fire thereby altering the voltage on primary-secondary link leads 1217 and 1213 respectively. The altered voltage condition on lead 1217 in turn fires the diodes of crosspoints 1218 and 1219 in secondary switch 1202 of this line frame extending voltage marks on conductors 1511 and 1517 to the screen electrodes of the gas tubes in junctors 1510 and 1514, respectively. In a similar manner the altered voltage condition on the primary-secondary link lead 1213 fires the gas diodes in crosspoints 1214 and 1215 of secondary switch 1203 of this line frame extending voltage marks on conductors 1518 and 1519 to the screen electrodes of the gas tubes in junctors 1515 and 1516 respectively.

Of the various junctors to which voltage marks have thus been extended, only junctors 1514 and 1516 are marked from both trunk and line sides of the switching network and are thus the only junctors associated with possible complete paths through the switching network. Junctor circuits 1415, 1514 and 1516 have voltage marks supplied to the start anodes of their gas tubes and these tubes will fire to a circuit provided to their start cathode. Junctors 1514 and 1516 will start a transfer to the conduction path extending from the start cathode to the main anode. However, junctors 1514 and 1516 have their main anode circuits connected to main anode lockout network 1525 so that by the process of lockout previously described only one of these two junctors will succeed in accomplishing this transfer.

Assuming that tube 1570 in junctor 1516, transfers to the main anode-start cathode gap, the discharge then further transfers to the main anode-main cathode circuit operating relay 1578 on its lower winding. The operation of relay 1578 completes a shunting circuit through resistor 1580, an operated contact of said relay and the upper winding of the relay around resistor 1563 across which the marking voltage on lead 1519 was originally developed.

In a similar manner relay 1578 will complete a shunt through resistor 1581 and the lower winding of relay 1582 around resistor 1572 on which the marking voltage to lead 1739 was originally developed. These shunt paths permit additional current to flow from battery 1583 through the windings of relays 1582 and 1578 and through the various crosspoint diodes in each direction from the junctor and their associated crosspoint relay windings to the marking potentials supplied to the switching network at conductors 1936 and 876 causing the operation of the crosspoint relay contacts associated with said contact path.

The operation of the crosspoint relays in the line frame places short-circuits around the gas diodes of these various crosspoints thereby causing a further increase in the current flow in the control lead path between the junctor and the line circuit through the upper winding of relay 1578 which in turn operates relay 872 in the line circuit on its right winding. The operation of the crosspoint relays in the trunk frame places short-circuits around the gas diodes of these crosspoints thereby causing a similar further increase in the current flow in the control lead between the junctor and the trunk circuit which operates junctor relay 1582 on its lower winding and trunk relay 1927 on its left winding. The operation of relay 1582 prepares a holding path from negative battery 1588 through variator 1584 and both windings of relay 1582, which path is completed through the crosspoint relay windings, both windings of relay 1927, varistor 1937 and a contact of relay 1927 to ground. Relay 1582 also prepares a holding path from negative battery 1588 through variator 1585 and the upper winding of relay 1578, which path is completed through the line frame crosspoint relay windings, both windings of relay 872 and varistor 879 to ground. Relay 1582 operates relay 1586 and lights lamp 1587 as a visual indication of the operation. The winding of relay 1586 is shunted by resistor-capacitor network 1589 to make it slow release. Operation of relay 1586 connects a release transient damping varistor 1590 through the upper winding of relay 1578 to lead 1519; connects a negative extinguishing potential 1591 through resistor 1592 to the start anodes of tube 1570; and shorts out the lower winding of relay 1578.

The operation of relay 872 in line circuit 803 on the increased current in the control lead path through the switching network, as described above, operates relay 860 through resistor 881. Relay 860, in operating, opens the marking voltage path between line gas tube 864 and the windings of relay 872; opens the locking path for relay 869 which is used on originating calls from this line, and removes relay 862 and ground from the tip and ring conductors of the line. Tube 864 is extinguished and a busy indication for subsequent tests by the subscribers' number group established at this tube by the open contacts of relay 860. Relays 872 and 1578 are held in their operated condition on the circuit extending from ground through varistor 879 through both windings of relay 872 to control lead 876 and then through the switching network, the upper winding of relay 1578, and resistor 1580 to negative battery 1583. Varistor 1585 is so poled that negligible current flows from this holding circuit to battery 1588. The current flow in this holding path is a lower value of current than that established by the marking voltage at the line end and permits the release of junctor relay 1578. The release of relay 1578 effectively removes battery 1583 from the control lead paths, thus permitting holding current for these paths to now flow from negative battery 1588 through varistors 1584 and 1585.

Relay 1927, in operating, extends ground from an operated contact of relay 1910 to the junction of the two varistors 1937 and 1938 associated with the right winding of relay 1927 thus preparing a holding condition for the path established through the switching network between this trunk and junctor circuit 1516. Relay 1927 also connects ground through a back contact of relay 1929 for locking relay 1928 in an operated condition to maintain the connection of ringing power to the called subscriber's line after terminating receiver connecting relay 1920 has released. Relay 1927 also operates relay 1921 which in turn opens the marking voltage path to the common point of the winding of relay 1927, extinguishes gas tube 1911, and releases relay 1920. The release of relay 1920 opens the connection between this incoming trunk circuit and the terminating receiver of Fig. 16 causing the release of relays 1610 and 1612, the reoperation of relay 1611 in this receiver circuit.

The release of relay 1920 also causes the release of trunk relay 1925. The release of trunk relay 1925 restores the direct current flow over intra-office conductors 2162 to its original condition, thereby releasing relay 2164 in the out-trunk.

Relay 1610 in releasing releases call counting device 1614 and opens the path between signal input transformer 1613 and bandpass filter 1617. Relay 1611, in operating, connects ground to automatic volume control circuit 1618 restoring this circuit to its maximum gain condition, and applies a resistance termination across the right winding of input transformer 1613. Relay 1611 in operating also reoperates relay 1615, which disables the code detector 1620. Relay 1611 in operating also reoperates relay 1616 which opens the short across inductance 1640, said short passing through a back contact of relay 1638 and a series closed contact on relay 1645. Removal of the short causes a negative pulse on lead 1648 which resets counter reader 1635, lock circuit 1642 and the binary counter circuits 1631, 1632 and 1633. Reset of lock circuit 1642 releases relay 1644 which removes battery from lead 1649, thereby releasing the number group circuit. Release of relay 1644 also releases relays 1645 and 1646 and applies battery to lead 1650 which in turn causes the operation of relay 1955 which applies battery for use in operating gas tubes in other incoming trunk circuits as required.

With the connection established as described above from in-trunk 1900 through the switching network, the line circuit 803 and local subscriber loop conductors 664 to subset 603, the ringing power supplied from in-trunk 1900 operates ringer 663 through condenser 659 and the closed contacts of switchhook assembly 662 to summon the called subscriber.

When the called subscriber answers the call by removing handset 661 from its switchhook cradle, switchhook assembly 662 operates removing ringer 663 from the line conductors 664 and connecting these line loop conductors through closed contacts of latched switchhook assembly 665 to the windings of latch magnet 667. The impedance of the direct current path completed through the latch magnet windings causes the operation of the trip ringing relay 1929 in the in-trunk on the ringing power and/or the superimposed direct current provided therewith. Relay 1929, in operating, opens the locking path to relay 1928 which releases, in turn removing ringing power from the conductors extending to the called subscriber and causing the release of relay 1929. Relay 1928, in releasing, also, places short circuits around networks 1930 and 1931 through which ringing tone was supplied to the calling subscriber's subset, and thereby completes a direct current path from ground and battery through the windings of relay 1939 to the conductors extending to the called subscriber's subset and through the windings of latch magnet 667 thereat. Relay 1939 now operates and the direction of current flow through latch magnet 667 from the battery and ground at the windings of relay 1939 causes the operation of this latch magnet releasing switchhook assembly 665. Relay 1939, in operating, supplies an additional locking ground to relay 1927 and reoperates relay 1925. The reoperation of relay 1925 reverses the direction of direct current flow over intra-office conductors 2162 causing the reoperation of polar relay 2164 in the out-trunk. This reoperation of relay 2164 may be used, by means not shown but well known in existing telephone systems, to operate a registering device for use in charging the call to the calling subscriber's account.

The release of switchhook assembly 665 in the called subscriber's subset 603 removes latch magnet 667 and the signaling apparatus comprising a digit selector, signal generating device, digit stepper and the phase splitting networks from the loop conductors 664, (these elements used for signaling being similar to those shown in the detailed drawing of subset 600) and completes the talking circuit from these loop conductors through the usual talking apparatus comprising a receiver and transmitter in handset 661 and the usual condenser 672 and transformed or induction coil 673.

The calling subscriber at subset 600 may now converse with the called subscriber at subset 603 with transmitter bias current provided for these subsets through the windings of relay 2151 in out-trunk 2108 and the windings of relay 1939 in incoming trunk 1900, respectively.

The talking connection through the originating office is maintained at this time under the direct control of out-trunk relay 2151 which is, in turn, held by the direct current flow in the calling subscriber's talking loop, and is maintained indirectly in a joint manner by in-trunk relay 1939 which is, in turn, held by the direct current flow in the called subscriber's talking loop. For the trunk frame section of the originating office, ground is provided from relays 2151 and 2155 in the out-trunk through the windings of relay 2152, the windings of the associated operated crosspoint relays of line frame 1110 and the windings of relay 822 in the calling line circuit 800 to ground.

In a similar manner, the talking connection through the trunk frame for the terminating connection is maintained at this time under the direct control of in-trunk relay 1939, which is, in turn, held by the direct current flow in the called subscriber's talking loop, and is maintained indirectly in a joint manner by out-trunk relay 2151, which, in turn, is held by the direct current flow in the calling subscriber's talking loop. Ground is provided from relays 1939 and 1910 in the in-trunk through the windings of relay 1927, the windings of the associated operated crosspoint relays of trunk frame 1710 and the windings of relay 1582 in junctor 1516 to negative battery 1588, and for the line frame section of the terminating connection battery 1588 is connected through contacts of held relay 1582 in junctor 1516 through the upper winding of relay 1578, the windings of the associated operated crosspoint relays of line frame 1200 and the windings of relay 872 in the called line circuit 803 to ground.

As described above, the talking connection for both the originating and terminating sections of the call is held under the joint control of both the calling and called subscribers. If the calling subscriber hangs up first at the end of conversation, the operation of switchhook assembly 612 opens the current path to out-trunk relay 2151 which releases and thereby opens its locking ground path to out-trunk relay 2155; however, relay 2155 is held operated by the operated relay 2164 so that holding ground is maintained to relay 2152 and the switching network.

When the called subscriber then hangs up, the operation of switchhook assembly 662 opens the current path to in-trunk relay 1939 which releases and in turn releasing relay 1925. With relay 1925 normal, the reversal of the direction of direct current flow in the intra-office loop conductors 2162 releases polar relay 2164 in the out-trunk in turn releasing relay 2155. The release of relay 2155 opens the holding ground to relay 2152, and this relay together with the series operated crosspoint relays in trunk frame 1710 and junctor relay 1432 releases. The release of junctor relay 1432 in turn opens the circuit from battery 1438 through the upper winding of relay 1428 and the series windings of the operated crosspoints in line frame 1110 and the windings of relay 822 in the calling line circuit, permitting the release of the relays along this current path. The release of junctor relay 1432 also releases relay 1436 restoring the junctor to its normal condition and the release of line circuit relay 822 releases relay 810 restoring the calling line circuit to its normal condition.

The release of relay 2155 in the out-trunk also opens the bridging connection through the winding of relay 2164 established between the talking conductors of intra-office loop 2162 thus causing the release of in-trunk relay 1910. The release of relay 1910 opens the holding ground to relay 1927 and this relay together with the series operated crosspoint relays in trunk frame 1710 and the junctor relay 1582 releases. The release of junctor relay 1582 in turn opens the circuit from battery 1588 through the upper winding of relay 1578 thus releasing the series operated crosspoints relays of the line frame and relay 872 in the line circuit. The release of relay 1582 also releases relay 1586 restoring the junctor to its normal condition and the release of relay 872 releases relay 860 restoring the called line circuit to its normal condition.

If the called subscriber hangs up first, the operation of switchhook assembly 662 opens the current path to in-trunk relay 1939 which releases, in turn, releasing relay 1925. With relay 1925 normal, the reversal of the direction of direct current flow in the intra-office loop conductors 2162 releases polar relay 2164 in the out-trunk; however, the connection for the originating section of the call is still held under the control of relay 2151, and relay 1910 in the in-trunk remains operated over the intra-office loop to hold the connection for the terminating section of the call. When the calling subscriber then hangs up, the operation of switchhook assembly 612 opens the current path to out-trunk relay 2151 which releases, in turn, releasing relay 2155. The release of relay 2155 then causes the release and return to normal of out-trunk 2108, in-trunk 1900, line circuits 600 and 603 and the junctors and crosspoint relays used in the connection as described above when both subscribers have hung up.

What is claimed is:

1. In a telephone switching system, in combination, a first switching station, a plurality of subscriber stations connected by lines to said first switching station, a second switching station, a plurality of other subscriber stations connected by other lines to said second switching station, transmission paths interconnecting said switching stations, calling apparatus at each subscriber station for repeatedly transmitting a series of signals representing a called station designation from one of said subscriber stations to the switching station to which said subscriber station is connected, responsive apparatus including signal registering means and selective path establishing means at said first switching station whereby upon the reception of at least a portion of one of the repeatedly transmitted series of the signals designating a called station a path is selectively established through said switching station to one of said transmission paths, means whereby upon the establishing of said path subsequent series of said repeatedly transmitted signals are transmitted over said path established between said first switching station and said second switching station, and responsive apparatus at said second switching station whereby upon the reception of at least a portion of said repeatedly transmitted series of signals transmitted from said subscriber station a transmission path is established through said second switching station to the called line of the subscriber station designated by the series of signals.

2. In a telephone switching system in combination, a plurality of switching stations, a plurality of subscriber stations individual to each of said switching stations, transmission lines between said subscriber stations and the switching station to which said respective subscriber stations are individual, trunk circuits extending between said switching stations, apparatus at said subscriber stations including impressers of electrical variations upon said transmission lines for repeatedly transmitting signals representing a called station designation, means located at one of said switching stations whereby upon the reception of one of the repetitions of said repeatedly transmitted signals from a transmission line a path is selectively established from said transmission line through said switching station to a trunk circuit in accordance with at least a portion of a single repetition of said repeatedly transmitted signals, transmitting means for thereafter transmitting said repeatedly transmitted signals to a succeeding switching station, and apparatus at said succeeding switching station whereby upon the reception of a subsequent repetition of the repeatedly transmitted signals transmitted from said one station a path through said succeeding station is established.

3. In a telephone switching system in combination, a first switching station, a plurality of subscriber stations connected by lines to said first switching station, a second switching station, transmission paths interconnecting said switching stations, calling apparatus at each subscriber station for repeatedly transmitting a series of signals representing a called station designation from one of said subscriber stations to the switching station to which said subscriber station is connected, electroresponsive apparatus including signal registering means and selective path establishing means at said first switching station whereby upon the reception of at least a portion of one of the repeatedly transmitted series of the signals designating a called station a path is selectively established through said switching station to one of said transmission paths, means whereby upon the establishing of said path subsequent series of said repeatedly transmitted signals are thereafter transmitted over said path established between said first switching station and said second switching station, responsive apparatus at said second switching station whereby upon the reception of at least a portion of said repeatedly transmitted series of signals transmitted from said subscriber station a transmission path is established through said second switching station.

4. In a telephone switching system, in combination, a plurality of switching stations, a plurality of subscriber stations individual to each of said switching stations, transmission paths between said subscriber stations and the switching station to which said respective subscriber stations are individual, trunk circuits extending between said switching stations, electroresponsive means at said subscriber stations for repeatedly transmitting signals over said path representing a called station designation, operative receiving means for said signals located at one of said switching stations for selectively establishing a path through said station to a trunk circuit, means for thereafter transmitting said repeatedly transmitted signals to and through said one station and over said trunk circuit to a succeeding switching station, operative receiving means for said signals at said succeeding switching station for establishing a path through said succeeding switching station and for selecting a transmission path to a called subscriber station, means at said one switching station for interrupting the transmission of said repeatedly transmitted signals, and means whereby selection of the called subscriber station forthwith operates said last named means.

5. In a telephone switching system, a subscriber station including a call signal transmitting means, a central station, a subscriber line extending from said subscriber station to said central station, connections including power supply means at said central station whereby the initiation of a call from said subscriber station applies only alternating current power to said subscriber line which operates said call signal transmitting means, electroresponsive means at said central station responsive to call signals transmitted from said subscriber station, a plurality of transmission circuits located at said central station, selective signal receptors for said call signals located at said central station for selectively establishing a path from said subscriber line to one of said transmission circuits, means whereby operation of said last-named preceding means interrupts the supply of alternating current power to said subscriber line, and other means located at said switching station whereby said established path applies alternating current power to said subscriber line from said transmission circuit in lieu of supplying such power from said connections.

6. In combination, in a telephone switching system, a subscriber station including call initiating means and signal transmitting means responsive to alternating current, a switching station, a subscriber line extending between said stations, means whereby supervisory alternating current is applied to said line in response to the initiation of a call, a transmission path extending from said switching station, signal receiving apparatus for signals transmitted from said signal transmitting means connectable to said subscriber line and located at said switching station whereby a communication path from said subscriber station to said transmission path is selectively established, auxiliary interconnecting apparatus located at said switching station operated when said communication path from said subscriber station to said transmission path is established, and operable circuit varying means connected to said last-named apparatus whereby alternating current power is supplied over the path established through said switching equipment and over said subscriber line to said subscriber station.

7. In combination, in a telephone switching system, a subscriber station including signal transmitting means, a switching station, a subscriber line interconnecting said stations, a transmission path extending from said switching station, selective switching apparatus located at said switching station whereby signals from said signal transmitting means at said subscriber station selectively establish a communication path from said subscriber station to said transmission path, electroresponsive apparatus located at said switching station whereby the establishment of said path to said transmission path as aforesaid supplies alternating current power over the path established through said switching equipment and over said subscriber line to said subscriber station, electroresponsive means connectable to said subscriber line at said switching station whereby the continued flow of said alternating current over said line maintains said path through said switching apparatus.

8. In combination, in a telephone switching system a subscriber station including signal transmitting means, a switching station, a subscriber line interconnecting said stations, a transmission path extending from said switching station, signal receiving means for receiving signals from said signal transmitting means, said signal receiving means being located at said switching station whereby signals from said signal transmitting means at said subscriber station enable additional means selectively to establish a communication path from said subscriber station to said transmission path, apparatus connectable to said subscriber line at said switching station whereby the establishment of a path to said transmission path supplies alternating current power over the previously established path through said switching apparatus and over said subscriber line to said subscriber station, and signal interruption control means at said switching station whereby cessation of flow of said alternating current interrupts said transmission path through said switching equipment.

9. In combination in a telephone switching system, a subscriber station having call initiating means, a central switching station, a subscriber line extending between said subscriber station and said central switching station, apparatus connectable to said subscriber line at said central switching station operable under control of said call initiating means whereby operation of said call initiating means applies only alternating current power to said subscriber line, supervisory apparatus at said switching station operable by the flow of said alternating current over said line, and means whereby operation of said supervisory apparatus maintains said flow of current to said subscriber line.

10. In combination, in a telephone switching system, a subscriber station having call initiating means, a central switching station, a subscriber line extending between said subscriber station and said central switching station, means at said central switching station whereby operation of said call initiating means at said subscriber station applies alternating current power to said subscriber line, means at said central switching station whereby the flow of said alternating current maintains the application of alternating current to said subscriber line, means at said central switching station whereby the cessation of said alternating current flowing over said subscriber line interrupts the application of alternating current to said subscriber line.

11. In a telephone switching system, in combination, a subscriber station having signal transmitting means, a first central station, a subscriber line extending from said subscriber station to said central station, a second central station, trunks extending from said first central station to said second central station, apparatus connectable to said subscriber line at said first central station and receptive to signals from said signal transmitting means whereby a transmission path from said subscriber station through said first switching station to a trunk extending to said second central station is established, apparatus at said first central station including a source of alternating current and switching means therefor whereby the selection of a trunk extending to said second central station operates said switching means to cause the application of alternating current to said subscriber line, means at said subscriber station whereby said alternating current generates further calling signals, means for transmitting said further calling signals over said trunk circuit to said second central station, automatic switching means in said second central station whereby said further calling signals transmitted from said subscriber station select a path through said second station, and apparatus at the first central station whereby the continued application of alternating current to said subscriber line maintains said paths from said subscriber station through said central stations.

12. In a telephone switching system, in combination a subscriber station, a first central station, a subscriber line extending to said central station, a second central station having automatic switching apparatus, trunks extending from said first central station to said second central station, apparatus at said first central station, means controllable over said subscriber line for connecting said apparatus to said subscriber line at said first central station, means whereby said subscriber station operates said apparatus for selectively establishing a transmission path from said subscriber station to one of said trunks extending to said second central station, apparatus including a source of alternating current at said first central station whereby the selection of a trunk extending to said second central station applies alternating current from said source to said subscriber line, means in said subscriber station whereby said alternating current generates calling signals, means for transmitting said calling signals over said trunk circuit to said second central station, means including receiving means whereby said automatic switching apparatus in said second central station responds to said signals transmitted from said subscriber station, means whereby said response selectively establishes a path through said second central station, and apparatus whereby said alternating current flowing over a path including said subscriber line maintains said paths through both said central stations established.

13. In a telephone switching system, in combination, a subscriber station having signal transmitting means, a first central station, a subscriber line having conditions including a calling condition extending from said subscriber station to said central station, a second central station, trunks extending from said first central station to said second central station, selective switching apparatus connectable to said subscriber line, means whereby the initiation of a call upon said line effects said calling condition, means operable thereafter at said first central station whereby the reception of signals from said signal transmitting means at said subscriber station selectively establishes a transmission path from said subscriber station to a trunk extending to said second central station, apparatus at said first central station operating whereby the selection of a trunk extending to said second central station applies alternating current to said subscriber line, electroresponsive means in said subscriber station whereby said alternating current power generates additional calling signals, means for transmitting said additional calling signals over said trunk circuit to said second central station, automatic switching means in said second central station selectively receptively responsive to said additional signals transmitted from said subscriber station, apparatus at said first central station whereby the cessation of alternating current over said subscriber line interrupts the path previously established from said subscriber line to said trunk.

14. In a communication system in combination, a plurality of central switching stations, trunk circuits interconnecting said switching stations, subscriber stations each having a call initiating condition individual to each of said switching stations, subscriber lines connecting each of said subscriber stations to one of said switching stations, call signal sending apparatus at said subscriber stations actuated by alternating current, apparatus located at one of said switching stations whereby the presence of a call initiating condition at a subscriber station applies alternating current to the said subscriber line for actuating the signal sending apparatus at said subscriber station, selective means at said one switching station to which the calling subscriber line is connected and other selective means at a switching station reached from said subscriber line only over a trunk operated in sequence from the signals from said signal sending apparatus thereby to establish paths from said calling subscriber line to a called subscriber line through said switching stations, electroresponsive apparatus at said switching station individual to said calling subscriber line whereby the alternating current over said subscriber line is maintained, and apparatus at said one switching station whereby the cessation of alternating current flowing over said subscriber line interrupts the said established paths to said called subscriber line.

15. In a communication system in combination, a plurality of central switching stations, trunk circuits interconnecting said switching stations, subscriber stations individual to each of said switching stations, subscriber lines connecting each of said subscriber stations to one of said switching stations, call signal sending apparatus located at said subscriber stations actuated by alternating current, apparatus located at a switching station whereby the initiation of a call from one of said subscriber stations applies alternating current to the subscriber line to actuate the call signal sending apparatus at said subscriber station, means whereby said actuated call apparatus sends out signals for selecting a called line, apparatus connectable to said subscriber line at said switching station whereby the supply of said alternating current from said apparatus is maintained, said means including means whereby the supply of said alternating current from said apparatus over said subscriber line is maintained by continuity of said subscriber line, and apparatus at said switching station whereby completion of the selection of the called line interrupts said source of alternating current and applies direct current to said subscriber line.

16. In a communication system in combination, a plurality of central switching stations, trunk circuits interconnecting said switching stations, subscriber stations individual to each of said switching stations, subscriber lines connecting each of said subscriber stations to one of said switching stations, call initiating means including apparatus actuable by alternating current located at said subscriber stations, apparatus connectable to said subscriber lines located at a switching station whereby the initiation of a call applies alternating current for actuating the call apparatus at said subscriber station to the calling subscriber line, means whereby said actuated call apparatus sends out signals for selecting a called line, apparatus at said switching station whereby the supply of said alternating current is maintained under control of said alternating current applied to said subscriber line, apparatus at said switching station whereby the completion of the selection of a called line interrupts said source of alternating current and applies direct current to said subscriber line, and electrical detecting means at said switching station under control of said direct current for maintaining the established transmission paths through said switching equipment.

17. In a communication system in combination, a plurality of central switching stations, trunk circuits interconnecting said switching stations, subscriber stations individual to each of said switching stations, subscriber lines connecting each of said subscriber stations to one of said switching stations, call signal transmitting equipment located at said subscriber stations actuated by alternating current whereby call signals are transmitted, receptive electrical apparatus located at a switching station whereby the initiation of a call from said subscriber station applies alternating current to the subscriber line for actuating the call signal transmitting equipment at said subscriber station, apparatus at said switching station for maintaining the supply of said alternating current under control of said alternating current applied to said subscriber line, switching equipment at said central switching stations whereby the reception of call signals from said subscriber station selectively establishes a transmission path to a called line, apparatus at said switching station whereby the completion of the selection of the called line interrupts said source of alternating current and applies direct current to said subscriber line, means at said switching station under control of said direct current whereby an established transmission path through said switching equipment is maintained, additional apparatus at said switching station whereby the cessation of said direct current interrupts previously established transmission paths extending to said calling subscriber line.

18. In combination in a telephone switching system a central station, a subscriber line extending from said central station to a subscriber station, call signal transmitting means at said subscriber station for applying call signals to said line, apparatus connectable to said subscriber line at said central station for normally applying a substantially unvarying electrical voltage to said line, call signal receiving means at said central station responsive to call signals received over said line, apparatus at said central station whereby the flow of a substantially unvarying current over said line in excess of a predetermined magnitude establishes a path between said line and said call signal receiving means, operable means at said central station whereby the establishing of said path between said line and said call signal receiving means interrupts the substantially unvarying voltage applied to said line, other apparatus at said central station for applying an alternating current voltage to said line, and means at said central station for maintaining said path from said line under control of continued flow of alternating current over said line.

19. In combination in a telephone switching system, a central station, a line from said central station, apparatus at said central station for normally applying a substantially unvarying electrical voltage to said line, call signal receiving equipment at said central station responsive to call signals received over said line, apparatus at said central station whereby the flow of a substantially unvarying current over said line in excess of a predetermined magnitude establishes a path from said line to said receiving equipment, operable apparatus at said central station whereby the establishment of said path from said line to said receiving equipment interrupts the substantially unvarying voltage applied to said line, other apparatus at said central station for applying an alternating current voltage to said line, electrical means at said central station for maintaining said path from said line under control of continued flow of alternating current over said line, electroresponsive apparatus at said central station whereby the operation of said call signal receiving equipment by received call signals interrupts the alternating current applied to said line and applies a substantially unvarying potential of opposite polarity thereto.

20. In a telephone switching system a subscriber line, apparatus connectable to said subscriber line for normally applying a substantially unvarying voltage of one polarity to said line, operable appartus whereby the initiation of a call over said line interrupts said substantially unvarying potential, and means connectable to said subscriber line for applying only an alternating current to said line during signaling over said line, and apparatus connectable to said subscriber line whereby at the end of signaling said supply of alternating current is interrupted and a substantially unvarying voltage of reversed polarity is applied to said line.

21. In a telephone switching system a subscriber line, a central station, means for establishing a connection to said line from said central station, apparatus at said central station for normally applying a substantially unvarying voltage of one polarity to said line, apparatus at said central station connectable to said line whereby the initiation of a call over said line interrupts said substantially unvarying potential and applies alternating current to said line during signaling over said line, electroresponsive apparatus at said central station whereby the end of signaling interrupts said supply of alternating current and reapplies a substantially unvarying voltage of reversed polarity to said line. electroresponsive apparatus connectable to said subscriber line at said central station whereby the continued flow of said alternating current maintains the connection established to said line during signaling thereover.

22. In a telephone switching system a subscriber line, a central station, means for establishing a connection to said line from said central station, apparatus located at said central station for normally applying a substantially unvarying voltage of one polarity to said line, operative apparatus at said central station whereby the initiation of a call over said line interrupts said substantially unvarying potential, means operating concurrently with the operation of said last-named apparatus whereby alternating current is applied to said line during signaling over said line, responsive apparatus connectable to said line at said central station whereby the end of signaling interrupts said supply of alternating current and reapplies a substantially unvarying voltage of reversed polarity to said line, apparatus connectable to said line at said central station whereby the continued flow of said substantially unvarying current of reversed polarity maintains the connection established from said line.

23. In a telephone switching system a subscriber line, a central station, apparatus located at said central station for normally applying a substantially unvarying voltage of one polarity to said line, operative apparatus connectable to said line at said central station operative whereby the initiation of a call over said line interrupts said substantially unvarying potential, electroresponsive means operating concurrently with the operation of said last-named apparatus whereby only an alternating current is applied to said line during signaling over said line, apparatus connectable to said line at said central station whereby the end of signaling interrupts said supply of alternating current and reapplies a substantially unvarying voltage of reversed polarity to said line, electrical apparatus at said central station whereby upon the answering of a call directed to said line a substantially unvarying voltage of reversed polarity is applied to said line.

WILLIAM A. MALTHANER.
HENRY E. VAUGHAN.

References Cited in the file of this patent

UNITED STATES PATENTS

| Number | Name | Date |
|---|---|---|
| 1,775,230 | Saunders | Oct. 14, 1930 |
| 2,052,051 | Lomax | Aug. 25, 1936 |
| 2,164,335 | Mathes | July 4, 1939 |
| 2,257,568 | Mathes | Sept. 30, 1941 |
| 2,348,301 | Lomax | May 9, 1944 |
| 2,513,949 | Long | July 4, 1950 |
| 2,598,695 | Hill et al. | June 3, 1952 |